US012141508B2

(12) United States Patent
Agonafer

(10) Patent No.: US 12,141,508 B2
(45) Date of Patent: Nov. 12, 2024

(54) SYSTEMS AND METHODS FOR FORMING MICROPILLAR ARRAY

(71) Applicant: Damena Agonafer, St. Louis, MO (US)

(72) Inventor: Damena Agonafer, St. Louis, MO (US)

(73) Assignee: Washington University, St. Louis, MO (US)

(*) Notice: Subject to any disclaimer, the term of this patent is extended or adjusted under 35 U.S.C. 154(b) by 866 days.

(21) Appl. No.: 17/203,677

(22) Filed: Mar. 16, 2021

(65) Prior Publication Data

US 2021/0303760 A1 Sep. 30, 2021

Related U.S. Application Data

(60) Provisional application No. 62/990,370, filed on Mar. 16, 2020.

(51) Int. Cl.

| | |
|---|---|
| ***G06F 30/25*** | (2020.01) |
| ***G06F 30/23*** | (2020.01) |
| ***G06F 30/28*** | (2020.01) |
| *G06F 113/08* | (2020.01) |

(52) U.S. Cl.

CPC .............. *G06F 30/25* (2020.01); *G06F 30/23* (2020.01); *G06F 30/28* (2020.01); *G06F 2113/08* (2020.01)

(58) Field of Classification Search

CPC .......... G06F 30/25; G06F 30/23; G06F 30/28; G06F 2113/08

See application file for complete search history.

(56) References Cited

U.S. PATENT DOCUMENTS

| | | | |
|---|---|---|---|
| 2,996,286 | A | 8/1961 | Trepaud |
| 3,673,306 | A | 6/1972 | Kirkpatrick |
| 4,487,139 | A | 12/1984 | Warner |
| 4,548,257 | A | 10/1985 | Williamson |
| 4,602,679 | A | 7/1986 | Edelstein et al. |
| 4,731,164 | A | 3/1988 | Williamsom |
| 4,769,186 | A | 9/1988 | Raybon |

(Continued)

FOREIGN PATENT DOCUMENTS

| | | | |
|---|---|---|---|
| AU | 522803 | B | 6/1982 |
| AU | 552488 | B | 6/1986 |

(Continued)

OTHER PUBLICATIONS

Damena D. Agonafer, Porous micropillar structures for retaining low surface tension liquids, 2017, Journal of Colloid and Interface Science 514 (Year: 2017).*

(Continued)

*Primary Examiner* — Andre Pierre Louis

(74) *Attorney, Agent, or Firm* — Armstrong Teasdale LLP

(57) ABSTRACT

System and methods for forming a micropillar array for an evaporative heat exchanger include selecting a preliminary shape for a micropillar, determining a droplet shape that is generated by the preliminary shape, and generating at least one curve that defines the droplet shape. The system and methods also include performing an evaporative simulation based on the curve and selecting a final micropillar shape based on the evaporative simulation. The system and methods further include fabricating an array of micropillars including at least one micropillar having the final micropillar shape.

20 Claims, 57 Drawing Sheets

(56) References Cited

U.S. PATENT DOCUMENTS

| | | | | |
|---|---|---|---|---|
| 4,941,330 | A | 7/1990 | Williamson | |
| 5,522,452 | A | 6/1996 | Mizuno et al. | |
| RE35,721 | E | 2/1998 | Daikoku et al. | |
| 5,725,049 | A | 3/1998 | Swanson et al. | |
| 5,761,037 | A | 6/1998 | Anderson et al. | |
| 6,196,307 | B1 | 3/2001 | Ozmat | |
| 6,397,450 | B1 | 6/2002 | Ozmat | |
| 6,881,039 | B2 | 4/2005 | Corbin et al. | |
| 6,903,929 | B2 | 6/2005 | Prasher et al. | |
| 6,948,556 | B1 | 9/2005 | Anderson et al. | |
| 6,986,382 | B2 | 1/2006 | Upadhya et al. | |
| 6,988,534 | B2 | 1/2006 | Kenny et al. | |
| 6,988,535 | B2 | 1/2006 | Upadhya et al. | |
| 7,000,684 | B2 | 2/2006 | Kenny et al. | |
| 7,017,654 | B2 | 3/2006 | Kenny et al. | |
| 7,044,196 | B2 | 5/2006 | Shook et al. | |
| 7,077,634 | B2 | 7/2006 | Munch et al. | |
| 7,086,839 | B2 | 8/2006 | Kenny et al. | |
| 7,090,001 | B2 | 8/2006 | Zhou et al. | |
| 7,104,312 | B2 | 9/2006 | Goodson et al. | |
| 7,156,159 | B2 | 1/2007 | Lovette et al. | |
| 7,188,662 | B2 | 3/2007 | Brewer et al. | |
| 7,201,012 | B2 | 4/2007 | Munch et al. | |
| 7,201,214 | B2 | 4/2007 | Munch et al. | |
| 7,269,966 | B2 | 9/2007 | Lowenstein et al. | |
| 7,278,549 | B2 | 10/2007 | Munch et al. | |
| 7,287,522 | B2 | 10/2007 | Dupree et al. | |
| 7,293,423 | B2 | 11/2007 | Upadhya et al. | |
| 7,301,773 | B2 | 11/2007 | Brewer et al. | |
| 7,344,363 | B2 | 3/2008 | Munch et al. | |
| 7,402,029 | B2 | 7/2008 | Munch et al. | |
| 7,449,122 | B2 | 11/2008 | Corbin et al. | |
| 7,616,444 | B2 | 11/2009 | Munch et al. | |
| 7,806,168 | B2 | 10/2010 | Upadhya et al. | |
| 7,836,597 | B2 | 11/2010 | Datta et al. | |
| 7,882,809 | B2 | 2/2011 | Lomax et al. | |
| 7,948,757 | B2 | 5/2011 | Campbell et al. | |
| 7,966,841 | B2 | 6/2011 | Lowenstein et al. | |
| 8,272,431 | B2 | 9/2012 | Campagna et al. | |
| 8,464,781 | B2 | 6/2013 | Kenny et al. | |
| 8,659,896 | B2 | 2/2014 | Dede et al. | |
| 8,701,927 | B2 | 4/2014 | Rubner et al. | |
| 8,780,558 | B2 | 7/2014 | Miller et al. | |
| 8,797,741 | B2 | 8/2014 | Altman | |
| 8,867,209 | B2 | 10/2014 | Campbell et al. | |
| 9,171,775 | B2 | 10/2015 | Zeng et al. | |
| 9,179,575 | B1 | 11/2015 | Yao | |
| 9,352,500 | B2 | 5/2016 | Lee et al. | |
| 9,423,192 | B2 | 8/2016 | Tsoi et al. | |
| 9,437,372 | B1 | 9/2016 | Zhamu et al. | |
| 9,646,735 | B2 | 5/2017 | Adamson et al. | |
| 9,691,916 | B2 | 6/2017 | Lee et al. | |
| 9,751,047 | B2 | 9/2017 | Lienhard et al. | |
| 9,835,363 | B2 | 12/2017 | Xiao et al. | |
| 9,854,715 | B2 | 12/2017 | Shedd et al. | |
| 9,929,287 | B2 | 3/2018 | Ozyilmaz et al. | |
| 9,945,027 | B2 | 4/2018 | Farquhar et al. | |
| 9,966,199 | B2 | 5/2018 | Zhamu et al. | |
| 10,121,754 | B2 | 11/2018 | Oliver et al. | |
| 10,134,972 | B2 | 11/2018 | Oliver et al. | |
| 10,190,211 | B2 | 1/2019 | Farquhar et al. | |
| 10,199,553 | B1 | 2/2019 | Oliver et al. | |
| 10,242,968 | B2 | 3/2019 | Das et al. | |
| 10,381,541 | B2 | 8/2019 | Das et al. | |
| 10,396,269 | B2 | 8/2019 | Oliver et al. | |
| 10,492,333 | B2 | 11/2019 | Moghaddam et al. | |
| 10,501,845 | B2 | 12/2019 | Farquhar et al. | |
| 10,509,559 | B2 * | 12/2019 | Ou | B29C 64/393 |
| 10,544,504 | B2 | 1/2020 | Farquhar et al. | |
| 10,586,909 | B2 | 3/2020 | Das et al. | |
| 10,590,529 | B2 | 3/2020 | Farquhar et al. | |
| 10,651,112 | B2 | 5/2020 | Malouin et al. | |
| 10,658,424 | B2 | 5/2020 | Oliver et al. | |
| 10,746,475 | B2 | 8/2020 | Roberts et al. | |
| 10,746,478 | B2 | 8/2020 | Sunada et al. | |
| 10,748,672 | B2 | 8/2020 | Zhamu et al. | |
| 10,832,828 | B2 | 11/2020 | Adamson et al. | |
| 10,858,733 | B2 | 12/2020 | Farquhar et al. | |
| 10,858,734 | B2 | 12/2020 | Farquhar et al. | |
| 10,865,474 | B2 | 12/2020 | Farquhar et al. | |
| 10,867,887 | B2 | 12/2020 | Wang et al. | |
| 10,897,833 | B2 | 1/2021 | Moghaddam et al. | |
| 10,903,141 | B2 | 1/2021 | Malouin et al. | |
| 2004/0104012 | A1 | 6/2004 | Zhou et al. | |
| 2005/0286227 | A1 | 12/2005 | Erturk et al. | |
| 2006/0180300 | A1 | 8/2006 | Lenehan et al. | |
| 2007/0274045 | A1 | 11/2007 | Campbell et al. | |
| 2008/0043440 | A1 | 2/2008 | Fedorov | |
| 2008/0137300 | A1 | 6/2008 | Macris et al. | |
| 2009/0151923 | A1 | 6/2009 | Fedorov | |
| 2010/0103620 | A1 | 4/2010 | Campbell et al. | |
| 2010/0108301 | A1 | 5/2010 | Hiraoka et al. | |
| 2010/0314093 | A1 | 12/2010 | Refai-Ahmed et al. | |
| 2011/0088425 | A1 | 4/2011 | Pun | |
| 2011/0108978 | A1 | 5/2011 | Kim et al. | |
| 2011/0146956 | A1 | 6/2011 | Stroock et al. | |
| 2011/0277491 | A1 | 11/2011 | Wu et al. | |
| 2012/0118722 | A1 * | 5/2012 | Holtzapple | F28F 19/02 165/172 |
| 2012/0137718 | A1 | 6/2012 | Uchida et al. | |
| 2012/0175534 | A1 | 7/2012 | Jung et al. | |
| 2012/0328789 | A1 | 12/2012 | Lu et al. | |
| 2013/0223010 | A1 | 8/2013 | Shioga et al. | |
| 2013/0312939 | A1 | 11/2013 | Uchida et al. | |
| 2014/0318167 | A1 | 10/2014 | Uchida | |
| 2014/0326433 | A1 | 11/2014 | Kozubal | |
| 2015/0375997 | A1 | 12/2015 | Chu et al. | |
| 2016/0014933 | A1 | 1/2016 | Matsunaga et al. | |
| 2016/0120019 | A1 | 4/2016 | Shedd et al. | |
| 2016/0141866 | A1 | 5/2016 | Bromberg et al. | |
| 2016/0322143 | A1 | 11/2016 | Staines et al. | |

FOREIGN PATENT DOCUMENTS

| | | | |
|---|---|---|---|
| CA | 2053055 | C | 2/1997 |
| CA | 2712985 | C | 8/2016 |
| CN | 1160163 | A | 9/1997 |
| CN | 2612919 | Y | 4/2004 |
| CN | 100566530 | C | 12/2009 |
| CN | 201449173 | U | 5/2010 |
| CN | 202630770 | U | 12/2012 |
| CN | 103017587 | A | 4/2013 |
| CN | 103245241 | A | 8/2013 |
| CN | 101925387 | B | 11/2013 |
| CN | 102679790 | B | 12/2014 |
| CN | 104307192 | A | 1/2015 |
| CN | 104615872 | A | 5/2015 |
| CN | 105180709 | A | 12/2015 |
| CN | 106197105 | A | 12/2016 |
| CN | 106500526 | A | 3/2017 |
| CN | 106895730 | A | 6/2017 |
| CN | 107241887 | A | 10/2017 |
| CN | 106288915 | B | 4/2018 |
| CN | 109386994 | A | 2/2019 |
| CN | 107687780 | B | 6/2019 |
| CN | 110285691 | A | 9/2019 |
| CN | 210346397 | U | 4/2020 |
| CN | 111167144 | A | 5/2020 |
| CN | 111886454 | A | 11/2020 |
| DE | 10054920 | A1 | 6/2001 |
| DE | 102007029444 | A1 | 12/2008 |
| DE | 102010036654 | A1 | 3/2012 |
| DK | 174179 | B1 | 8/2002 |
| EP | 63195 | B1 | 3/1990 |
| EP | 480750 | A2 | 4/1992 |
| EP | 1881538 | A1 | 1/2008 |
| EP | 2433480 | B1 | 5/2013 |
| EP | 1751479 | B1 | 5/2014 |
| EP | 2856511 | B1 | 3/2019 |
| EP | 3149075 | B1 | 12/2020 |
| GB | 825426 | A | 12/1959 |
| GB | 1212430 | A | 11/1970 |
| IN | 255511 | B | 3/2013 |
| JP | 2002098484 | A | 4/2002 |

(56) References Cited

FOREIGN PATENT DOCUMENTS

| | | | |
|---|---|---|---|
| JP | 2004060957 | A | 2/2004 |
| JP | 05170290 | B2 | 3/2013 |
| JP | 2013182439 | A | 9/2013 |
| JP | 05397522 | B2 | 1/2014 |
| JP | 05755525 | B2 | 7/2015 |
| JP | 05796131 | B2 | 10/2015 |
| KR | 999226 | B1 | 12/2010 |
| KR | 20210017902 | A | 2/2021 |
| TW | 201204994 | A | 2/2012 |
| WO | 2008058113 | A2 | 5/2008 |
| WO | 2010138619 | A2 | 12/2010 |
| WO | 2014141071 | A1 | 9/2014 |
| WO | 2015110125 | A1 | 7/2015 |
| WO | 2016061467 | A1 | 4/2016 |
| WO | 2018013562 | A1 | 1/2018 |
| WO | 2020041749 | A1 | 2/2020 |

OTHER PUBLICATIONS

Martin Roser, Realistic Modeling of Water Droplets for Monocular Adherent Raindrop Recognition using Bézier Curves, 2010, Computer Vision—ACCV 2010 Workshops: ACCV 2010 International Workshops, Queenstown, New Zealand, Nov. 8-9, 2010, Revised Selected Papers, Part II 10 (Year: 2010).*

Subhamita Mukherjee, A particle swarm optimization method for fault localization and residue removal in digital microfluidic biochips, 2019, Applied Soft Computing Journal 85 (2019) 105839 (Year: 2019).*

Agonafer, D et al., "Porous Micropillar Structures for Retaining Low Surface Tension Liquids,", Journal of Colloid and Interface Science, 514: 316-327 (2018) DOI: 10.1016/j.jcis.2017.12.011.

Agonafer, D. et al. "Burst behavior at a capillary tip: Effect of low and high surface tension." Journal of Colloid and Interface Science 455: 1-5 (2015), DOI 10.1016/j.jcis.2015.05.033.

Palko, J. et al. "Extreme Two-Phase Cooling from Laser-Etched Diamond and Conformal, Template-Fabricated Microporous Copper," Advanced Functional Materials, 27(45), 8 pages (2017), DOI: 10.1002/adfm.201703265.

Palko, J. et al. Supporting Information "Extreme Two-Phase Cooling from Laser-Etched Diamond and Conformal, Template-Fabricated Microporous Copper," Advanced Functional Materials, 27(45), 8 pages (2017), DOI: 10.1002/adfm.201703265.

Raj, R. et al., "High-Resolution Liquid Patterns via Three-Dimensional Droplet Shape Control," Nature Communications, 5: 4975, 8 pages (2014). DOI: 10.1038/ncomms5975.

Saenz, P. et al., "Dynamics and Universal Scaling Law in Geometrically-Controlled Sessile Drop Evaporation," Nature Communications, 8(1): 1-9 (2017).

Schultz, M. et al. "Embedded two-phase cooling of large 3D compatible chips with radial channels." Proceedings of ASME InterPACK/ICNMM2015-48348, 7 pages (2015).

Shuai, S. et al., "Numerical Investigation of Shape Effect on Microdroplet Evaporation," Proceedings of the ASME 2018 International Technical Conference and Exhibition on Packaging and and Integration of Electronic and Photonic Microsystems, IPACK 2018-8311, Inter PACK2018, Aug. 28-30, 2018, San Francisco, CA.

Nahar et al., "Design and optimization of hollow micropillar structures for enhanced evaporative cooling of high-powered electronics", Mechanical Engineering and Materials Science, Washington University in St. Louis, Mo 63130, Semi-Therm 35, Mar. 2019.

Wu, Haotian, "Enhanced Heat Transfer Performance by Shape Optimization of a Non-axisymmetric Droplet Evaporating on a Heated Micropillar", Thesis examination Master of Science, Washington University in St. Louis, Dec. 2019.

* cited by examiner

High Surface Tension Liquids
304
306
310
300
308

D
d
θy
θ*
ω

SYSTEMS AND METHODS FOR FORMING MICROPILLAR ARRAY

CROSS-REFERENCE TO RELATED APPLICATIONS

This application claims priority to U.S. Provisional Application No. 62/990,370, filed Mar. 16, 2020, the contents of which are incorporated herein by reference in their entirety.

GOVERNMENT SUPPORT

This invention was made with government support under 1943468 awarded by the National Science Foundation. The government has certain rights in the invention.

FIELD

The field of the disclosure relates generally to evaporation of liquid. More specifically, the field of the disclosure relates to systems and methods for forming micropillar arrays for evaporation of a liquid from a droplet confined on a hollow pillar.

BACKGROUND

Current electronic devices include multiple electronic components that are integrated into single assemblies to provide faster signal communication and a tighter footprint than prior devices. Advancements in the integration of electronic components have led to higher generation of heat in confined spaces of the electronic devices. For example, some current electronic devices generate heat exceeding 1 kW $cm^{-2}$ (⅕ of the solar radiation at the surface of the sun). Accordingly, at least some electronic devices include thermal management systems configured to dissipate the heat generated by the electronic components during operation of the devices. However, current thermal management systems have not been completely satisfactory in dissipating the relatively high amounts of heat generated by electronic devices. Moreover, design aspects of electronic devices such as shape and size are limited at least in part by the capabilities and sizes of the thermal management systems.

Two-phase liquid cooling, such as droplet evaporation, utilizes a latent heat of vaporization to remove excessive heat and can provide higher efficiency and a greater heat dissipation rate compared to single-phase cooling techniques. For example, compared to boiling heat transfer, where the formation and growth of vapor bubbles must overcome an energy barrier associated with nucleation and a capillary force acting on the convex liquid-vapor interface, evaporation from a droplet can facilitate much higher heat transfer by direct mass transport from the bulk liquid to the bulk vapor domain. In addition, two-phase liquid cooling provides a relatively small thermal resistance (<0.1 K-$cm^2$/W). In addition to two-phase heat exchangers, droplet evaporation facilitates a diverse range of applications including spray coating, inkjet printing, DNA sequencing, and bio-sensing. Typical droplet evaporation systems utilize spherical droplets which are axisymmetric. Moreover, at least some known systems rely on polar liquids such as water to function and are not compatible with dielectric liquids.

Accordingly, there is a need for an improved thermal management system that is able to dissipate the increasing amount of heat generated by electronic components. Also, there is a need for a droplet evaporation system that provides increased heat transfer efficiency in comparison to prior systems. In addition, there is a need for a thermal management system that utilizes dielectric liquids.

BRIEF DESCRIPTION OF THE DISCLOSURE

In one aspect, a method of forming a micropillar array for an evaporative heat exchanger includes selecting a preliminary shape for a micropillar, determining a droplet shape that is generated by the preliminary shape, and generating at least one curve that defines the droplet shape. The method also includes performing an evaporative simulation based on the curve and selecting a final micropillar shape based on the evaporative simulation. The method further includes fabricating an array of micropillars including at least one micropillar having the final micropillar shape.

In another aspect, a system for fabricating a micropillar array includes a controller configured to select a preliminary shape for the micropillar, determine a droplet shape that is generated by the preliminary shape, generate at least one curve that defines the droplet shape, and perform an evaporative simulation based on the droplet shape. The controller is also configured to input results from the evaporative simulation into a particle swarm optimization module and output, by the particle swarm optimization module, an optimized shape output. The controller is further configured to determine a convergence value for control points of the particle swarm optimization module, output an optimized shape output from the particle swarm optimization module, and compare the convergence value to a threshold. The optimized shape output is used for a subsequent evaporative simulation if the convergence value is greater than a threshold and the optimized shape output is selected as a final micropillar shape if the convergence value is equal to or less than the threshold. The system also includes a fabrication device in communication with the controller. The fabrication device is operated in accordance with the selected final micropillar shape to fabricate a micropillar array including at least one micropillar having the final micropillar shape.

In yet another aspect, a method of forming a micropillar array includes performing an evaporative simulation based on a droplet shape and selecting a final micropillar shape based on the evaporative simulation. The method also includes inputting, into a simulation model, the final micropillar shape and inputting, into the simulation model, conditions for the micropillar array. The micropillar array includes a plurality of the micropillars. The method further includes selecting a condition of the micropillar array to vary for the simulation. The condition includes one of a spacing between micropillars, a shape of at least one micropillar, an orientation of the micropillars, and a micropillar height. In addition, the method includes performing a simulation using the simulation model for the micropillar array, selecting an arrangement of micropillars for the micropillar array based on the simulation, and fabricating a micropillar array having the selected arrangement of micropillars. The micropillar array includes at least one micropillar having the final micropillar shape.

DESCRIPTION OF DRAWINGS

The drawings described below illustrate various aspects of the disclosure.

DETAILED DESCRIPTION

Figure 1:
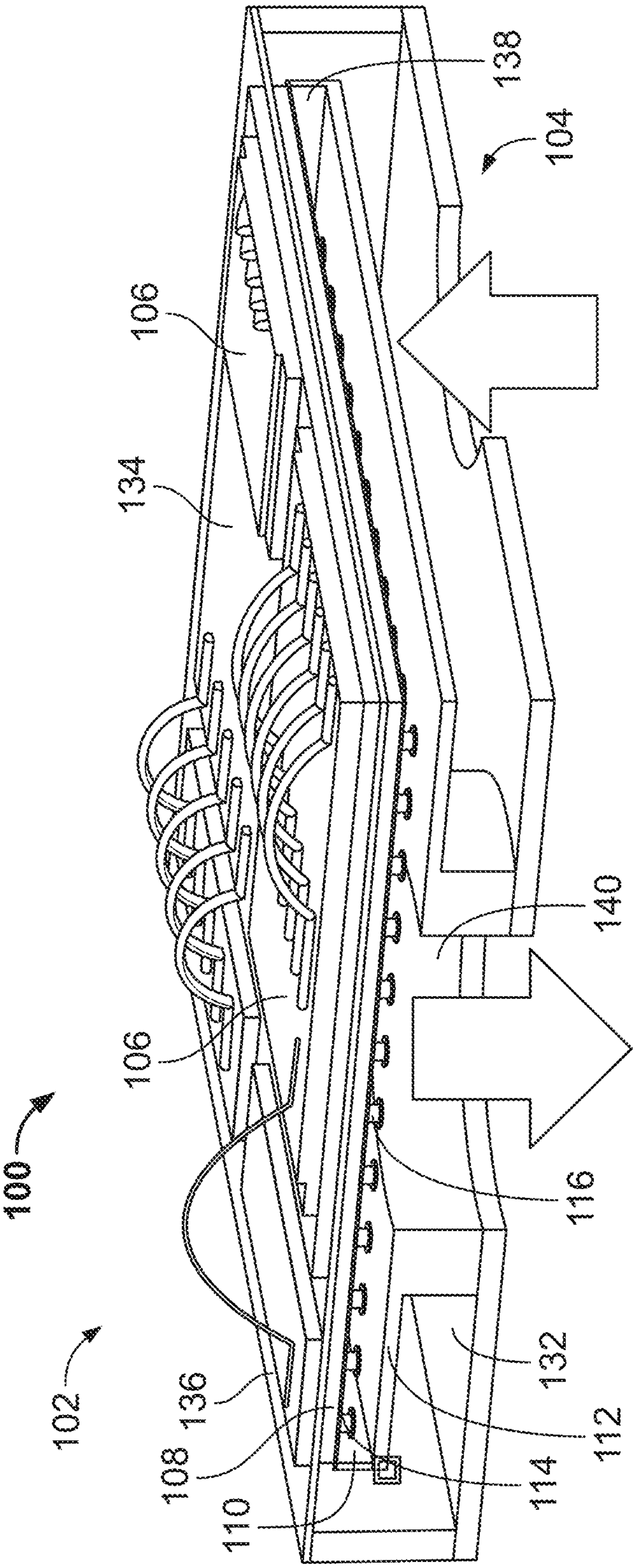
FIG. 1 is a schematic illustration of a portion of an electronic device and a thermal management system.

As used herein, the terms "microstructure" and "micro" refer to structures having dimensions less than about 1 millimeter (mm). For example, microstructure heat exchangers include heat exchangers in which at least one fluid flows in lateral confinements with an average dimension of less than about 1 mm. While some embodiments herein include microstructures, it is understood that the principles may be applied to larger scale structures without departing from some aspects of the disclosure.

In various aspects, phase routing evaporative microstructure heat exchanger systems and elements thereof, methods of assembling the elements to produce the phase routing evaporative microstructure heat exchanger systems, methods of producing the system elements, 2D and 3D packaged electronics incorporating the phase routing evaporative microstructure heat exchanger systems, and methods of cooling 2D and 3D packaged electronics using the phase routing evaporative microstructure heat exchanger systems are disclosed.

Embodiments of the microstructure heat exchanger systems include features configured to generate and maintain a plurality of droplets on one or more evaporative surfaces, enabling significantly higher heat exchange coefficients compared to existing heat exchanger systems and devices. In various aspects, the disclosed microstructure heat exchanger systems include porous membranes provided with arrays of micropillars configured to generate and maintain single droplets on each micropillar of the array. In some aspects, each micropillar is provided with features to further enhance the heat dissipative properties of each micropillar droplet including, but not limited to, at least one additional re-entrant surface feature and nanocoatings.

Moreover, in some aspects, at least one of the micropillars has a non-circular shape and produces a non-spherical droplet. Evaporation from the non-spherical droplet, due to the change in meniscus curvature, exhibits very different interfacial mass transport features from spherical droplets. For example, the non-spherical droplet has a higher local vapor concentration gradient that drives faster vapor diffusion at more curved regions. For adiabatic systems, the total evaporation rate from a triangular-based droplet is enhanced by 13% compared to a spherical droplet with the same perimeter and liquid-vapor interfacial area. For microdroplets on heated pillars, triangular-based droplets provide a higher heat transfer coefficient than spherical droplets at a supplied heat flux of 500 $W/cm^2$.

Also, surfaces with nanocoatings have been shown to improve two-phase heat transfer performance through enhanced wettability and reduced interfacial thermal resistance in comparison to surfaces without nanocoatings. There is a direct relationship between the surface wettability and the interfacial thermal transport property for an evaporating thin film liquid. Specifically, nanocoatings on an evaporative surface may increase wettability and reduce interfacial thermal resistance. As a result, the nanocoatings may reduce the evaporation rate of liquid on the surface. For example, compared to a pure silicone substrate, addition of one and three layers of graphene reduces the evaporation rate by 38% and 62% times, respectively, with the same temperature gradient between hot and the cold sources. In addition, an equilibrated contact angle of argon is increased from 7° to 17° with increasing number of graphene layers.

Some embodiments provide a hollow micropillar array for an evaporative heat exchanger and methods for optimizing the micropillar array. For example, a mathematical model is used to optimize the shape of each hollow micropillar in the array to achieve desired heat transfer performance. The model includes defining the geometric shape, determining a droplet shape that is generated by the micropillar shape, completing the micropillar and droplet shapes, performing an evaporative simulation, and performing an algorithm on the shapes to determine the optimal shape. The arrangement of the micropillar array is also optimized based on the shape of the micropillars. Some micropillars arrangements provide non-axisymmetric droplets to achieve the maximum evaporative heat transfer coefficient.

Various aspects of the methods, heat exchanger systems, hollow pillars, and nanocoatings are described in additional detail below.

FIG. 1 is a schematic illustration of a portion of an electronic device 100 and a thermal management system 102. The thermal management system 102 includes a heat exchanger 104 including a liquid delivery layer 108 and an evaporation layer 110. The heat exchanger 104 is thermally coupled to at least one electronic component 106 of the electronic device 100 and is configured to remove heat from the electronic component 106 via a heat transfer medium. In the illustrated embodiment, the liquid delivery layer 108 is thermally coupled to the electronic device 100 such that the heat transfer medium receives heat from the electronic component 106. Suitably, the heat transfer medium may be a phase changing fluid and the heat exchanger 104 may operate as a two-phase cooling system. In other embodiments, the heat exchanger 104 may utilize a different cooling method such as single-phase cooling and/or air cooling without departing from some aspects of this disclosure.

Figure 2:
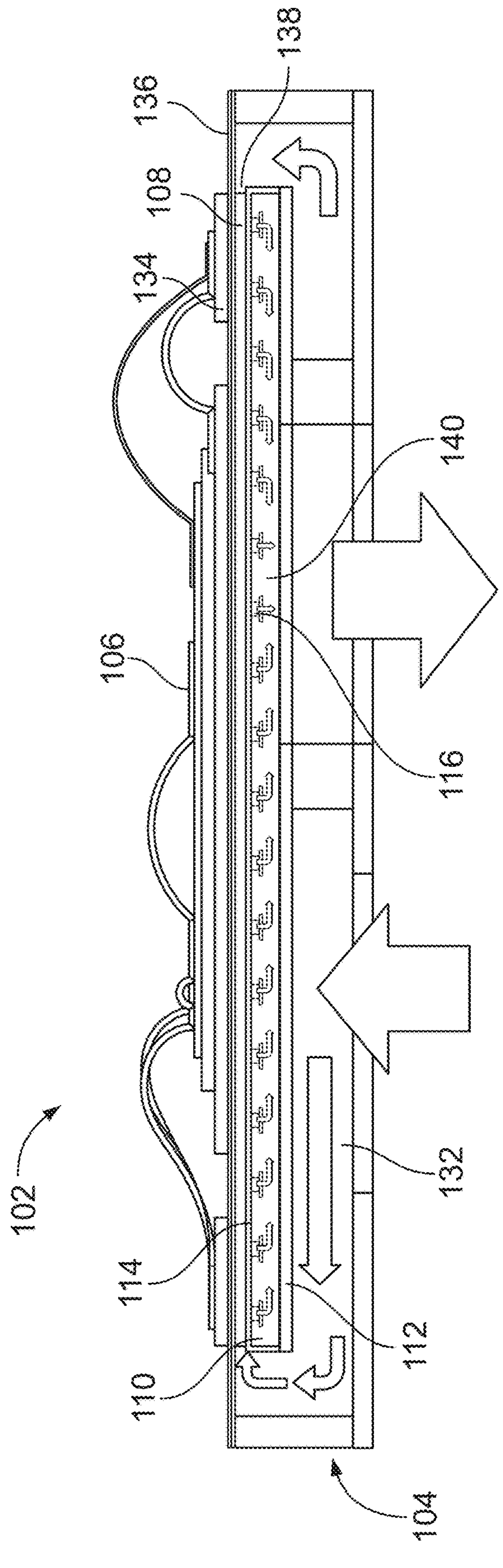
FIG. 2 is a cross-sectional view of the electronic device shown in FIG. 1 and the thermal management system shown in FIG. 1, illustrating fluid flow through the thermal management system.
Figure 3:
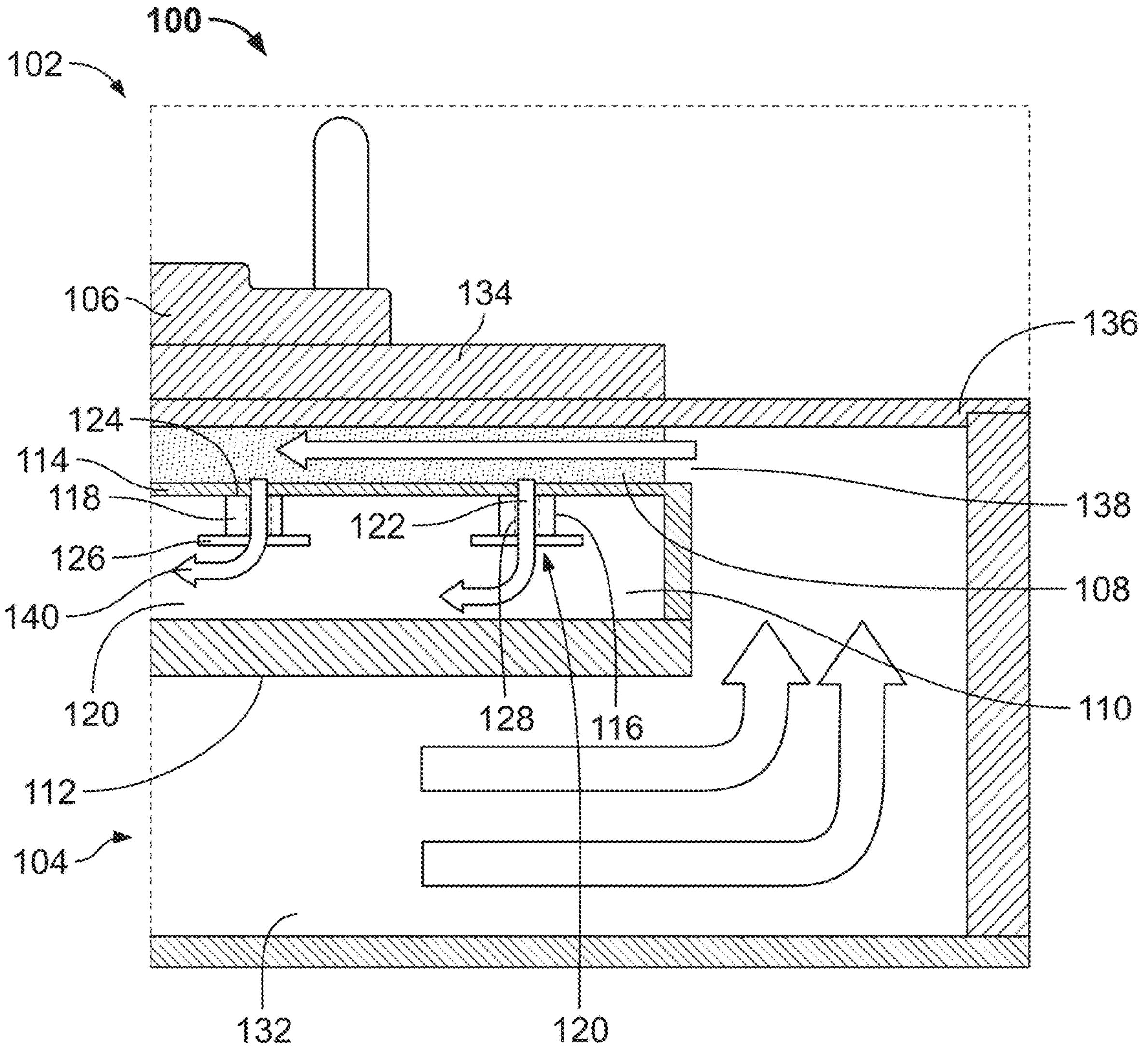
FIG. 3 is an enlarged cross-sectional view of the thermal management system shown in FIGS. 1 and 2, illustrating evaporation of liquid from pillars.

With reference to FIGS. 2 and 3, the evaporation layer 110 includes a first surface 112 coupled to the liquid delivery layer 108, a second surface 114 opposite the first surface 112, and a plurality of hollow pillars 116 extending from the second surface. Each hollow pillar 116 includes a stem 118, an evaporation surface 120, and a pore 122. Each stem 118 has a proximal end 124 joined to the second surface 114 and a distal end 126 opposite the proximal end 124. Each pore 122 extends through the stem 118 from the proximal end 124 to the distal end 126 and is configured to channel liquid received from the liquid delivery layer 108 through the stem 118 to the evaporation surface 120.

Each evaporation surface 120 is on the distal end 126 of the stem 118 of one of the hollow pillars 116. In some embodiments, the evaporation surfaces 120 may be annular surfaces on a rim of the stems 118. For example, the evaporation surfaces 120 may be defined solely by the thickness of the wall 128. In other embodiments, at least one evaporation surface 120 may be defined by a flange or cap extending around the wall 128 and/or extending radially inward from the wall 128. Such a flange or cap may at least partially form a head of the hollow pillar 116.

The hollow pillars 116 are configured to receive the continuous flow of the liquid from the liquid delivery layer 108 and evaporate the continuous flow of liquid from droplets maintained on the evaporation surfaces 120. Each evaporation surface 120 has a wetting efficiency and is configured to maintain a droplet on the respective hollow pillar within a contact line where the meniscus meets the evaporation surface 120. The contact line may have a length of less than about 0.0314 mm. In some embodiments, the wetting efficiency is at least about 95%. In addition, a non-circular evaporation surface 120 has a perimeter-to-area ratio that is at least 10% greater than the area of a circular surface, as a percentage of the circular area.

At least one of the hollow pillars 116 may have a non-circular cross-sectional shape. For example, the hollow pillars 116 may have a cross-sectional shape that is square, rectangular, triangular, star-shaped, polygonal, star-shaped polygon, airfoil shaped, streamline shaped, and any other suitable non-axisymmetric shapes. Accordingly, the hollow pillars 116 may be non-axisymmetric and may provide non-spherical droplets. As described further herein, the shape of the hollow pillars 116 controls the pinning of the droplets and may be designed to control the evaporation and/or heat transfer of the droplets.

For example, a droplet with a square or a triangle cross-sectional shape yields a larger contact line length and therefore a greater portion of thin film region, due to the larger perimeter-to-solid liquid interfacial area ratio of non-circular shapes such as triangles and squares compared to circles. For droplets evaporating on a circular micropillar, the total evaporating area along the liquid-vapor interface is distributed uniformly across different film thicknesses. In contrast, the fraction of the total evaporating area possessing a smaller film thickness is significantly higher for a non-circular droplet. Correspondingly, the fraction of the total liquid-vapor interfacial area evaporating with a large liquid thickness (e.g., greater than 95% of the maximum droplet height) is also reduced as the shape of the droplet contact line changes from circle to square and triangle.

A change in the distribution of the liquid-vapor interfacial area over different film thickness, e.g., by changing the shape of the hollow pillar 116, results in a substantial change in the total thermal resistance of the droplet because the conduction resistance inside the droplet is proportional to the liquid film thickness. Specifically, the effective film thickness and conduction resistance of the evaporating droplet are reduced when the shape of the droplet contact line is changed from circle to a square and from a circle to a triangle.

In addition, the local evaporation rate is affected significantly by several factors including the area fraction of the thin film region, the local curvature, the interfacial temperature, and the wall confinement effect. Non-spherical droplets exhibit sharper curvatures near both the contact line (i.e., r/R 1) and the corner regions (i.e., locations with a higher azimuth angle). At locations with a small apparent contact angle θa, the percentage of evaporating liquid-vapor area with smaller film thickness (e.g., less than 10% of the maximum droplet height) is higher, resulting in a smaller effective thickness across the droplet. The average heat transfer coefficients for triangular and square microdroplets with a heat flux of 500 W/cm$^2$ are 15% and 21% higher than the average heat transfer coefficient for a capped spherical droplet with a heat flux of 500 W/cm$^2$. When the heat flux is increased from 500 W/cm$^2$ to 1000 W/cm$^2$, the conduction resistance is the dominant resistance during the evaporation process.

Moreover, triangular microdroplets have a higher heat transfer performance compared to circular microdroplets at a constant temperature. For example, for microdroplets evaporating on a substrate at 60° C., the evaporation flux of microdroplets on a triangular micropillar is 8% larger than the microdroplets on a square micropillar and 45% larger than the microdroplets on a circular micropillar. When the substrate temperature is raised to 98° C., the enhancement in the heat transfer coefficient for the microdroplet evaporating on a triangular micropillar is 46% larger than the microdroplets on a square micropillar and 71% larger than the microdroplets on a circular micropillar.

Also, each hollow pillar 116 has a height defined between the proximal end 124 and the distal end 126 of the stem 118. The height of the hollow pillar 116 provides a diffusive space below the droplet and an increase in the total evaporation rate of the pillar in comparison to structures with lesser heights or droplets confined on substantially flat surfaces. For example, a ratio of the height of at least one hollow pillar 116 to a width of the hollow pillar may be in a range of about 0.1 to about 20 depending on the working conditions of the heat exchanger. In some embodiments, the height of the hollow pillar 116 is determined based on the temperature condition of the hollow pillar 116 to provide a desired evaporation rate. For example, in some embodiments, the hollow pillar 116 may reach approximately 98° Celsius during operation and the height of the hollow pillar may be selected to provide a desired evaporation rate at a 98° Celsius operating temperature of the hollow pillar. Moreover, the height may be determined to balance a conduction resistance of the poruous pillar 116 which increases when the height increases and a diffusion transport resistance of the droplet which decreases when the height of the hollow pillar increases.

Figure 58:
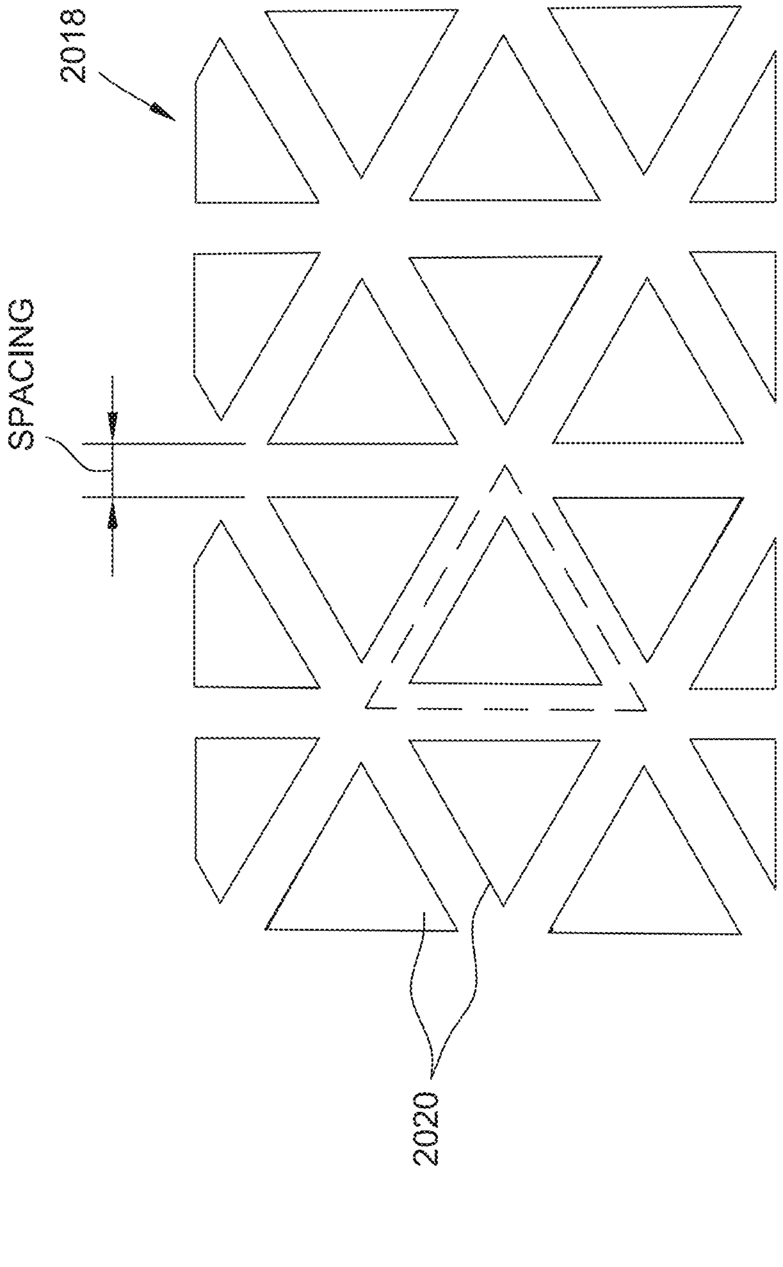
FIG. 58 is a top view of a micropillar array with uniform spacing between triangular micropillars.

As shown in FIG. 58, in some embodiments, an array 2022 includes hollow micropillars 2024, 2026 having different heights. The arrangement of the array 2022 can be determined based on the heights or final shapes of the micropillars 2024, 2026. For example, final shapes and heights of each micropillar 20224, 2026 may be entered into a simulation model to determine the arrangement of the array 2022 that will provide the maximum heat transfer coefficient. In the example, the micropillars 2024 have a greater height than the micropillars 2026. The micropillars 2024 and the micropillars 2026 are arranged in alternating rows. The arrangements of the micropillars 2024, 2026 may provide a greater heat transfer coefficient than other arrangements because the different heights and the arrangement of the micropillars allow for a spacing between the heads of the micropillars that enables efficient droplet pinning and evaporation and maximizes the number of the micropillars that are on the surface. The arrangement of the micropillars 2024, 2026 may be selected by simulations in which conditions such as the height of the micropillars, the spacing of the micropillars, and/or the rows or alignment of the micropillars is varied.

Referring to FIG. 1, in some embodiments, the thermal management system 102 includes microstructures and the heat exchanger 104 is configured to function as a microheat exchanger. For example, the height of each hollow pillar 116 may be less than about 1 millimeter. In some embodiments, the height of at least one hollow pillar 116 is in a range of about 1 nanometer to about 100 micrometers.

Also, in some embodiments, the liquid provided by the liquid delivery layer 108 is dialectic. Accordingly, the heat exchanger 104 may be used with sensitive electronic components 106 without risk of the liquid damaging the components. As described further herein, the configuration of the hollow pillars 116 enables the use of low surface tensions fluids such as dialectic liquids because the hollow pillars are able to maintain and evaporate droplets of dialectic liquids.

During operation of the heat exchanger 104, the heat transfer medium is used to remove heat from the electronic components 106. At least some of this heat is dissipated as the droplets evaporate. In addition, at least some of this heat is transferred through the evaporation layer 110 as the liquid is provided by the liquid delivery layer 108. Accordingly, the hollow pillars may be heated to temperatures greater than ambient temperature. The higher temperature provides a higher evaporation rate and higher heat transfer performance than materials at ambient temperature. The temperature is controlled to be less than the saturation temperature to prevent boiling of the liquid. For example, in some embodiments, at least one of the hollow pillars 116 is heated to a temperature close to the saturation temperature of the working liquid (98° Celsius for water at atmosphere).

As the liquid is provided to the evaporation layer 110, the liquid evaporates continuously from droplets that pin on the tops of the hollow pillars 116. As droplets evaporate from the tops of the hollow pillars 116, additional liquid is continuously supplied through the pores 122 of the hollow pillars 116 into the pinned droplets. The continuous supply of liquid is controlled to maintain the shape of the interface of the droplet and maintain the inlet pressure of the liquid at the pore 122. For a droplet pinned to a non-circular evaporation surface 120, the equilibrium geometry associated with minimum total surface energy is no longer a capped sphere, but instead assumes an irregular or non-axisymmetric shape where the total and local curvature vary significantly along the liquid-vapor interface. The local curvature of the droplet's liquid-vapor interface influences the droplet's capillary pressure, vapor pressure along the meniscus, and the internal circulation inside the droplet, and by extension the droplet's evaporation characteristics. For example, the non-circular evaporation surface 120 provides a droplet with a higher evaporation rate per unit area than circular surfaces because (1) the ratio of contact line length of the droplet to droplet surface area is greater for droplets on the non-circular surfaces than for droplets on circular surfaces, and (2) non-axisymmetric droplets provided the non-circular evaporation surface 120 have larger effective thin film regions compared to circular droplets.

The operating parameters of the system 102 are controlled to maintain stable droplets on the hollow pillars 116 as a continuous flow of liquid is provided to the evaporation layer 110. For example, the dynamic flow conditions of the liquid provided by the liquid delivery system are controlled to provide a desired maximum retention pressure based at least in part on the geometry of the hollow pillars 116. In various aspects, the shapes of the hollow pillars 116 allow the system 102 to maintain stable droplets on the hollow pillars using both high surface tension liquids and low surface tension liquids because the liquids are pinned on the edges of the hollow pillars. The stable droplets maintained on the hollow pillars 116 are characterized by a convex meniscus shape with liquid-vapor interfacial area that provides relatively high heat transfer coefficients as compared to existing materials.

Without being limited to any particular theory, sharp geometric features may restrict contact line advancement of low surface tension liquids (e.g., oils) due to the change in interfacial energy along the solid-liquid interface. As liquid advances along a solid edge, the contact line stays pinned until external forces overcome the wetting energy barrier. The fundamental mechanisms that hinder low surface tension liquids in wetting over a solid edge are typically characterized by pinning/de-pinning criteria that are influenced by one or more geometrical features of the solid edge including, but not limited to, edge angle and edge roundness. The hollow pillars 116 are shaped and constructed to enhance the area fraction of the thin film evaporation region (transition and intrinsic) and to increase the average heat transfer coefficient.

Referring again to FIGS. 1-3, the thermal management system 102 is configured to transfer heat generated by electronic components 106 packaged in a 2D arrangement. The thermal management system includes the liquid delivery layer 108 coupled to a 2D device layer and further coupled to a manifold layer 132. The electronic components 106 are coupled to a metallic conducting and bonding layer 134 bonded to a thermally conductive substrate 136 including, but not limited to, a Si substrate with a thin $SiO_2$ layer. The thermally conductive substrate 136 is further coupled to the liquid delivery layer 108. As illustrated in FIG. 3, the thermally conductive substrate 136 is coupled to an exposed face of the liquid delivery layer opposite to the face coupled to the evaporation layer.

Referring again to FIGS. 1-3, the manifold layer 132 is coupled to the liquid delivery layer 108 at a liquid inlet 138 configured to conduct a liquid coolant from a coolant source to the liquid delivery layer. The manifold layer 132 is further coupled to the evaporation layer 110 at a vapor outlet 140 configured to conduct vapor evaporated from the coolant droplets retained on the array of hollow micropillars away from the liquid delivery layer.

Referring again to FIG. 3, in use, the liquid is delivered to the liquid delivery layer 108 via the liquid inlet 138. The liquid is conducted through the manifold layer 132 via bulk flow, and passes through the liquid delivery layer 108. The array of hollow pillars 116 receive liquid from the liquid delivery layer 108 and form droplets. The liquid is vaporized from the surface of the droplets and is continuously replenished by the liquid delivery layer 108. The vaporized fluid released from the evaporation layer 110 passes out of the heat exchanger via the vapor outlet 140 of the manifold layer 132.

A method of evaporating a liquid using the thermal management system 102 includes providing a flow of liquid to the evaporation layer 110. The liquid flows through the pores 122 of the hollow pillars 116 and wicks out of the pores 122 along the evaporation surfaces 120. In the illustrated embodiment, the pore 122 is positioned in the center of the evaporation surface 120 and the liquid wicks radially outward from the pore to an edge circumscribing the evaporation surface. The liquid is pinned at the edge and forms a droplet with a contact line extending along the edge and circumscribing the evaporation surface 120. The method also includes maintaining a droplet on each of the hollow pillars 116 and evaporating the flow of the liquid from a surface of the droplet which is maintained on each pillar.

Figure 4:
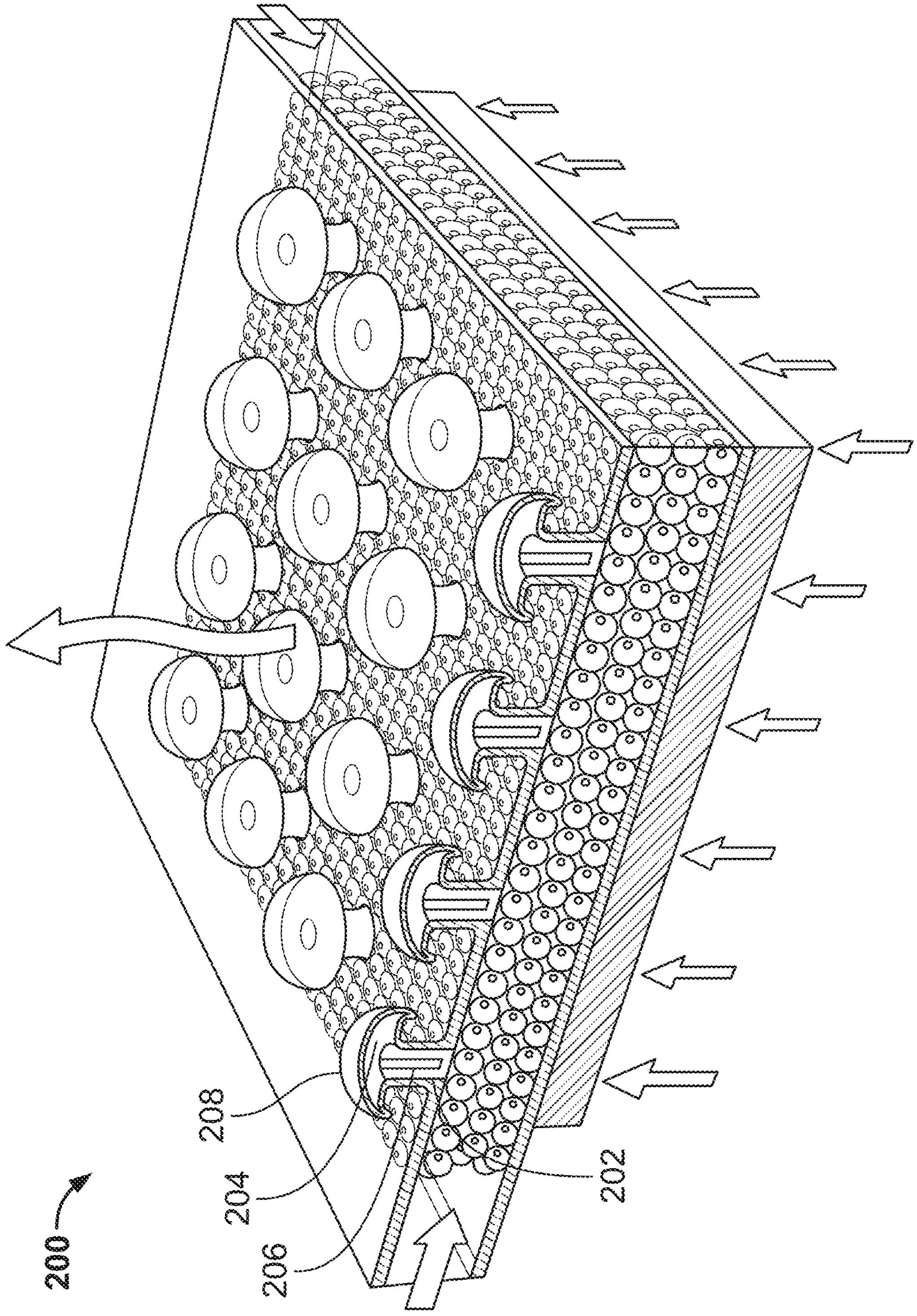
FIG. 4 is an example embodiment of an array of hollow pillars for evaporating droplets.
Figure 5:
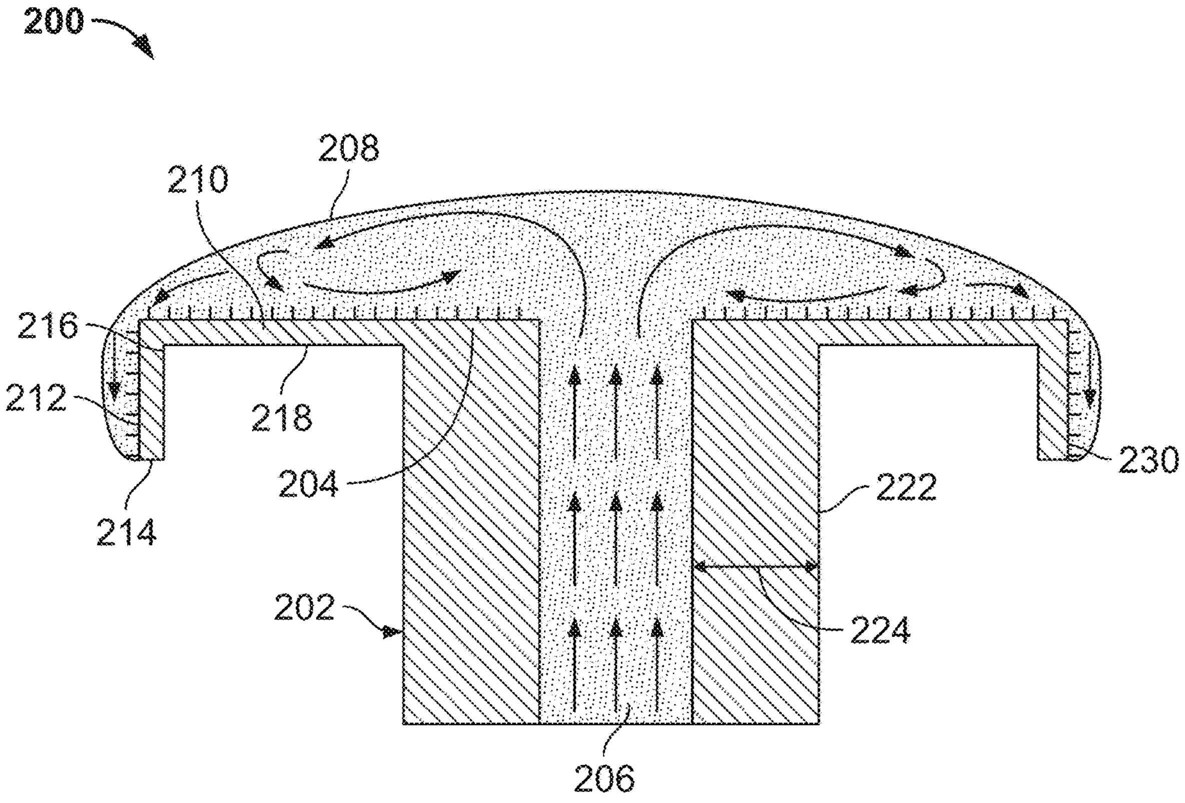
FIG. 5 is a schematic cutaway view of one of the hollow pillars of the array shown in FIG. 4.
Figure 6:
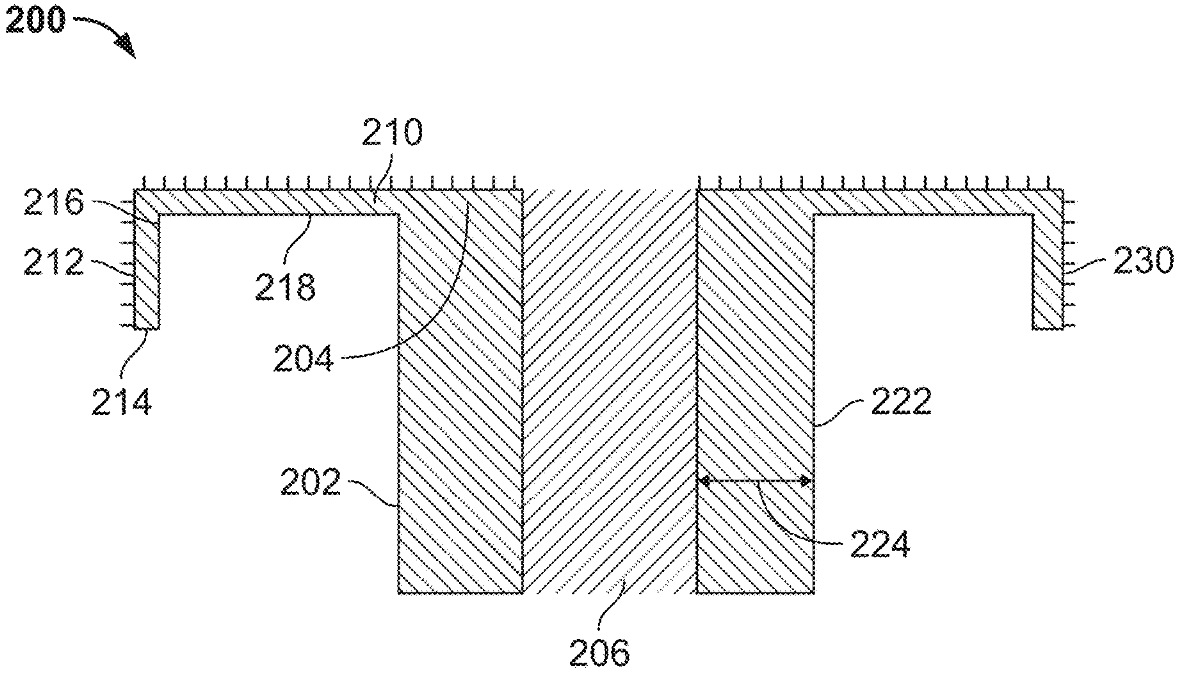
FIG. 6 is a cross-sectional view of the hollow pillar in FIG. 5.

FIG. 4 is an example embodiment of an array of hollow pillars 200 for evaporating droplets. FIG. 5 is a schematic cutaway view of one of the hollow pillars 200. FIG. 6 is a cross-sectional view of the hollow pillar 200 shown in FIG. 5. As illustrated in FIGS. 4-6, each hollow pillar 200 includes a stem 202 and a head 204 attached to a distal end of the stem. The stem 202 includes a wall 222 defining a pore 206 that channels liquid through the hollow pillar 200. The wall 222 has thickness 224 defined between an inner surface defining the pore 206 and an outer surface spaced radially outward from the inner surface.

The head 204 has an evaporation surface 208 that is in flow communication with the pore 206. The pore 206 is positioned in the center of the evaporation surface 208 such that the liquid wicks radially outward from the pore and forms a droplet on the evaporation surface 208. The evaporation surface 208 is configured to maintain the droplet on the hollow pillar within a contact line. For example, the wetting efficiency is at least 95% and the contact line has a length less than about 0.0134 mm.

The head 204 includes a flange 210 extending around and radially outward from the stem 202. The flange 210 at least partially forms the evaporation surface 208. The flange 210 includes an edge 212 that circumscribes and extends downward from the evaporation surface 208. The flange 210 also includes a bottom edge 214 and an inner edge 216. The bottom edge 214 extends radially inward from the outer edge 212 and to the inner edge 216. The inner edge 216 extends upward from the bottom edge 214. An overhang surface 218 extends from the inner edge 216 to the stem 202.

The flange 210 extends the area of the evaporation surface 208 and provides further control of the evaporation of the liquid from the droplet. For example, at least a portion of the fluid-vapor interface of the liquid provided to the evaporation surface 208 is pinned at a contact line defined by the outer edge 212 under certain flow conditions. In addition, the edges 212, 214, 216 are relatively sharp edges (e.g., the edges define an angle of at least about 85°). Accordingly, the edges 212, 214, 216 may act as reentrants to pin at least a portion of the fluid-vapor interface at a contact line defined by the edges under certain flow conditions. The term reentrant, as used herein, refers to an abrupt turn in a direction of a surface wetted by a fluid.

Referring to FIG. 5, the evaporation surface 208 may further include a nanocoating 230 on at least a portion of the evaporation surface 208 that is wetted by the liquid. For example, the nanocoating 230 may be on a portion of the evaporation surface 208 defined by the flange 210 and a portion of the evaporation surface 208 defined by a rim of the stem 202. In various aspects, the nanocoating includes a plurality of nanostructures attached to the flange and/or rim surface. Non-limiting examples of suitable nanostructures include nanoparticles such as nanotubes, nanowires, nanospheres, nanoshells, and any other suitable nanoparticle. The nanocoatings may be formed from any suitable material including, but not limited to, carbon and gold. In various aspects, the nanocoatings are configured to functionalize the wetted surfaces of the micropillar to enhance liquid pinning and evaporation. In various aspects, the functionalized flange and/or rim surfaces are configured to enhance droplet formation and retention by the hollow pillars 200.

In other aspects, the nanocoatings 230 on the evaporation surface 208 can yield reduced interfacial thermal resistance and higher effective contact area at a solid liquid interface which enhances liquid pinning and evaporation. The nanocoatings 230 may be constructed from materials, including but not limited to gold nanotubes, gold nanowires, graphene oxide (GO) layers, and reduced graphene oxide (RGO) layers, by surface engineering with 2D nanomaterials to enable high specific surface area. The nanocoatings 230 can be designed to increase two-phase heat transfer flux in comparison to the heat transfer flux from surfaces without nanocoatings.

Figures 7A, 7B, 7C, 7D, 7E, 7F:
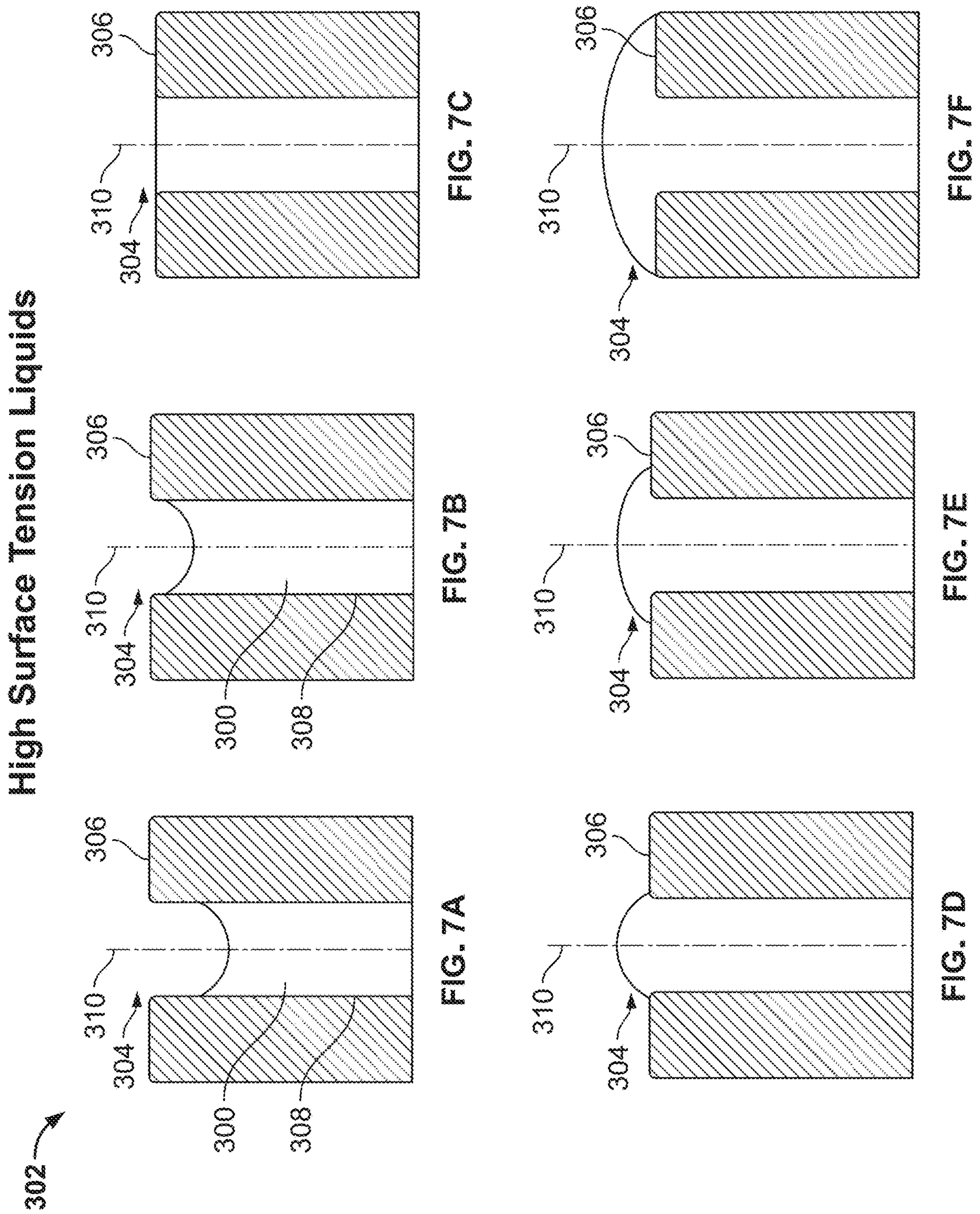
FIGS. 7A-7P are a series of schematic diagrams illustrating various stages of fluid transport through an inner channel of a hollow pillar.
Figures 7G, 7H, 7I, 7J:
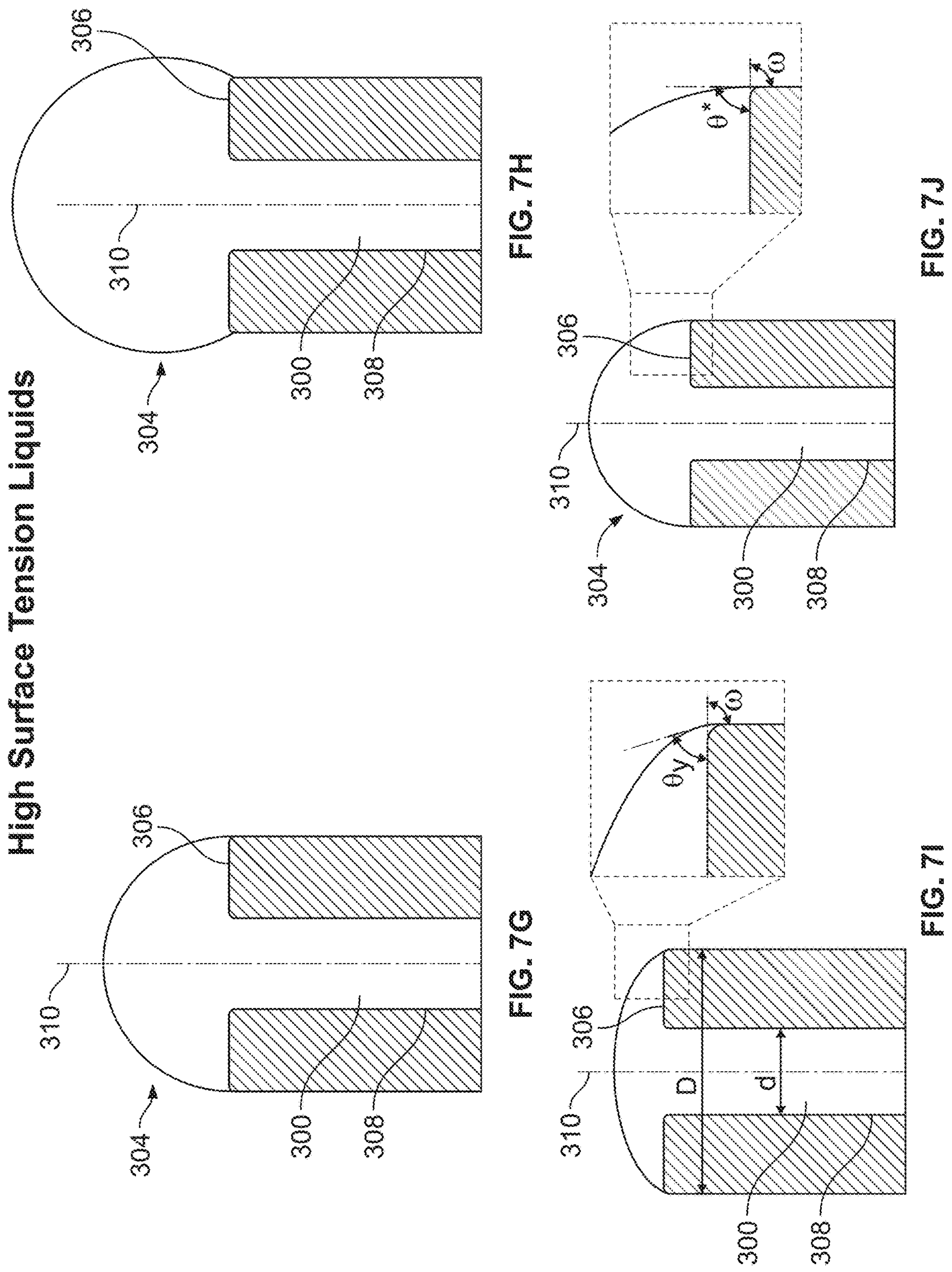
Figures 7K, 7L, 7M, 7N, 7O, 7P:
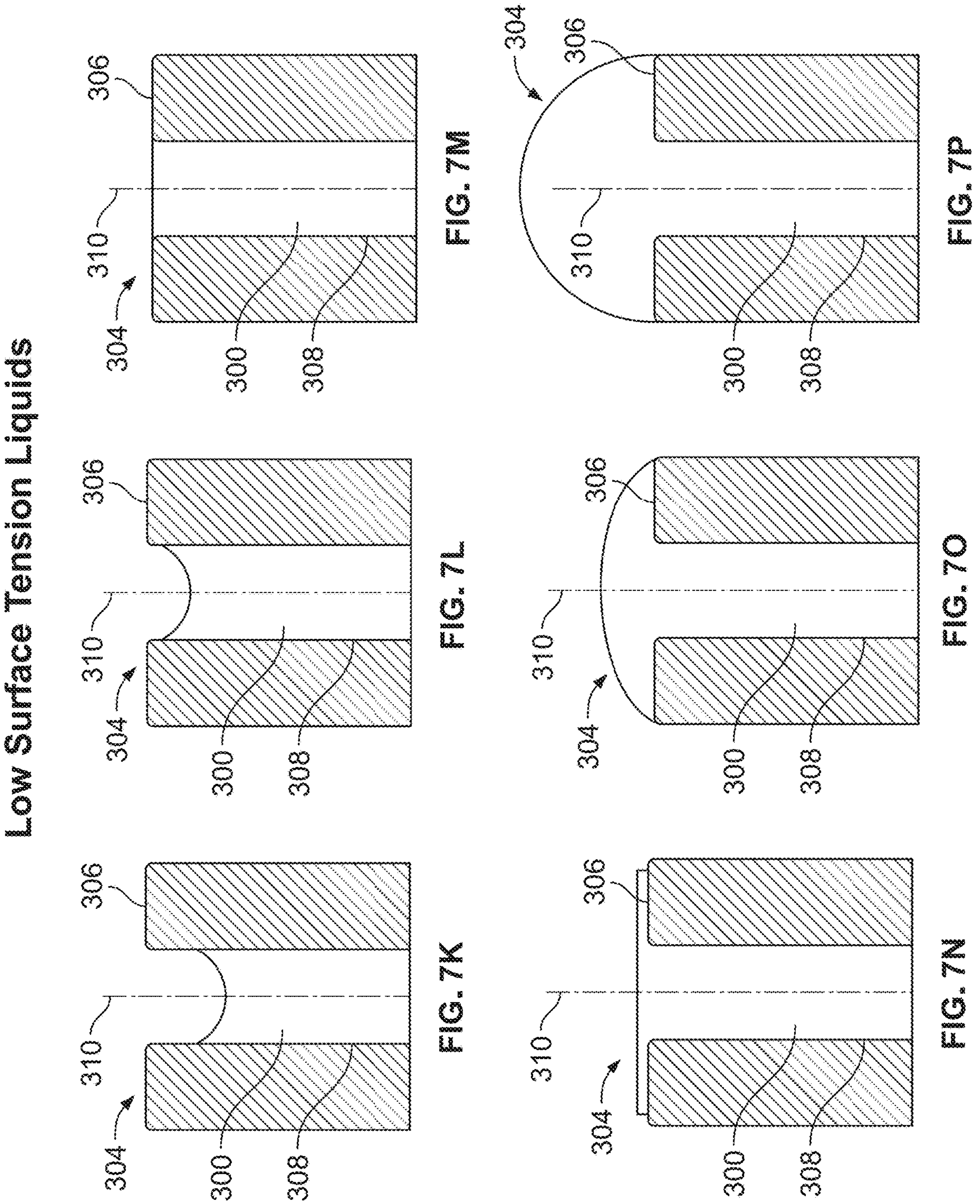

FIGS. 7A-7P are a series of schematic diagrams illustrating various stages of fluid transport through an inner channel 300 of a hollow pillar 302. The hollow pillar 302 includes an evaporation surface 304, an outer edge 306 circumscribing the evaporation surface, and an inner edge 308 at least partially defining the inner channel 300 extending along a longitudinal axis 310 of the micropillar. In the illustrated embodiment, the hollow pillar 302 has a circular cross-section. In other embodiments, the hollow pillar 302 may be any shape including, for example, and without limitation, square and triangular (e.g., triangles and pseudotriangles). In addition, in the illustrated embodiment, the hollow pillar 302 is a microstructure and the width of the inner channel 300 is less than about 1 micrometer.

As illustrated in FIGS. 7A-7P, a liquid advances through the inner channel 300 of the hollow pillar 302 by means of by capillary action, defined herein as fluid flow within narrow spaces impelled by intermolecular adhesive forces between the liquid and surrounding surfaces and/or surface tension of the liquid. FIGS. 7A-7P illustrate the action of the liquid advancing through and being retained by the hollow pillar 302 and shows the contact line dynamics for a wetting liquid as it advances toward the external orifice in one aspect. Without being limited to any particular theory, the behavior of liquids advancing through pillars differs significantly depending at least in part on the composition of the liquid. In particular, liquids characterized as high surface tension (i.e. polar) liquids and low surface tension (i.e. non-polar) liquids behave differently within micropillars, as illustrated in FIG. 7. Non-limiting examples of high surface tension liquids include polar liquids such as water. Non-limiting examples of low surface tension liquids include non-polar liquids such as dielectric fluids.

In some aspects, the hollow pillar 302 is configured to retain liquids characterized by relatively small equilibrium contact angles. In addition, the hollow pillar 302 is configured to enhance liquid retention and to inhibit bursting behavior. Accordingly, the hollow pillar 302 may be used with low surface tension fluorinated compounds including, but not limited to, dielectric liquids. In addition, the hollow pillar 302 may be used to enhance the performance of phase management-related applications requiring stable liquid-vapor interfaces, including, but not limited to, thermal management applications. In some embodiments, the hollow pillar 302 facilitates the routing and phase management of dielectric working fluids for application in heat exchangers. By way of non-limiting example, the hollow pillar 302 may be combined with a composite heat sink to produce an integrated two-phase thermal management system.

After the liquid advances onto the evaporation surface 304, the liquid is pinned by the edge of the hollow pillar 302 and forms a droplet on the hollow pillar 302. The ability of the edges to pin the spreading liquid is determined based on the apparent angle of the liquid relative to the evaporation surface 304. Specifically, the contact line of the liquid will stay fixed at the edge as long as the apparent contact angle does not exceed a critical value θ*. The critical value θ* is provided by the following equation:

$$\theta^*=\theta_y+\pi-\varphi \quad \text{Eqn. (1)}$$

where $\theta_y$ is the intrinsic contact angle of the liquid and substrate, and φ is the edge angle.

Notably, the contact angles measured for liquid advancing and receding on a substrate are different from the static contact angle, as shown by the following relationship:

$$\theta_{adv}>\theta_y>\theta_{rec} \quad \text{Eqn. (2)}$$

where $\theta_{adv}$ is the advancing contact angle and $\theta_{rec}$ is the receding contact angle. This difference is known as the contact angle hysteresis (CAH), which indicates whether the surface is "sticky" or "slippery". For example, surfaces with high roughness generally exhibit high CAH, and it becomes more difficult to remove a pre-wetted liquid from such surfaces (e.g., water-oil displacement). For example, such hysteresis may be induced by microscopic defects whose geometric discontinuities resist liquid spreading. Similarly, design of superoleophobic surfaces with microstructure patterns (e.g., micropillars and micromeshes) follows the same principle where the sharp edge feature of each individual microstructure prohibits spilling of the liquid down the sides of these microstructures. Therefore, the liquid rests partially on the solid substrate and partially on the interstitial air gap. This results in a higher effective interfacial energy at the bottom interface and therefore a tendency to reduce the contact area with the bottom substrate, i.e., to increase the apparent contact angle.

Referring again to FIG. 7, the high surface tension liquid pins along the inner edge 308, as illustrated in FIG. 7B, until a convex meniscus is formed along the inner channel 300, as illustrated in FIG. 7D. As additional fluid advances through the inner channel 300 via capillary action, the convex meniscus enlarges and advances along the evaporation surface 304, as illustrated in FIG. 7E, until the meniscus is pinned along the outer pillar edge 306 as shown in FIG. 7F. With increasing liquid pressure, the pinned meniscus expands and that yields a minimum radius of curvature and a maximum Laplace pressure, as illustrated in FIG. 7G. The pinned meniscus forms a hemispherical shape if the evaporation surface is circular and non-axisymmetric shape if the evaporation surface is non-circular. The growing meniscus forms a pressure barrier attributed to changes in meniscus interfacial area. A resistive capillary force opposes any further increases in surface area and associated increases in total interfacial energy, and consequently prevents the meniscus from further expansion beyond the outer edge 306 of the hollow pillar 302. A convex meniscus implies a positive pressure of the wetting liquid with respect to the non-wetting phase (i.e., $p_w>p_{nw}$). While the contact line of the meniscus is pinned at the outer edge of the micropillar, the apparent contact angle, $\theta_a$ between the evaporation surface 304 and meniscus liquid-vapor interface increases from the intrinsic contact angle of the liquid and micropillar material, $\theta_y$ (FIG. 7I) to a critical angle, $\theta^*$ as the meniscus expands (FIG. 7J). Once the meniscus forms the critical angle, $\theta^*$, depinning at the liquid contact line occurs and the meniscus continues to advance along the outer pillar edge, causing a breakdown of the meniscus structure termed "burst". As described above, high surface tension liquids, characterized as having finite intrinsic angles $\theta_y$ are capable of sustaining stable menisci with shapes exceeding a hemisphere, as illustrated in FIG. 7H.

For low surface tension (e.g., non-polar) liquids, the liquid initially wicks through the inner channel 300 of the hollow pillar 302, as illustrated in FIG. 7K. The liquid contact line then pins along the inner edge 308, as illustrated in FIG. 7L until the liquid levels rise above the inner pillar edge, as illustrated in FIG. 7M. For low surface tension liquids, the meniscus immediately advances from the inner edge 308 to the outer pillar edge 306, as illustrated FIG. 7N until the liquid is again pinned at the outer pillar edge as illustrated in FIG. 7O. The meniscus expands from the pinned contact line at the outer pillar edge 306 and forms a hemispherical shape on a circular evaporation surface 304 and a non-axisymmetric shape on a non-circular evaporation surface. The meniscus expands until the apparent contact angle, $\theta_a$ between the evaporation surface 304 and the meniscus liquid-vapor interface reaches the critical angle $\theta^*$. The critical angle $\theta^*$ may be 90° for the low surface tension liquids, as illustrated in FIG. 7P.

Without being limited to any particular theory, existing free energy theory typically describes the wetting barrier at a solid edge using a thermodynamic approach, where the total surface free energy of a liquid meniscus is calculated with the contact line pinned at, or exceeding, the edge. The contact line of the droplet will by nature stick to the solid edge to maintain a minimum energy state. By performing a free energy analysis, three distinct wetting regions along the sharp edge can be delineated based on the intrinsic contact angle $\theta_y$ and edge angle $\varphi$. In State 1, the contact angle $\theta_y$ is greater than the edge angle $\varphi$ and the liquid is at a local minimum energy state. In the local minimum energy state, the contact line pinned at the edge regardless of the apparent contact angle. In a State 2, the relationship between the contact angle $\theta_y$ and the edge angle $\varphi$ is represented by the following equation:

$$\varphi > \theta_y + 2\tan^{-1}\left(\frac{\cot\theta y}{2}\right) \quad \text{Eqn. (3)}$$

In State 2, the liquid be pinned at the edge as long as the apparent contact angle is less than the critical value $\theta^*$ (see Eqn. (1)). Once such a threshold is reached, the liquid will spread over the sharp edge, with the contact line moving steadily down the adjacent surface and the liquid will be in State 3. In State 3, the relationship between the contact angle $\theta_y$ and the edge angle $\varphi$ is represented by the following equation:

$$\theta_y < \varphi < \theta_{y+}2\tan^{-1}\left(\frac{\cot\theta y}{2}\right) \quad \text{Eqn. (4)}$$

In State 3, the liquid is pinned with the same criteria described in State 2. After the critical contact angle is reached, however, the contact line immediately advances over the sharp edge and spreads spontaneously down the adjacent surface, leading to a "swelling-collapsing" behavior of liquid abruptly flowing across and down the edge.

Without being limited to any particular theory, based on the free energy method, the liquid will always try to minimize its total surface free energy and resist the movement across the a reentrant feature such as an edge. In some embodiments, a nanocoating is applied to the surface to provide a superoleophilic surface (e.g., a surface including an oil with a contact angle less than 10°) which will shift the wetting characteristic of the surface from state 3 to state 1 or provide a superoleophobic surface (e.g., a surface including an oil with a contact angle greater than about 150°) which will shift the wetting characteristic of the surface from state 3 to state 3.

Figure 8:
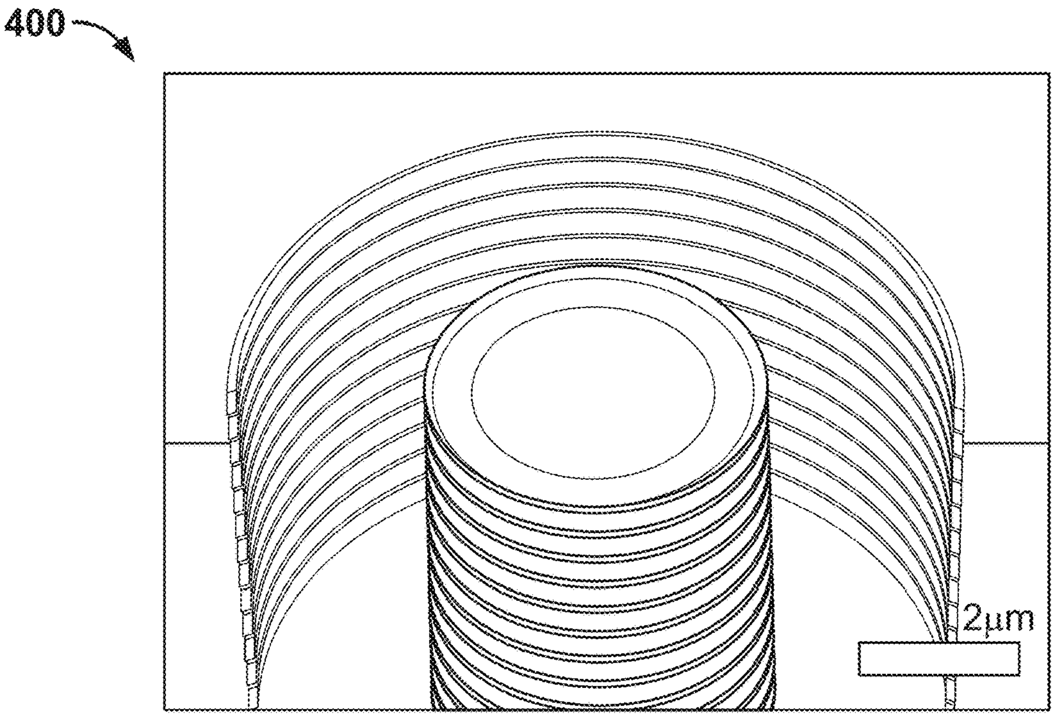
FIG. 8 is a schematic view of a hollow pillar with portions removed to show an inner pore of the pillar.
Figure 9:
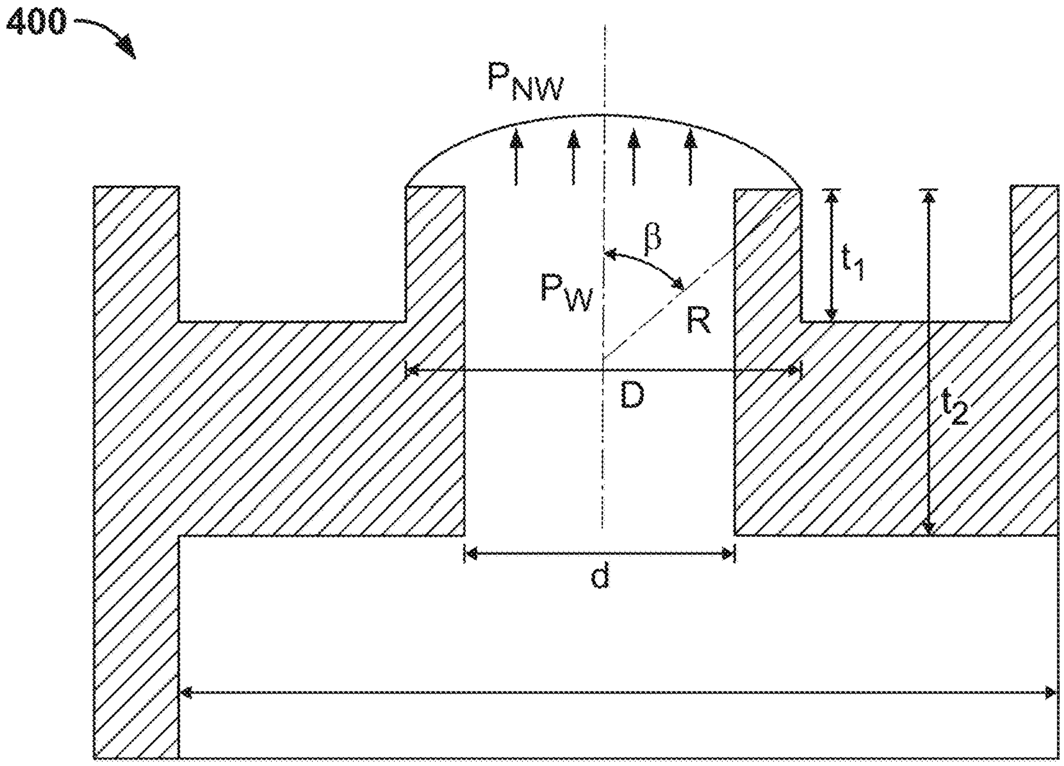
FIG. 9 is a schematic cross-sectional view of the hollow pillar illustrating liquid advancing through the hollow pillar.
Figure 10A:
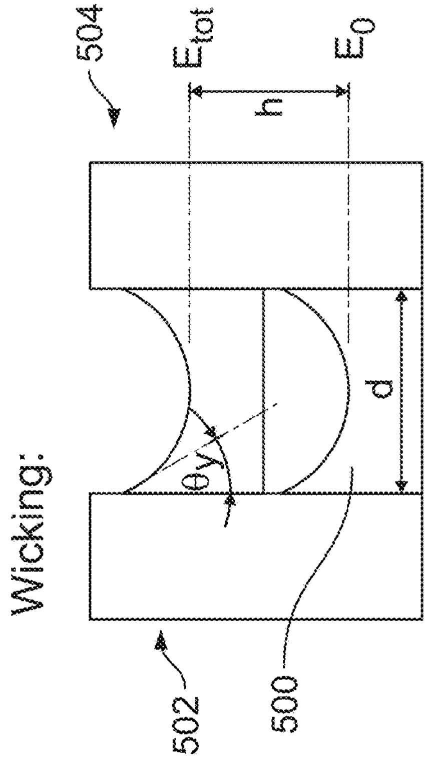
FIGS. 10A-10D are a series of schematic diagrams illustrating various stages of fluid movement through an inner channel of a micropillar.
Figure 10B:
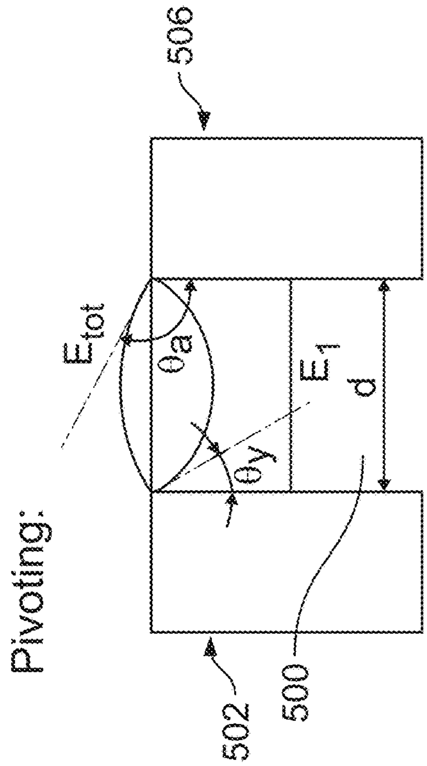
Figure 10C:
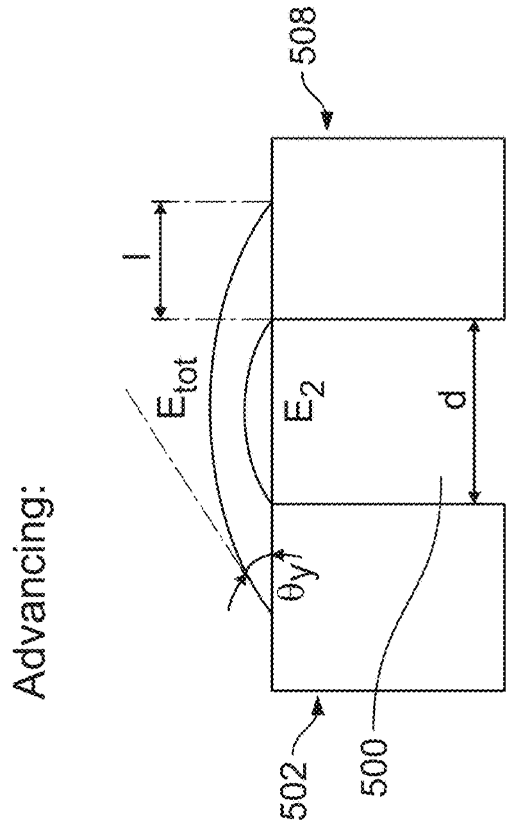
Figure 10D:
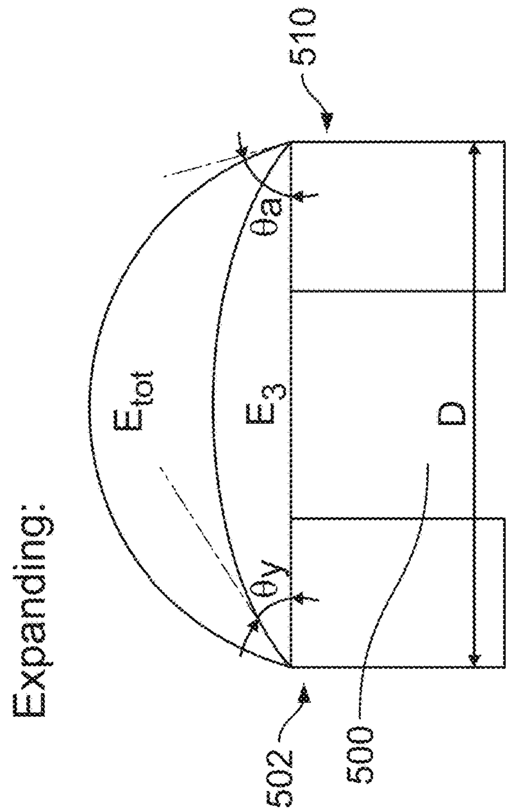

FIG. 8 is a perspective view of a hollow pillar 400. FIG. 9 is a schematic cross-sectional view of the hollow pillar 400 illustrating liquid advancing through the hollow pillar. The wicking, pinning, and bursting behavior of liquid along the hollow pillar 400 can be analyzed theoretically using a free energy approach with a quasi-static assumption. The advancement of liquid along the hollow micropillar can be described in terms of the total free energy as expressed in the following equation:

$$E_{tot}=E_{sl}+E_{sa}+E_{la}=A_{sl}\gamma_{sl}+A_{sa}\gamma_{sa}+A_{la}\gamma_{la} \quad \text{Eqn. (5);}$$

where the surface tension $\gamma_{sl}$, $\gamma_{sa}$, and $\gamma_{la}$ are correlated by the following equation (Young's equation):

$$\gamma_{sa}=\gamma_{sl}+\gamma_{la}\cos\theta_y \quad \text{Eqn. (6).}$$

The corresponding pressure in the liquid associated with the change in total free surface energy can then be obtained by taking the derivative of Eq. (1) with respect to the liquid volume and substituting Eq. (2) to obtain Eqn. (7):

$$\Delta p = -\frac{dE_{tot}}{dV_l} = \gamma_{la}\left(\cos\theta_y\frac{dA_{sl}}{dV_l} - \frac{dA_{la}}{dV_l}\right). \quad \text{Eqn. (7)}$$

FIGS. 10A-10D are a series of schematic diagrams illustrating various stages of fluid movement through an inner channel 500 of a micropillar 502. The stages for the meniscus formed on the micropillar 502 include a wicking stage 504, a pivoting stage 506, an advancing stage 508, and an expanding stage 510. Without being limited to any particular theory, both high surface tension and low surface tension liquids advance through the narrow inner channel 500 formed within the micropillar 502 during the wicking stage 504. The liquids may initially have a concave surface profile and then form the meniscus during the pivoting stage 506 as the meniscus transitions from the concave surface profile to a convex surface profile. The liquid travels across a surface of the micropillar 502 and undergoes pinning of the meniscus to the sharp outer edge of the micropillar at the end of the meniscus advancing stage 508. The pinned meniscus continues to grow during the expanding stage 510. The physical phenomena related to meniscus pinning, referred to herein as the canthotaxis effect, provide a thermodynamic framework for describing the resistance of wetting liquids spreading along sharp edges. As described by the canthotaxis effect, a bursting event is triggered as the apparent contact angle ($\theta_x$) (see FIG. 7I) of a growing meniscus exceeds a critical angle ($\theta^*$) (see FIG. 7J) and overwhelms the forces maintaining the meniscus pinned to the sharp outer edge of the micropillar. The overwhelming forces cause the liquid to advance beyond the sharp outer edge and onto the outer surface of the micropillar. Without being limited to any particular theory, it is believed that once the liquid pins to the sharp outer edge of the micropillar, the expanding meniscus system maintains a minimum energy state until the contact angle ($\theta_y$) of the liquid at the sharp outer edge exceeds the critical value $\theta^*=\omega+\theta_y$, where $\omega$ is the angle between the top surface and outer pillar edge, which is assumed to be 90°. During the process of liquid penetrating through the micropillar, the change of total free surface energy and liquid volume at different stages (e.g., wicking, pivoting, advancing, and expanding) can be calculated using the associated geometric boundary conditions, assuming that the meniscus maintains the geometry of a capped sphere. The following equations (Eqns. (8)-(15)) can be used to determine total free surface energy and liquid volume according to the free energy approach described above:

$$E_{tot} = E_0 - \pi dh\gamma_{la}\cos\theta_y. \quad \text{Eqn. (8)}$$

$$V_{tot} = V_0 + \frac{\pi}{4}d^2h. \quad \text{Eqn. (9)}$$

$$E_{tot} = E_1 - \frac{\pi d^2}{2}\left(\frac{1-\sin\theta_y}{\cos^2\theta_y} - \frac{1-\sin\theta_x}{\cos^2\theta_x}\right)\gamma_{la}. \quad \text{Eqn. (10)}$$

$$V_{tot} = V_1 + \frac{\pi d^3}{24}\left[\frac{(1-\sin\theta_y)^2(2+\sin\theta_y)}{\cos^3\theta_y} - \frac{(1-\sin\theta_x)^2(2+\sin\theta_x)}{\cos^2\theta_x}\right]. \quad \text{Eqn. (11)}$$

$$E_{tot} = E_2 + \pi(l^2+dl)\left(\frac{2-2\cos\theta_y}{\sin^2\theta_y} - \cos\theta_y\right)\gamma_{la}. \quad \text{Eqn. (12)}$$

$$V_{tot} = V_2 + \frac{\pi(1-\cos\theta_y)^2(2+\cos\theta_y)}{24\sin^3\theta_y}\left[(d+2l)^3 - d^3\right]. \quad \text{Eqn. (13)}$$

$$E_{tot} = E_3 + \frac{\pi D^2}{2}\left(\frac{1-\cos\theta_x}{\sin^2\theta_x} - \frac{1-\cos\theta_y}{\sin^2\theta_y}\right)\gamma_{la}. \quad \text{Eqn. (14)}$$

$$V_{tot} = V_3 + \frac{\pi D^3}{24}\left[\frac{(1-\cos_x)^2(2+\cos\theta_x)}{\sin^3\theta_x} - \frac{(1-\cos\theta_y)^2(2+\cos\theta_y)}{\sin^3\theta_y}\right]. \quad \text{Eqn. (15)}$$

Combining and substituting the equations (14) and (15) for $E_{tot}$ and $V_{tot}$ of the droplet at each stage from FIG. 10 into Eqn. (9) enables a theoretical prediction of the pressure variation as liquid flows through the hollow micropillar 502 at the various stages. After the critical contact angle is formed along the pillar edge, the liquid eventually collapses, as described above. Since the edge angle of the outer edge of each micropillar is 90°, a spherical drop profile cannot be satisfied during the meniscus collapse as the pillar edge will protrude into the liquid outline. Therefore, the liquid bursts suddenly and spreads instantaneously down the side of the micropillar. On the side of the micropillar 502, the contact line splits into a capped sphere sitting on the top of the micropillar and a falling film surrounding the outer micropillar wall. The free energy during burst is irregular due to the irregular shape deformation of the liquid spreading down the micropillar. However, once liquid burst has occurred, no additional pressure barrier remains, and subsequent flow is again dominated by the contact line friction as the liquid spreads freely over the entire substrate. The corresponding liquid pressure variation after the burst can then be calculated, again using the change in free energy, as described in Eqns. (12) and (13).

Accordingly, the stability at which a liquid is pinned to an enclosing edge of the micropillar varies in proportion to the intrinsic contact angle, corresponding to the solid-liquid interfacial energy. For liquids with infinitesimal intrinsic contact angles, the maximum Laplace pressure, corresponding to the pressure at burst, occurs as the meniscus assumes a critical angle approximated as $\theta^*=90°$, corresponding to a hemispherical meniscus shape, shown illustrated in FIG. 7G by way of non-limiting example. For liquids with finite equilibrium contact angles (i.e., lower solid-liquid interfacial energy), the meniscus can be expanded beyond a hemispherical shape that corresponds to $\theta^*=90°+\theta_y$ prior to the burst event, as illustrated in FIG. 7H by way of non-limiting example. In this case, the pressure at burst falls below the maximum Laplace pressure.

Figure 11:
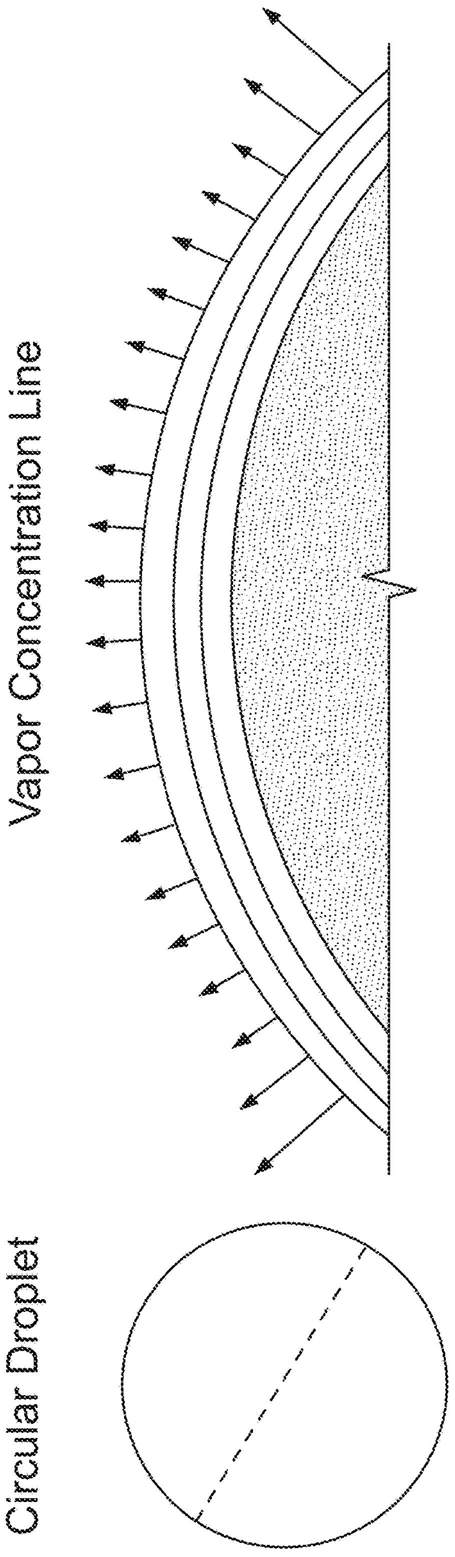
FIG. 11 is a schematic drawing of the curvature and vapor concentration line of a droplet on a circular evaporation surface.
Figure 12:
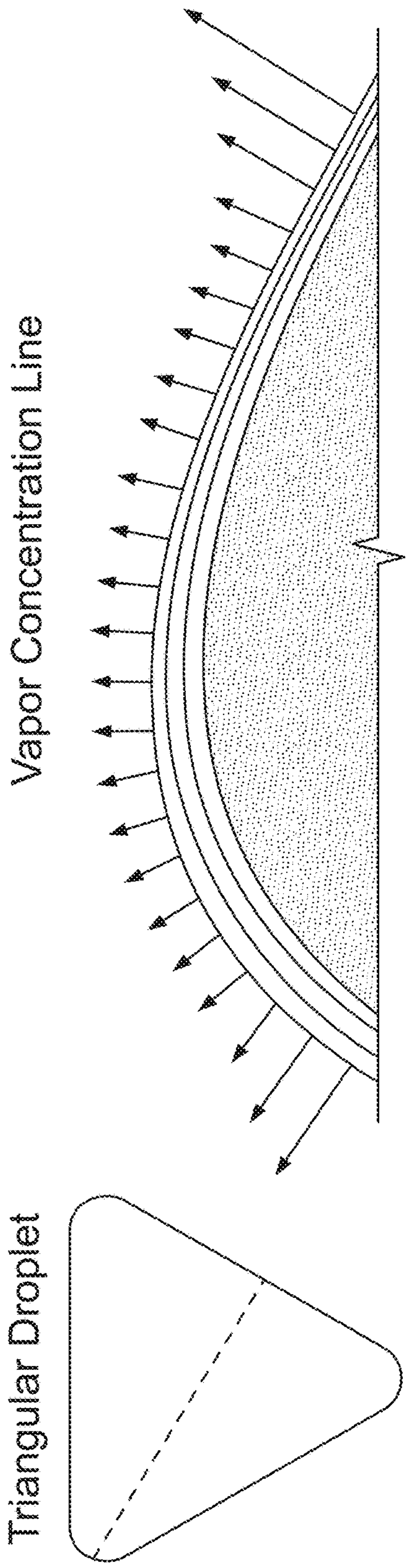
FIG. 12 is a schematic drawing of the curvature and vapor concentration line of a droplet on a triangular evaporation surface.

The free energy approach with quasi-static assumptions was also used to assess the effect of different shapes of the flange face and associated column cross-sectional profile on droplet characteristics. In some aspects, the micropillar's non-axisymmetric shape may yield a higher evaporation rate. Exploring the evaporation flux distribution in a drop with circular and triangular contact area demonstrated that larger curvature provided by the triangular contact area leads to larger evaporation flux and that larger mean curvature leads to larger total evaporation as shown in FIGS. 11 and 12. Specifically, FIG. 11 shows the curvature and vapor concentration line of a droplet on a circular evaporation surface. FIG. 12 shows the curvature and vapor concentration line of a droplet on a triangular evaporation surface. FIGS. 11 and 12 show an increased evaporation flux for the triangular evaporation surface with the larger mean curvature. For example, a triangular droplet evaporates 17% faster than a hemispherical droplet with same liquid-vapor interfacial area and same base perimeter at room temperature and atmosphere. When the substrate temperature is raised to 98° C., the enhancement in the heat transfer coefficient for the microdroplet evaporating on a triangular micropillar is 46% larger than the microdroplets on a square micropillar and 71% larger than the microdroplets on a circular micropillar.

Thermodynamic analysis provides a sound explanation of most liquid retention behaviors at sharp edges, subject to at least several assumptions. The thermodynamic analysis described herein is based on a quasi-static assumption that the process is reversible. In other words, the system is always at its local energy minimum state and the change in total free energy is contributed to only by the change in total surface energy, as expressed by:

$$dG_{tot} = -SdT + Vdp + \sum_i \mu_i dn_i + \sigma dA = \sigma dA \qquad \text{Eqn. (16)}$$

where μ is the chemical potential and a is the surface tension. However, the quasi-static assumption may not be appropriate for highly non-equilibrium conditions (e.g., a high flow rate) where the liquid meniscus shape deformation by external perturbation cannot be instantaneously restored by surface tension force, resulting in systems characterized by transient states and non-constant system pressures. By way of non-limiting example, for high flow rate fluid displacement in porous media, an interfacial meniscus may progress abruptly through a geometric throat, unbounded by the quasi-static thermodynamic descriptions. In this case, the progression contact angle θ exceeds the intrinsic contact angle $\theta_y$.

Without being limited to any particular theory, the onset of non-equilibrium behavior of droplets during transient states may be identified using Capillary number, defined as:

$$Ca = \frac{\mu v}{\gamma} \qquad \text{Eqn. (17)}$$

where μ is the viscosity, v is the velocity, and γ is the surface tension.

For flows characterized by $Ca<10^{-5}$, the liquid flow can be generally analyzed using free-energy methods with the quasi-static assumption as described above. For flows characterized by Ca>0.001, a liquid droplet pinned on a cylindrical tube typically undergoes an anisotropic expansion with a higher growth rate in the vertical direction. Therefore, the droplet expands beyond the maximum shape predicted by the quasi-static thermodynamic analysis before spilling occurs. At Ca>0.001, the high flow rate reduces the wetting barrier at the sharp solid edge.

In various aspects, the behavior of the liquid contact line of droplet expansion and advancing along a sharp edge may be evaluated in terms of interfacial molecular interactions in addition to the thermodynamic free energy methods described above. By studying the interfacial interactions in the vicinity of the contact line region and developing a general description for liquid spreading on arbitrary curved surfaces, contact line dynamics and flow behavior over a variety of geometries, such as porous media and textured substrates that contain "macroscopic" sharp features may be predicted.

Without being limited to any particular theory, it is thought that wetting behavior of droplets on solid substrates are not governed by phenomena occurring over the entire wetted area, but instead are governed by interfacial interactions within a very small region positioned beneath the liquid juxtaposed with the contact line. This one-dimensional (1D) contact line, when magnified at the nanoscale, becomes a 3D space (~10 nm) where the molecules of the liquid, solid, and gas phases interact. These interactions drive the contact line and bulk liquid to advance along the solid surface.

In a stable state for wetting on a planar substrate, the local contact angle $\theta_{local}$ is equivalent to the apparent contact angle $\theta_a$. If $\theta_{local}$ exceeds the intrinsic contact angle $\theta_y$, the molecular solid-liquid interaction near the contact line will be stronger than the liquid-liquid interaction, resulting in a spontaneous jump and absorption of the interfacial liquid molecule into the solid molecules. The absorption of the interfacial liquid molecule leads to the further avalanche of the bulk liquid molecules and consequently spreading of the liquid on the solid substrate. This process will proceed until $\theta_{local}=\theta_y$, where a force balance is reached for interfacial liquid molecules. For wetting over a curved edge, the same principle should hold as long as the apparent contact angle $\theta_a$ is less than the critical contact angle θ* defined above in Eqn. (1). In this case, the contact line will always reach a local equilibrium state with $\theta_{local}=\theta_y$, while the apparent contact angle $\theta_a$ is larger than the intrinsic contact angle $\theta_y$. However, under some limited conditions, the contact line may spontaneously spill along the solid substrate when $\theta_a$ exceeds θ*, despite the fact that its local contact angle is less than its local equilibrium state (i.e., $\theta_{local}<\theta_y$).

Without being limited to any particular theory, four distinct stages of the droplet evaporation process have been identified including: (I) an initial small decrease in droplet height and contact angle with a fixed radius; (II) a subsequent fast decrease in droplet height and contact angle with a fixed radius; (III) a decrease in droplet height and radius with a fixed contact angle; and (IV) the complete disappearance of the droplet. For systems characterized by a solid substrate beneath a droplet that prohibits vapor diffusion from downward, a capacitance factor as a function of contact angle to calculate the reduction in evaporation rate induced by the solid substrate was previously defined. In addition to vapor diffusion, a number of other mechanisms are also thought to be involved in droplet evaporation. Non-uniform evaporation from the contact line of the droplet are thought to induce microconvection effects in both the liquid and vapor domain that accelerate the evaporation process. It has also been demonstrated that a temperature gradient along the droplet surface, induced by the self-cooling of the droplet surface during evaporation, may subsequently induce thermocapillary flow inside a droplet.

Figure 14:
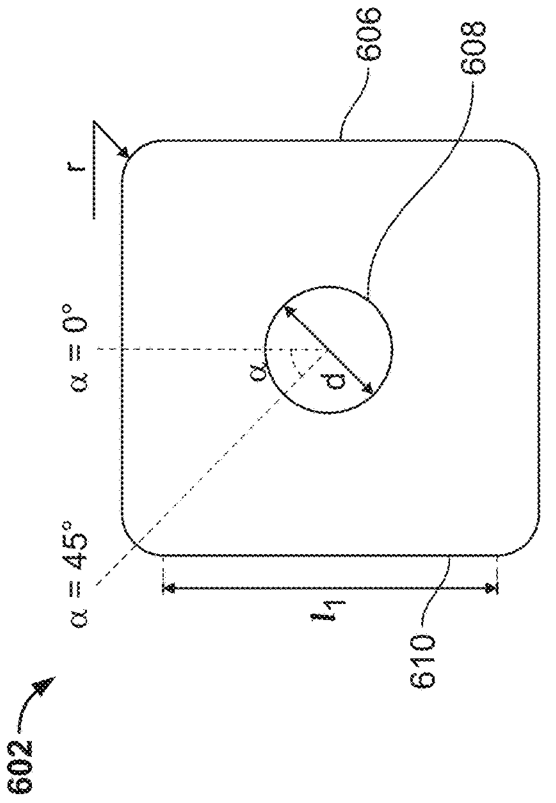
FIG. 14 is a top view of a hollow pillar having a square cross-sectional shape.
Figure 13:
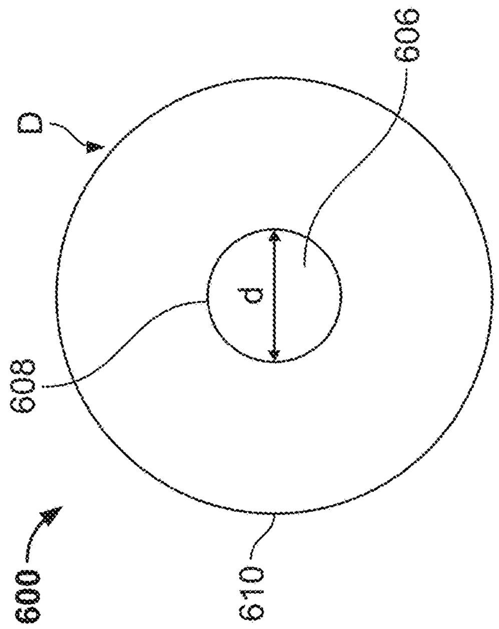
FIG. 13 is a top view of a hollow pillar having a circular cross-sectional shape.
Figure 15:
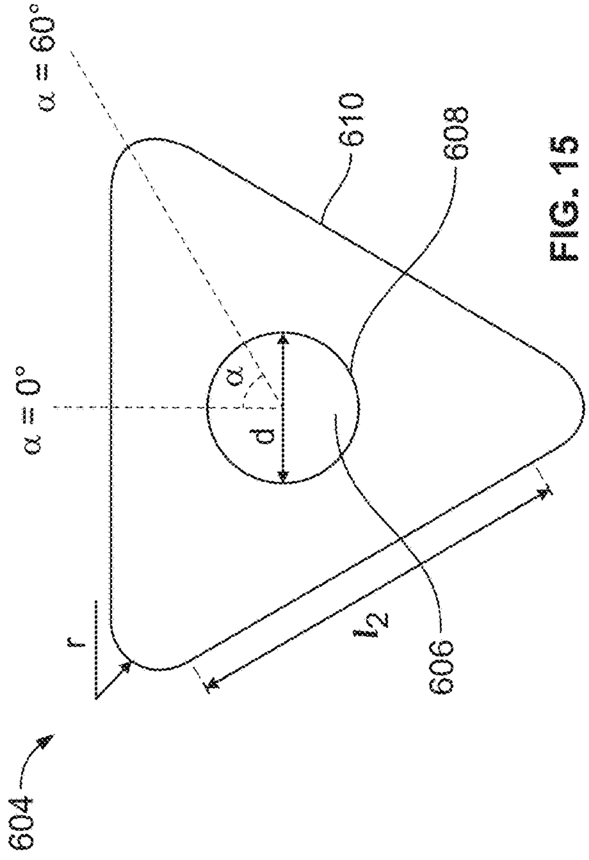
FIG. 15 is a top view of a hollow pillar having a triangular cross-sectional shape.

FIGS. 13-15 are top views of hollow pillars 600, 602, 604 having different cross-sectional shapes. Specifically, hollow pillar 600 has a circular cross-sectional shape. Hollow pillar 602 has a square cross-sectional shape. Hollow pillar 604 has a triangular cross-sectional shape. Each hollow pillar 600, 602, 604 has an inner edge 608 defining a pore 606 and an outer edge 610 spaced radially outward from the inner edge.

Micro/nano structures are able to tune and control droplet geometries including, but not limited to, non-axisymmetric droplet contact area shapes such as squares, rectangles, hexagons, octagons, dodecagons, star shaped polygon, airfoil shape, and streamlined shape using advanced micro- and nano-fabrication techniques. The non-axisymmetric contact areas typically result in non-spherical droplet geometries for which the liquid-vapor interface is not amenable to characterization using existing explicit function such as the expressions described above. In particular, the curvature of the liquid-vapor interface is non-uniform over the droplet surface, which leads to drastic changes of the local vapor concentration gradient in the azimuthal direction, as illustrated in FIGS. 13-15.

Compared to spherical droplets where the local evaporative flux distribution is solely determined by the contact angle, non-axisymmetric droplets exhibit different evaporative transport characteristics, since both the shape and proximity to the triple phase contact line (TPL), defined as the region where the solid, liquid, and vapor molecules interact, influences the droplet's evaporation flux. Without being limited to any particular theory, droplets with a higher mean interface curvature evaporate at a faster rate, which is a desirable characteristic for an efficient evaporative cooling system.

Figure 16:
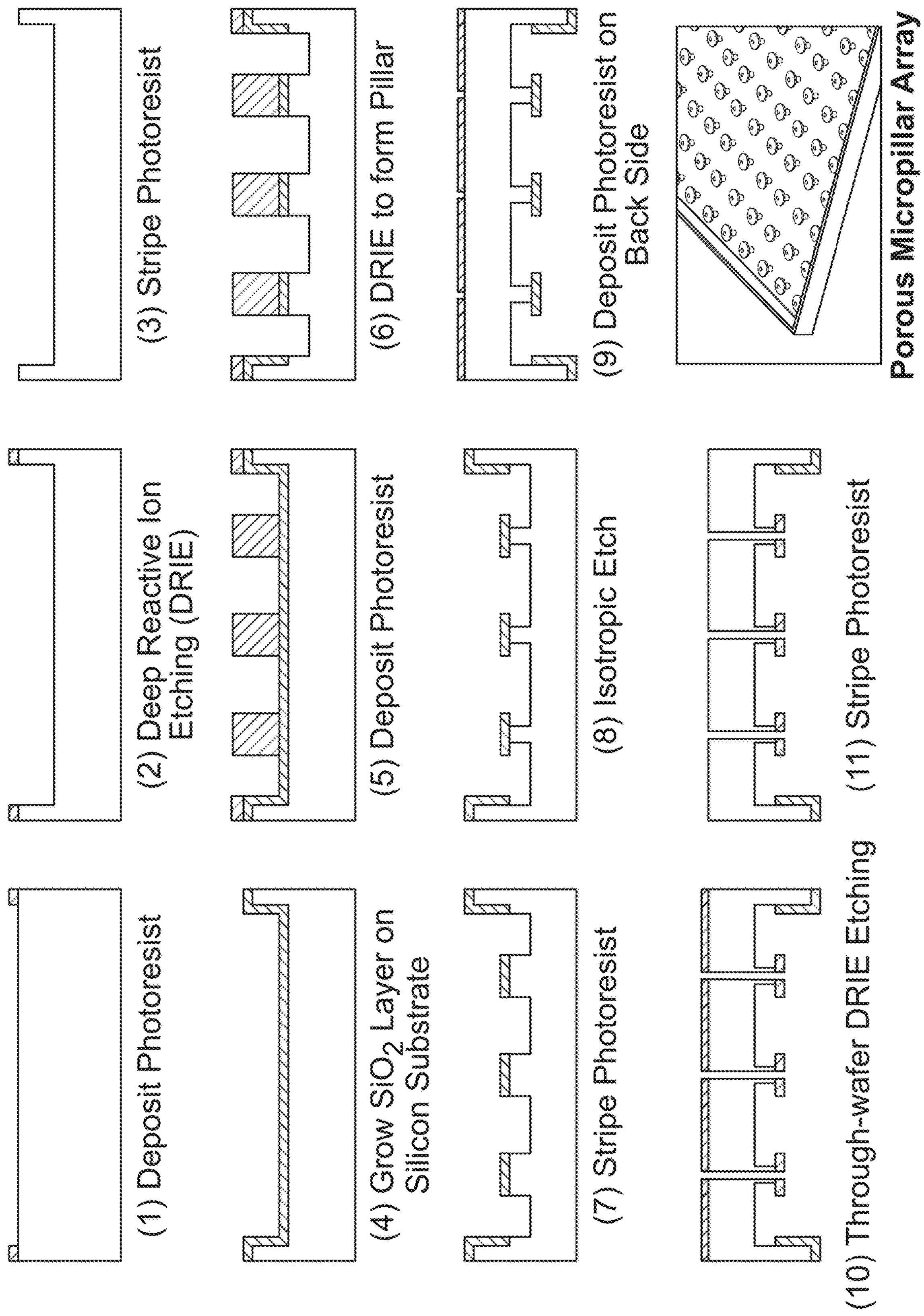
FIGS. 16 and 17 are schematic diagrams of an example fabrication process of hollow micropillars.
Figure 17:
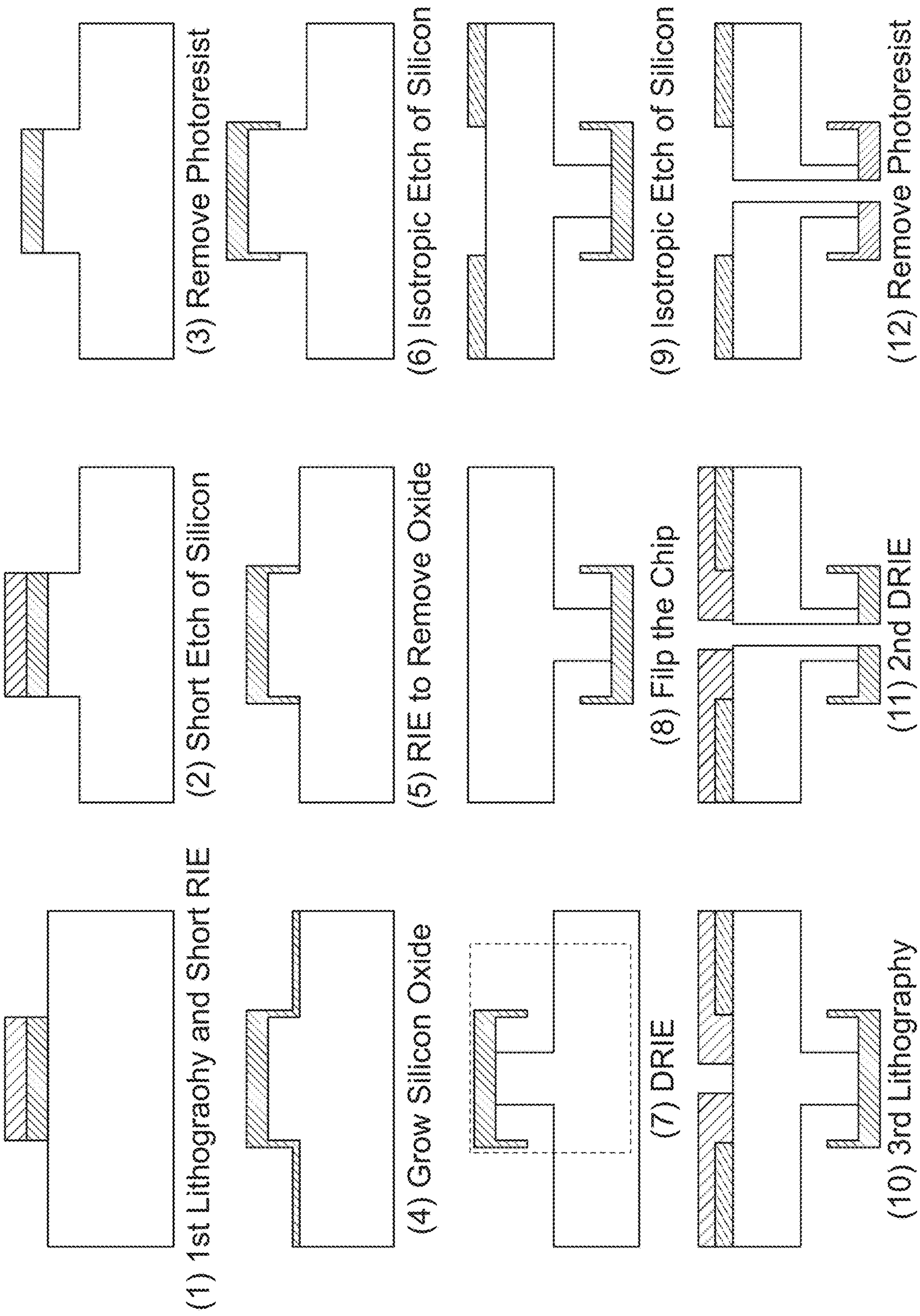

FIGS. 16 and 17 are schematic diagrams of an example fabrication process of hollow micropillars. The first method is for a re-entrant profile (see FIG. 16) and the second method is for a double re-entrant profile (see FIG. 17). The double re-entrant profile is a three-stage microfabrication procedure for manufacturing the hollow micropillar with desired geometry.

To retain both polar and non-polar liquids, microfabrication techniques were applied to create a membrane containing an array of hollow micropillars with re-entrant surface features from a material such as silicon. In one aspect, the hollow micropillars are constructed using two front-side deep reactive ion-etching (DRIE) steps to independently delineate trenches and through-holes. In another aspect, an additional back-side DRIE step may be conducted to define the membrane thickness. In various aspects, the inner diameter of the micropillars may be limited by the resolution of the lithography and/or the DRIE steps, both of which may are typically well-suited for the formation of high aspect ratio through-holes.

In one aspect, the micropillar inner diameter is about 3 μm, the membrane thickness is about 0.7 μm, and the corresponding micropillar outer diameter is about 4.4 μm. In this one aspect, the area of the micropillar arrays fabricated here was about 1 $mm^2$. The DRIE etch produced sharp edges at the intersection of the outer and top surfaces of the micropillars (i.e., angle $\omega \geq 90°$ as defined in FIG. 7J), suitable for pinning liquids with infinitesimal intrinsic contact angles including, but not limited to dielectric fluids characterized by low surface tension as described above. the outer corner of each micropillar has an etch angle less than about 90° which enables lower surface tension liquids to maintain a meniscus with a hemispherical shape when the liquid is pinned along the outer pillar edge as described above.

Figure 18:
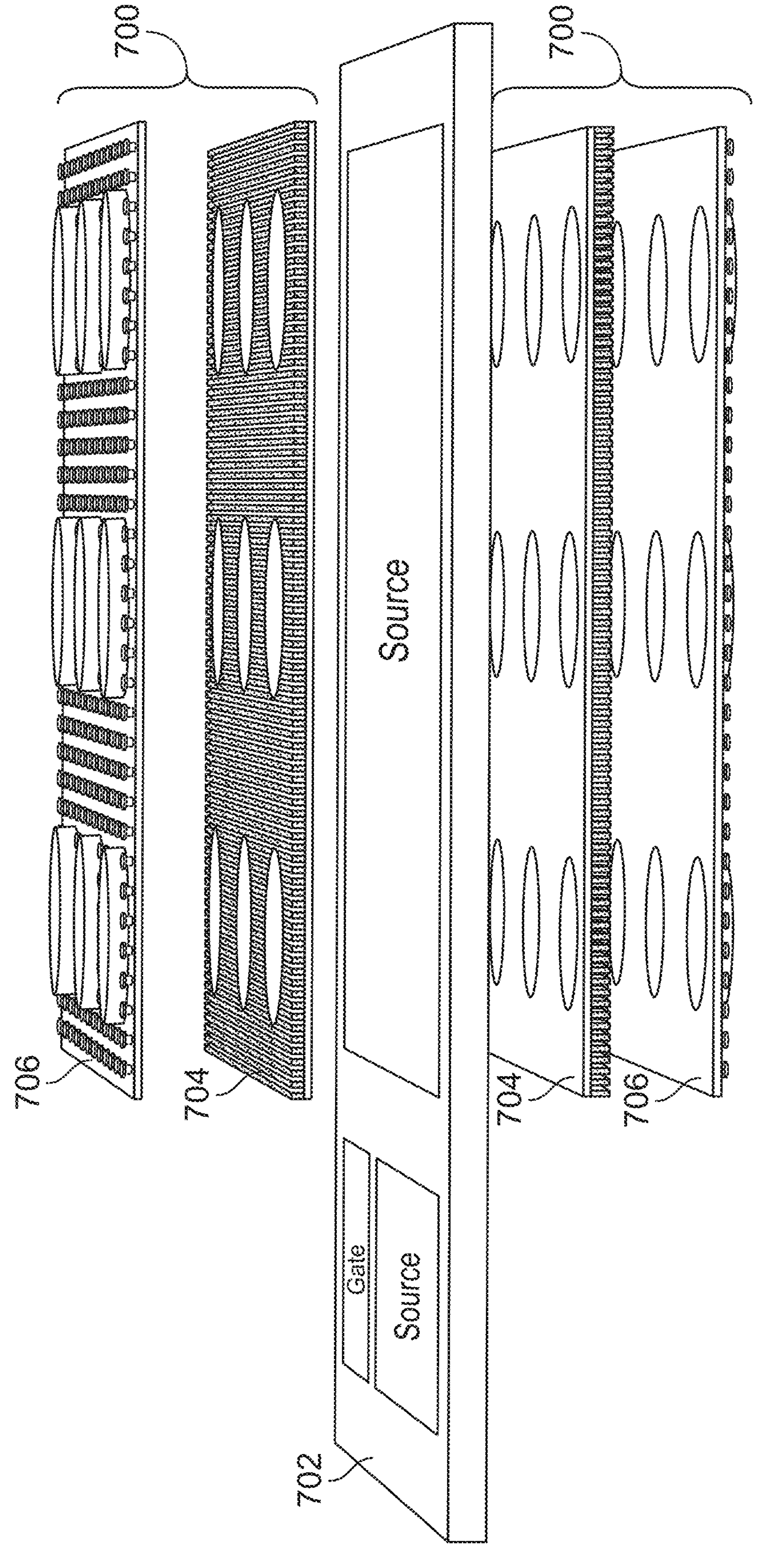
FIG. 18 is an exploded view of a thermal management system including a pair of integrated liquid delivery layers configured to couple to opposite faces of a 2D device layer.
Figure 19:
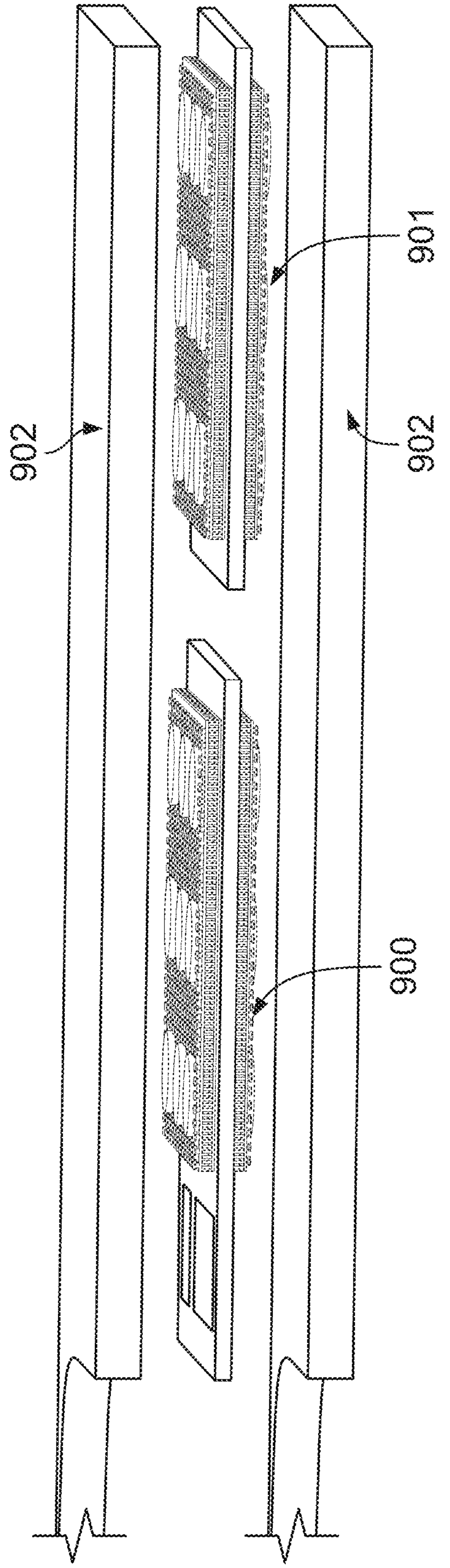
FIG. 19 is an enlarged exploded view of a portion of the thermal management system showing an IGBT-Diode block with the integrated cooling module shown in FIG. 18.

In various aspects, multiple integrated liquid delivery layers may be combined in various arrangements to provide thermal management to a variety of arrangements of power electrical components. In one aspect, illustrated in FIG. 18, a pair of integrated liquid delivery and evaporation layers 700 are coupled to opposite faces of a 2D device layer 702. As illustrated in FIG. 18, the first integrated liquid delivery and evaporation layer 700 is coupled to the first/upper face of the device layer 702 at a thermally conductive substrate via a metallic conductive layer as described above. The second integrated liquid delivery and evaporation layer 700 is similarly coupled to a second/lower face of the device layer 702 opposite the first/upper face. The integrated liquid delivery and evaporation layers 700 include liquid delivery layers 704 connected to the device layers 702 and evaporation layers 706 connected to the device layers 702 opposite the device layers 702. The liquid delivery layers 704 may include a structure such as matrix foil or a series of pillars that allows wicking of the liquid therethrough and facilitates transfer of heat from the device layers 702 to the evaporation layers 706. In this aspect, the liquid inlet of the manifold (not shown) is coupled to the liquid delivery layers 704 of both integrated liquid delivery and evaporation layers 700 and the vapor outlet of the manifold (not shown) is coupled to the evaporation layers 706 of both integrated liquid delivery layers. In various other aspects, single integrated liquid delivery layers and device layers are interspersed in alternating layers, as illustrated in FIGS. 18-21. In one aspect, illustrated in FIG. 19-21, a double sided cooling module for a MOSFET 900 and a double sided cooling module for a diode 901 are layered between two copper buses 902.

Figure 22:
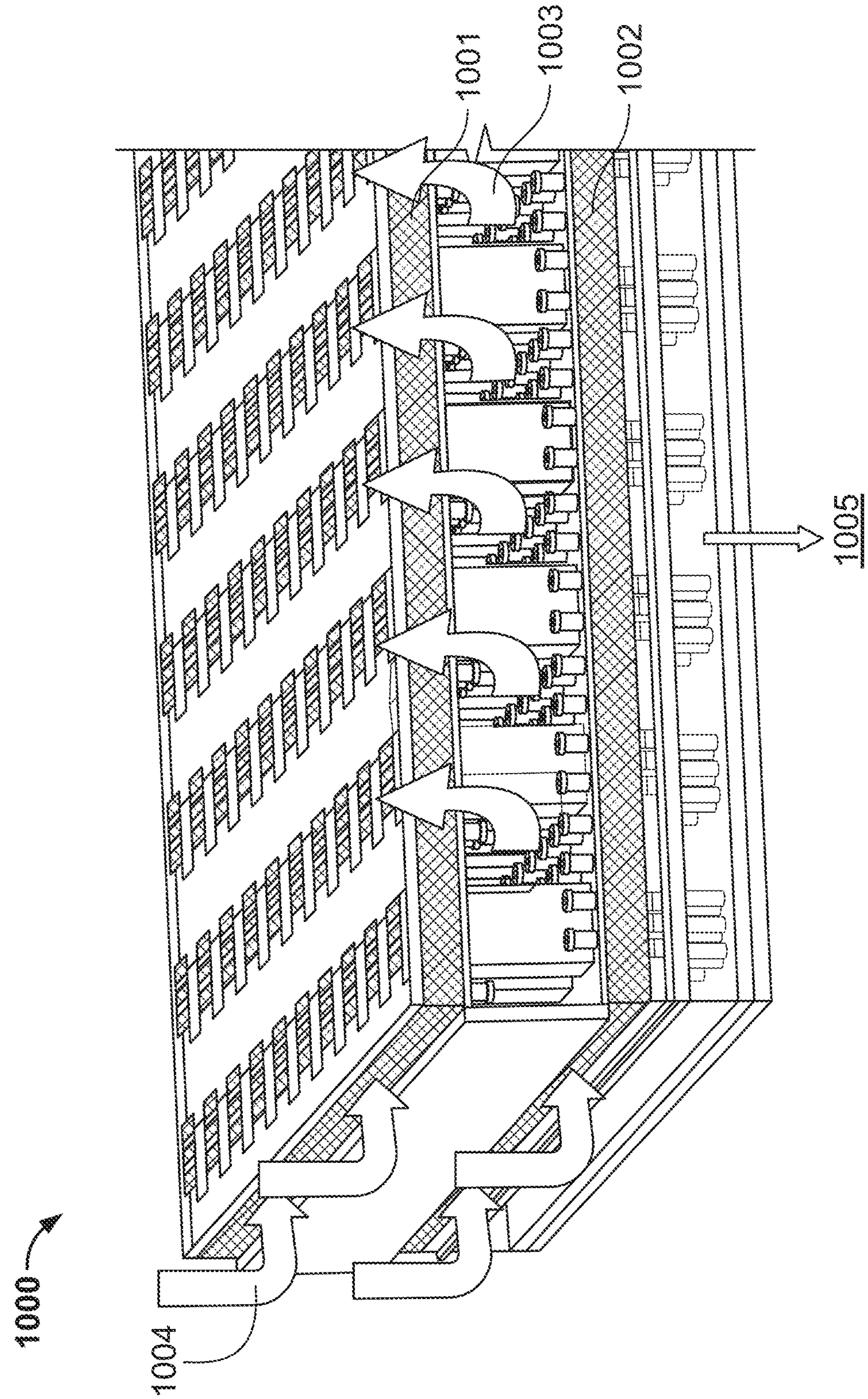
FIG. 22 is a schematic diagram of an assembly of a power device with a cooling module for 3D packaging of microelectronics.
Figure 23:
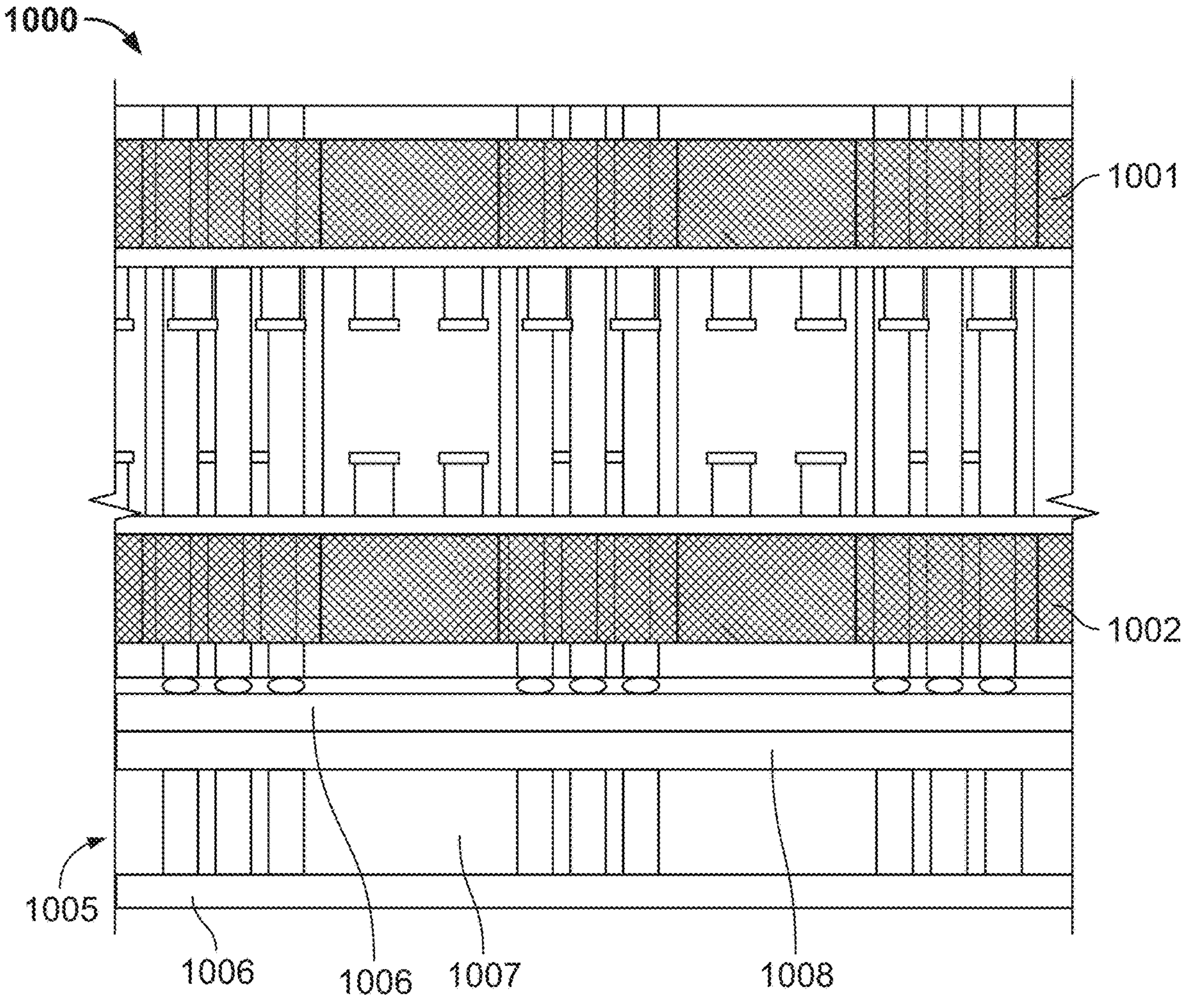
FIG. 23 is an enlarged cross-sectional view of a portion of the assembly shown in FIG. 22.
Figure 24:
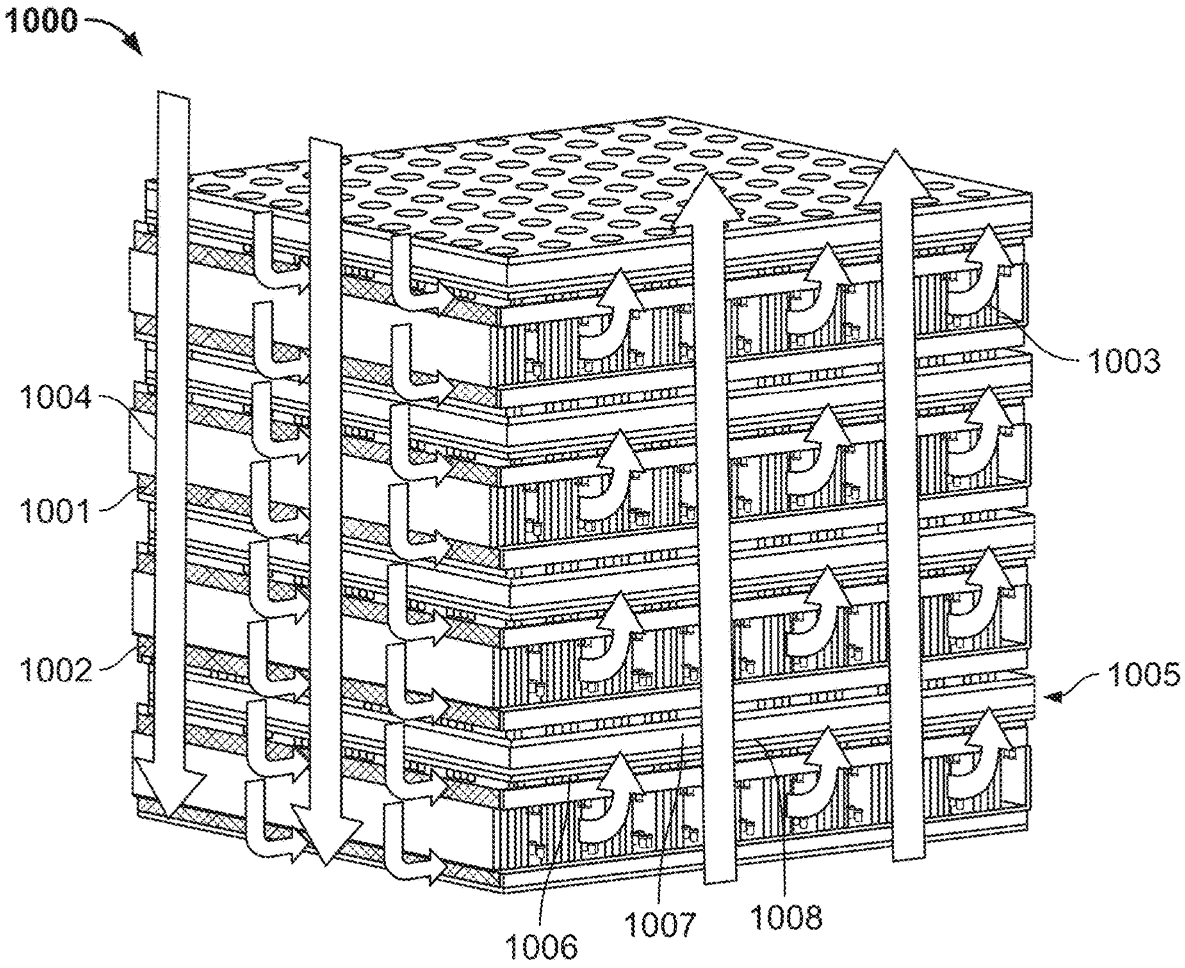
FIG. 24 is a schematic diagram showing fluid and vapor flow through a 3D assembly of the cooling module and power device for 3D packaging of microelectronics as illustrated in FIGS. 22 and 23.

In various other aspects, a pair of integrated liquid delivery layers are coupled together in an adjacent arrangement to form an assembly 1000 as illustrated in FIG. 22-24. As illustrated in FIG. 22, a first/upper integrated liquid delivery layer 1001 is coupled to a second/lower integrated liquid delivery layer 1002 such that a gap is maintained between a first evaporation layer of the first/upper integrated liquid delivery layer and a second evaporation layer of the second/upper integrated liquid delivery layer. In one aspect, the first and second evaporation layer are coupled via the through-silicon vias (TSVs) of a 3D electronic device package. In these aspects, the manifold is coupled to each evaporation layer and liquid delivery layer via the vapor outlet 1003 and liquid inlet 1004, respectively. In this aspect, the vapor produced by the evaporation layers of the coupled integrated liquid delivery layers is released into the gap between the evaporation layers, and passes into the vapor outlet of the manifold. In another aspect, the pair of integrated liquid delivery layers are coupled to a functional power device layer 1005, part of the 3D electronic delivery package. The functional power device layer 1005 is made up of a metal layer 1006, a silicon layer 1007, and a power semiconductor 1008.

In various additional aspects, multiple coupled pairs of integrated liquid delivery layers as described above are interspersed in alternating layers with device layers, as illustrated in FIG. 25-30. Each coupled pair of integrated liquid delivery layers are coupled to the liquid inlet and vapor outlet of a manifold.

Figure 25:
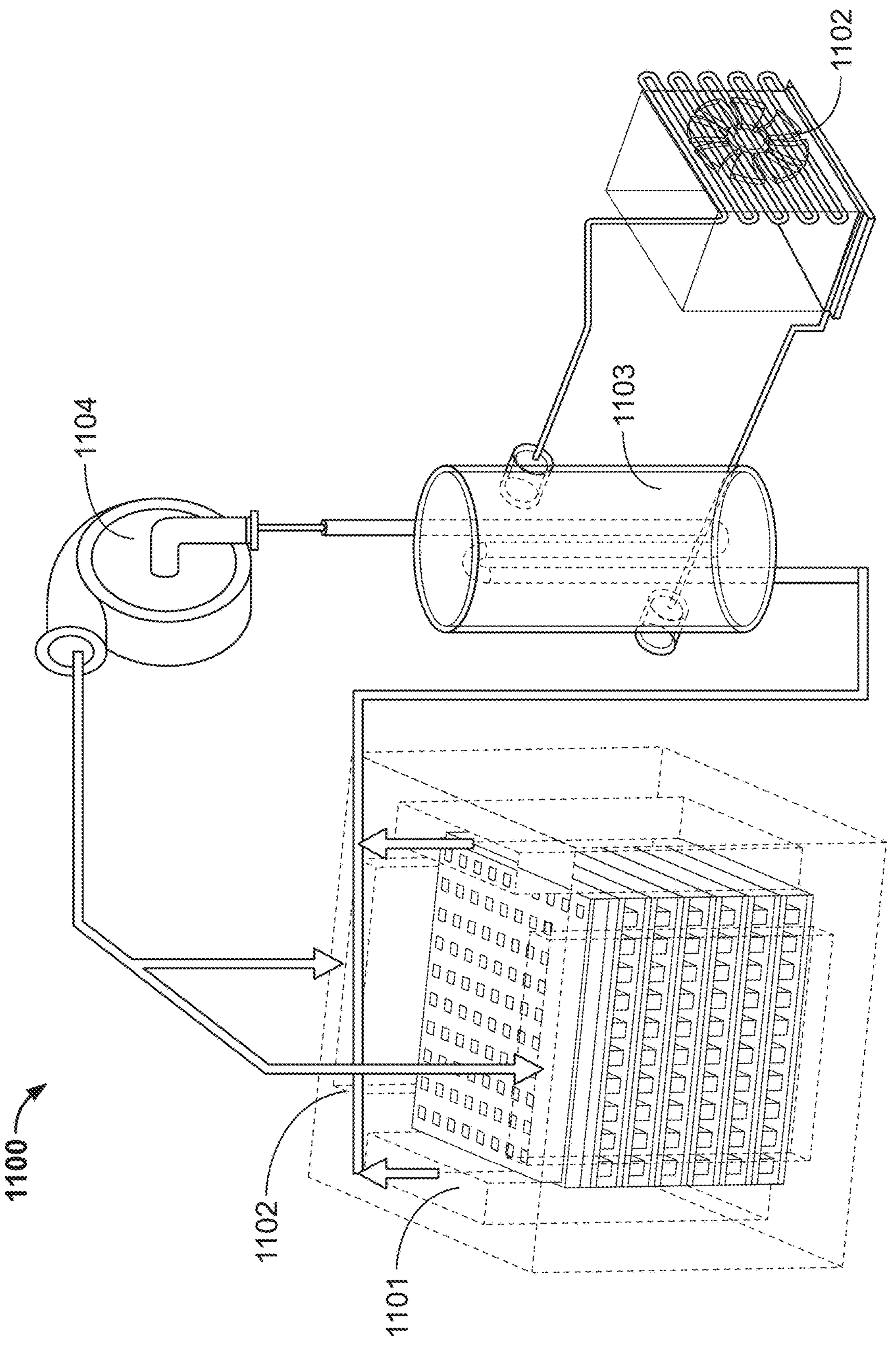
FIG. 25 is a schematic diagram of an integrated thermal management system for a 3D packed power module.
Figure 26:
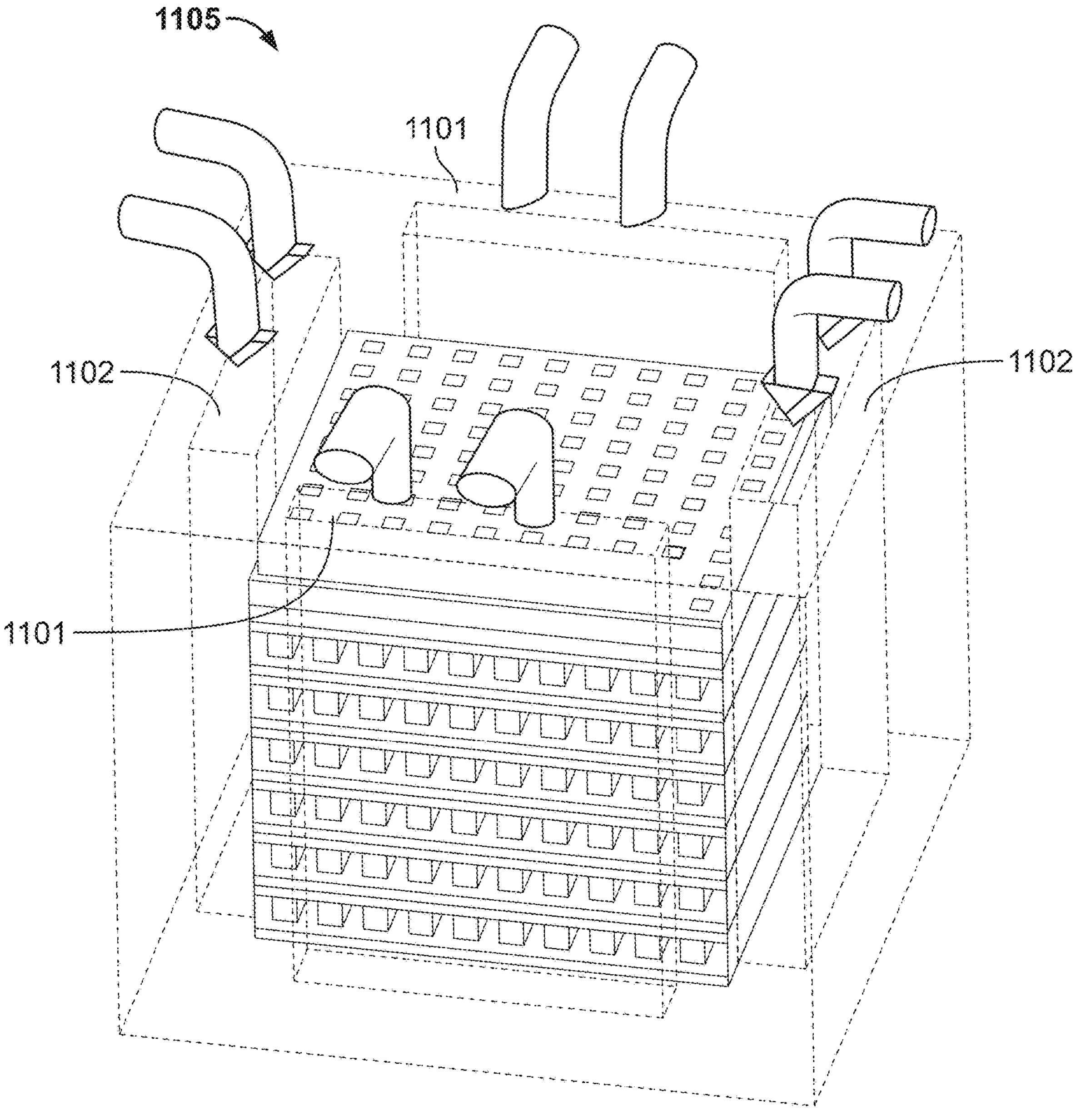
FIG. 26 is a schematic diagram of a portion of the thermal management system shown in FIG. 25.
Figure 27:
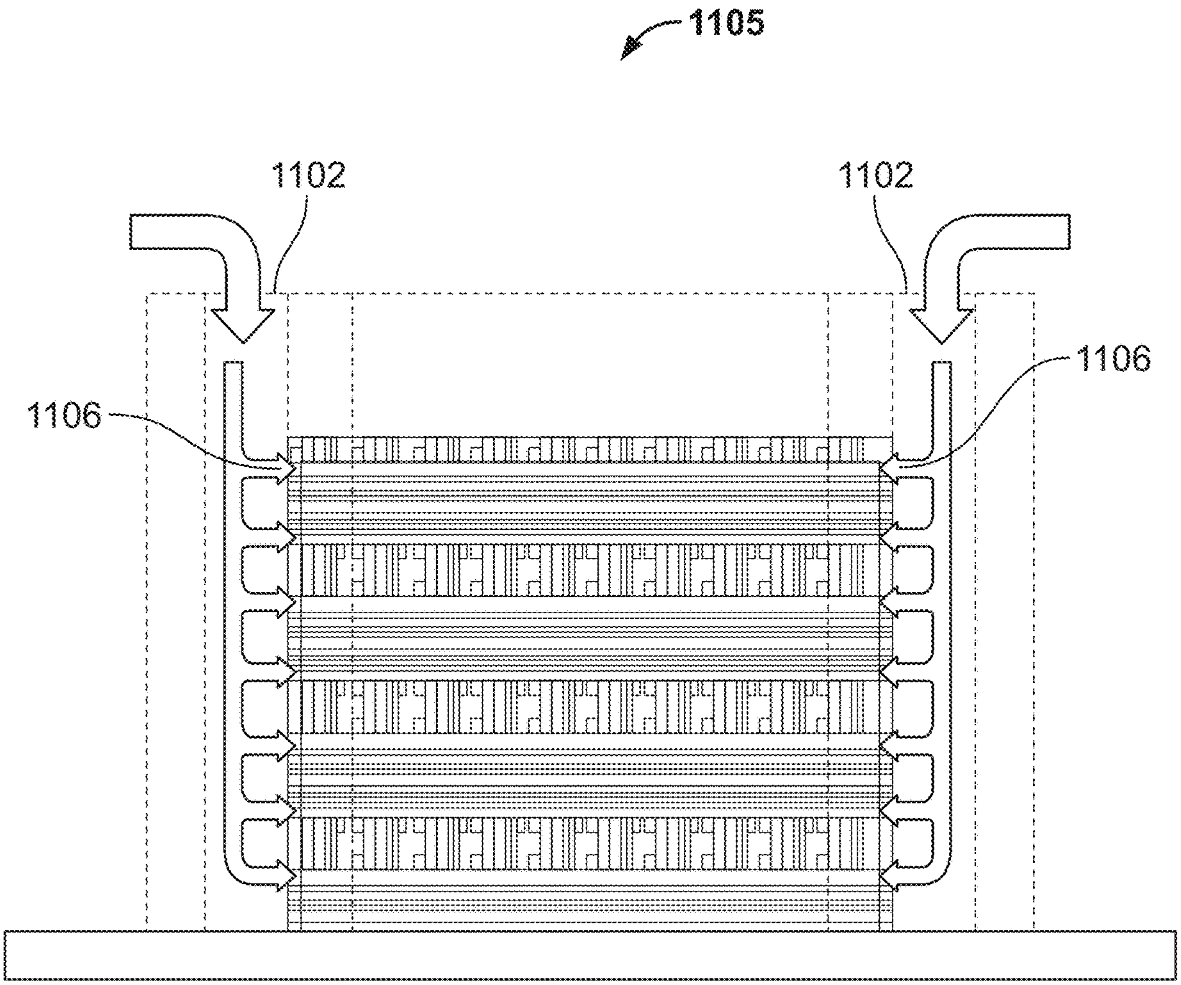
FIG. 27 is a sectional view of the portion of the thermal management system shown in FIG. 26, illustrating fluid delivered through the system using a manifold.
Figure 28:
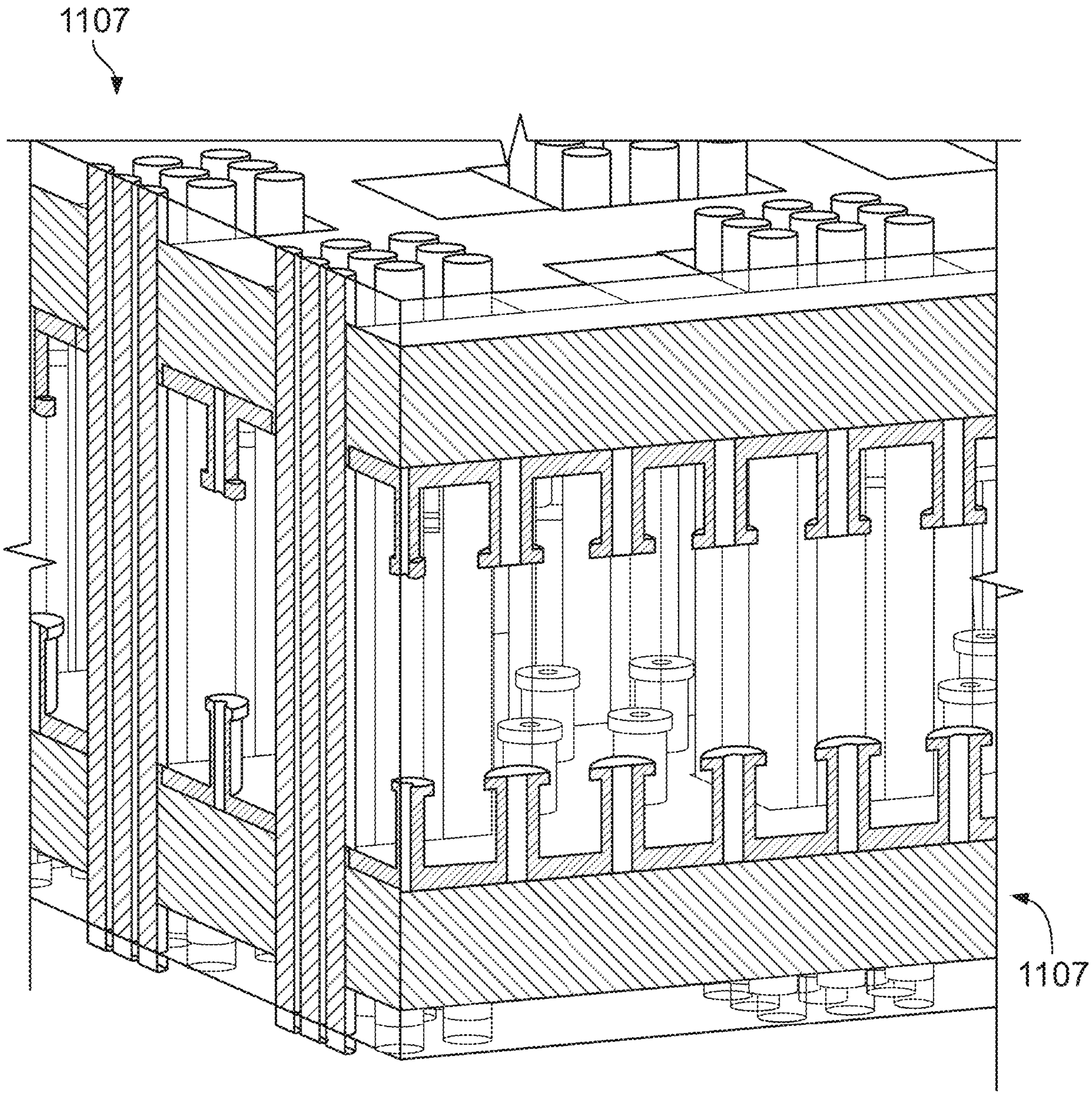
FIG. 28 is an enlarged view of a portion of the thermal management system shown in FIGS. 27 and 26, the system including hollow pillars.
Figure 29:
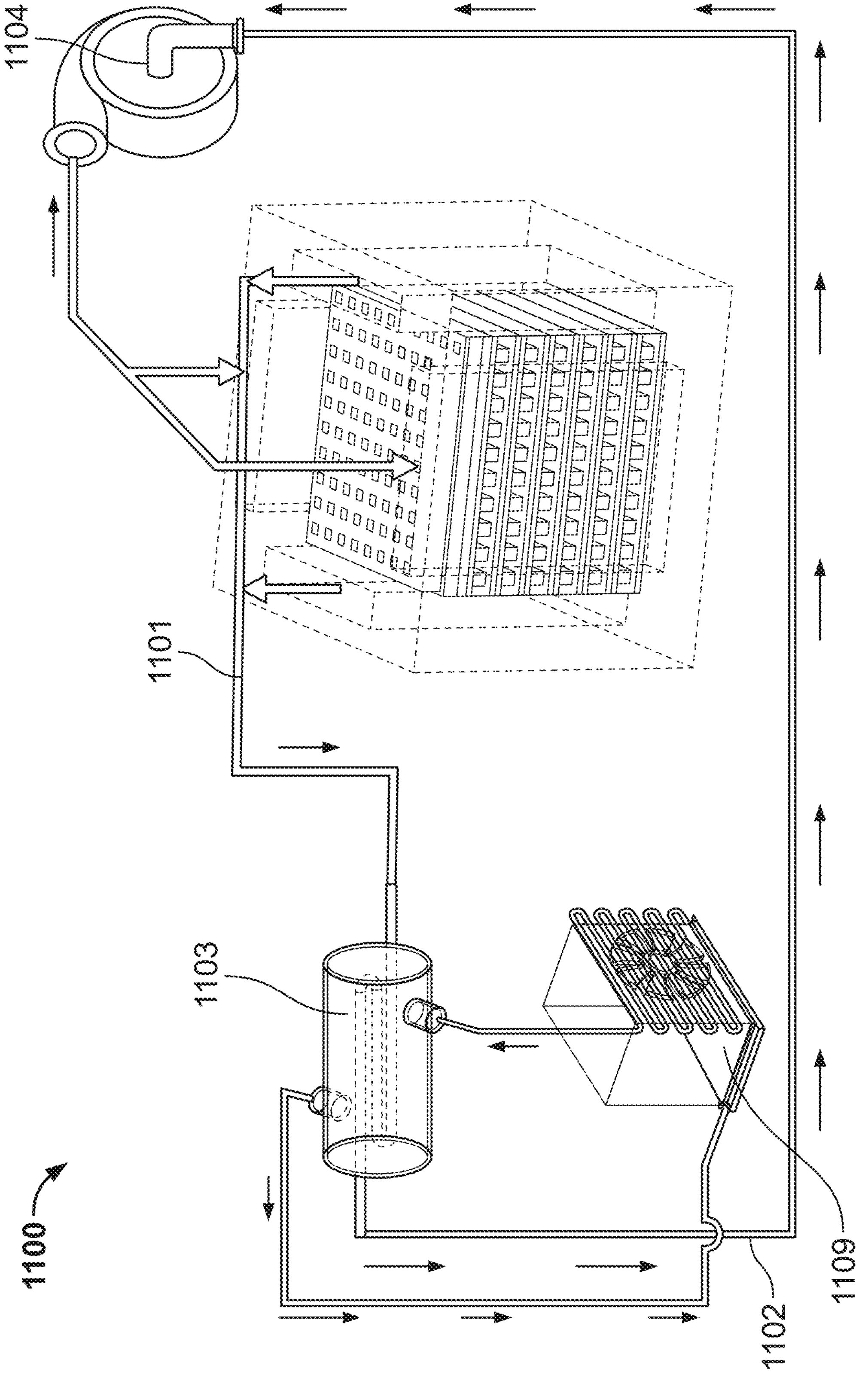
FIG. 29 is a schematic diagram of assembly of an integrated cooling system including an external heat rejection flow loop and a 3D IC packaging with interlayer evaporative cooling platforms.
Figure 30:
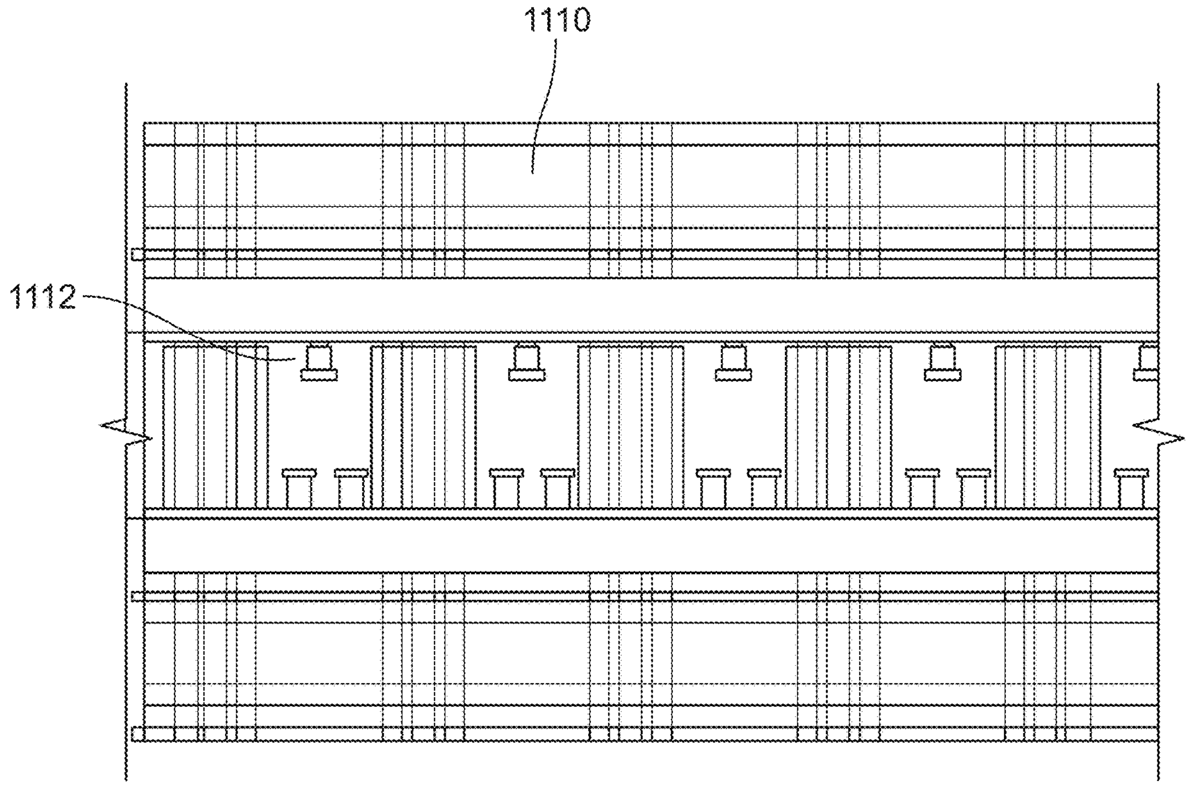
FIG. 30 is a sectional view of a portion of the integrated cooling system showing opposed evaporative layers with hollow pillars.

In other aspects, illustrated in FIG. 25, a thermal management system 1100 further includes a cooling fluid reconditioning loop coupled to the manifold 1105. The cooling fluid reconditioning loop is configured to receive vapor from the vapor outlets 1101 of the manifold and to deliver chilled cooling liquid back to the liquid inlets 1102 of the manifold 1105. As illustrated in FIGS. 25-30, the cooling fluid reconditioning loop includes a condenser 1103 coupled to the vapor outlet of the manifold. The condenser is configured to receive and convert vaporized cooling fluid to cooling liquid. In an embodiment shown in FIG. 29, the cooling fluid reconditioning loop further includes a radiator 1109 coupled to the condenser and configured to release heat from the cooling fluid. The cooling fluid reconditioning loop further includes a pump 1104 configured to move the reconditioned cooling fluid into the fluid inlet of the manifold. The manifold 1105 directs the cooling fluid into separate channels 1106 connected to integrated liquid delivery and evaporation layers 1107. The layers 1107 are configured to manage heat of multiple stacked electronic devices. The manifold 1105 substantially encloses the stacked electronic devices and the integrated liquid delivery and evaporation layers 1107. Moreover, the manifold 1105 is sized and shaped to allow the electronic devices and the integrated liquid delivery and evaporation layers 1107 to have a compact configuration and be modular. For example, the liquid inlets 1102 and the vapor outlets 1101 include channels extending along sides of the assembly.

Figure 20:
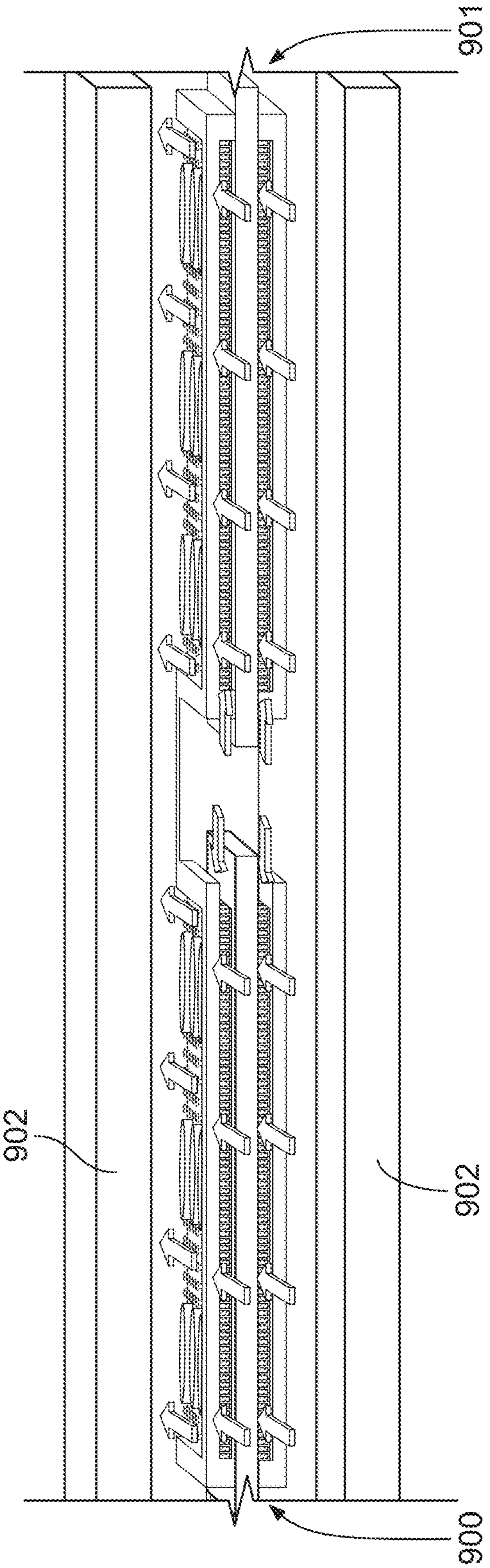
FIGS. 20 and 21 are schematic diagrams of a portion of the thermal management system shown in FIG. 18, showing liquid and vapor routing for the 3D packaging of power electronics.
Figure 21:
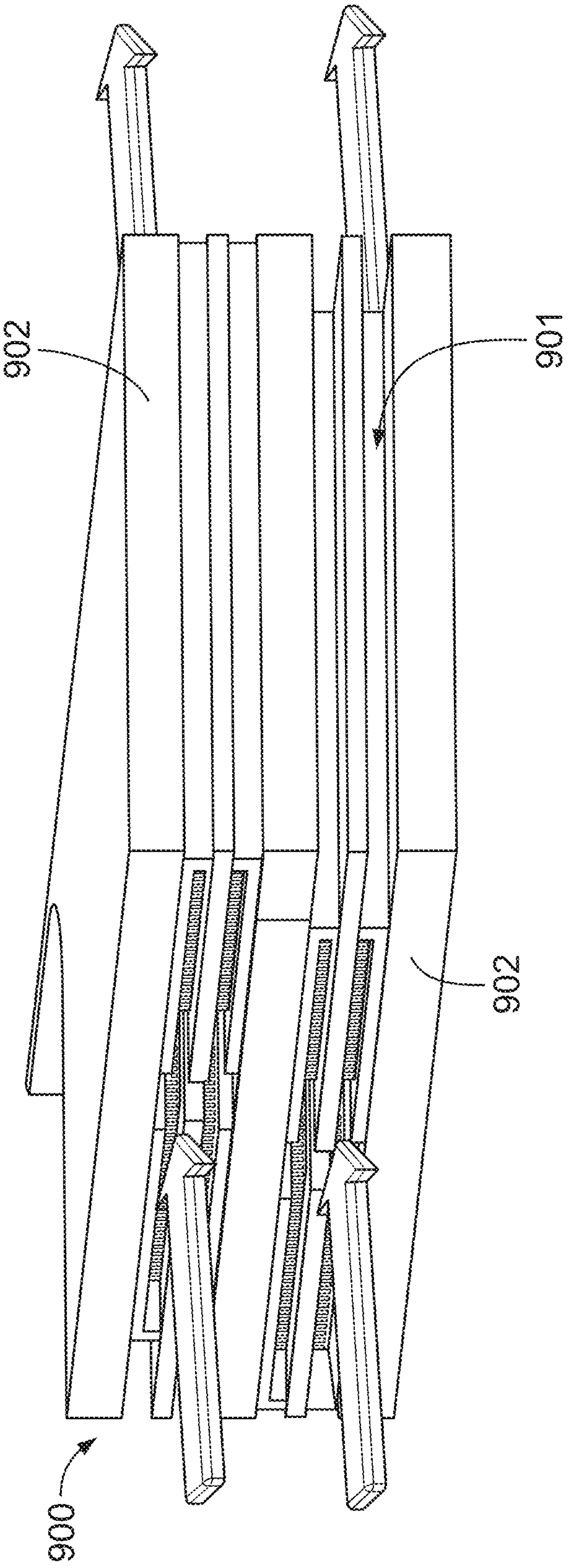

As illustrated in FIG. 20, the integrated liquid delivery and evaporation layers 1107 each include a liquid delivery layer 1110 configured to thermally couple to electronic components and an evaporation layer 1112 attached to the liquid delivery layer 1110 opposite the electronic components.

EXAMPLES

The following examples illustrate various aspects of the disclosure.

Example 1: Volume of Fluid (VOF) Modeling of Microdroplets on Circular, Square, and Triangular Micropillars In various aspects, a Volume of Fluid (VOF) numerical model is used to characterize the evaporation behavior of non-axisymmetrical microdroplets suspended on a hollow micropillar. In one aspect, the VOF model is used to characterize the heat and mass transfer over a non-axisymmetric microdroplet meniscus formed at the outlet of a hollow micropillar. In some aspects, equilibrium profiles and mass transport characteristics of droplets with circular, triangular, and square contact shapes are characterized using the Volume of Fluid (VOF) method. In one aspect, the VOF model is based on a volume of fluid (VOF) multiphase method that accounts for microconvection effects within the droplet and evaporative phase change transport at the liquid-vapor interface, and further provides representation of the vapor diffusion process in the air domain. In an aspect, evaporative mass transport at the liquid-vapor interface is modeled using a simplified Schrage model.

As described below, the VOF numerical model predicts highly non-uniform mass transport characteristics for non-axisymmetrical microdroplets, where a higher local evaporation rate is observed near the locations where the meniscus has high curvature. This observation is attributed to a higher local vapor concentration gradient that drives faster vapor diffusion at more curved regions, analogous to a lightning rod exhibiting a strong electric field along a highly curved surface. In various aspects, described below, this contact line confinement phenomenon may be used to artificially tune a droplet into a more curved geometry, resulting in enhanced total evaporation rate of as much as 13% from a triangular-based droplet compared to a spherical droplet with the same perimeter and liquid-vapor interfacial area. In various aspects, manipulation of contact line confinement may influence the design and optimization of geometric features to improve evaporation in high performance electronics cooling systems.

A transient three-dimensional simulation model using the Volume of Fluid method (VOF) is developed to predict the liquid pressure and capture the contact line dynamics as the meniscus advances from the inner channel to the outer edge of the hollow micropillar. The simulation tracks the evolution of the meniscus and corresponding pressure profile as the meniscus moves to different locations along the micropillar.

In one aspect, the VOF model employs one set of governing equations to solve for the liquid and vapor domains, using ANSYS Fluent. The computational solver is implemented to compute the conservation equations below:

Continuity $$\frac{\partial y}{\partial x} + \nabla \cdot \left(\alpha_k \vec{V} = 0\right), \qquad \text{Eqn. (18)}$$

Momentum $$\frac{\partial}{\partial t}\left(\rho\vec{V}\right) + \nabla \cdot \left(\rho\vec{V}\right) = -\nabla p + \nabla \cdot \left[\mu\left(\nabla\vec{V} + \nabla\vec{V}^T\right)\right] + \rho\vec{g} + \vec{F}, \qquad \text{Eqn. (19)}$$

where $\alpha_k$, $\rho$, $\mu$, and $\vec{F}$ are the phase volume fraction, density, dynamic viscosity, and body force terms, respectively.

The interfacial forces are modeled using the Young-Laplace equation:

$$\vec{F}_\gamma = \gamma\kappa\nabla\alpha, \qquad \text{Eqn. (20)}$$

where $\gamma$ and $\kappa$ are the surface tension and surface curvature, respectively.

The change in momentum due to the interfacial forces is expressed using the Continuous Surface Force (CSF) model:

$$\vec{F}_\gamma = \gamma\kappa\frac{\rho}{\rho_f + \rho_g}\nabla\alpha \qquad \text{Eqn. (21)}$$

A three-dimensional computational domain is used for the simulation. In this model, a micropillar is considered, with an inner diameter, outer diameter, and thickness of 2.5 μm, 5 μm, and 25 μm, respectively.

In this model, grid independence is established using a 3D unstructured hexahedral mesh with three different mesh sizes. The coarsest mesh has 0.3 million computational nodes in the domain and is refined twice, up to 2.1 million hexahedral nodes. A mesh sensitivity analysis is performed by monitoring local pressure values at the inlet and outlet of the computational domain. The final mesh generated has a comparatively modest 0.8 million nodes, which minimizes computational effort. There is only a minimal pressure difference (≤1.3%) between the finest mesh size and the meshes implemented for these studies. The micropillars are periodically arranged, and therefore symmetric boundary conditions are used for all sidewalls. An inlet boundary velocity is determined based on a capillary number, Ca, at the micropillar inlet. In order to explore if the dynamic effects (e.g., viscous and inertial effects) are significant in the liquid pinning performance, three different inlet conditions were chosen, with Ca number equaling 0.001, 0.01, and 0.05. The surface tension, c, is assumed to be constant, and a constant pressure outlet boundary condition is applied at the outlet. Details of the input parameters, fluid properties, and solution methods for numerical modeling are summarized in Table 1.

TABLE 1

Input parameters and modeling setup for numerical simulation.

| Input parameters | Value | | | |
|---|---|---|---|---|
| Outer diameter, D | 5 μm | | | |
| Inner diameter, d | 2.5 μm | | | |
| Micropillar height, h | 5 μm | | | |
| Membrane width, | 16 μm | | | |
| Liquid inlet temperature, $T_{in}$ | 293K | | | |
| Liquid inlet | Mass Flow rate, $m_{in}$ | $2 \times 10^{10}$ kg/s | $2 \times 10^{-9}$ kg/s | $1 \times 10^{8}$ kg/s |
| | Ca number | 0.001 | 0.01 | 0.05 |
| Outlet gauge pressure, $P_{out}$ | 0 kPa | | | |
| Properties | Water | | FC-40 | |
| Surface tension | $7.3 \times 10^{2}$ N/m | | $1.6 \times 10^{-2}$ N/m | |
| Viscosity | $1.0 \times 10^{3}$ kg/m-s | | $4.1 \times 10^{4}$ kg/m-s | |
| Membrane contact angle | 10° | | 3° | |
| Solution methods | Setup | | | |
| Number of meshes | 0.8 million hexahedral meshes | | | |
| Surface tension modeling | Continuous Surface force (CSF) | | | |
| Pressure-Velocity Coupling | Pressure Implicit with Spitting of Opesares (PISO) | | | |
| Spatial discretization | Gradient | | Green-Gauss Node Based | |
| | Pressure | | PREssure STaggering Option (PRESTO!) | |
| | Momentum | | Second Order Upwind | |
| | Volume Fraction | | Geo-Reconstruct | |
| Time Stepping Method | Variable | | Global Courant = 2 | |

The maximum Laplace pressure is calculated by subtracting the viscous effects from the total pressure drop predicted using the Hagen-Poiseuille equation:

$$\Delta p_{viscous} = \frac{128 \mu h Q}{\pi d^4} \quad \text{Eqn. (22)}$$

Figure 31:
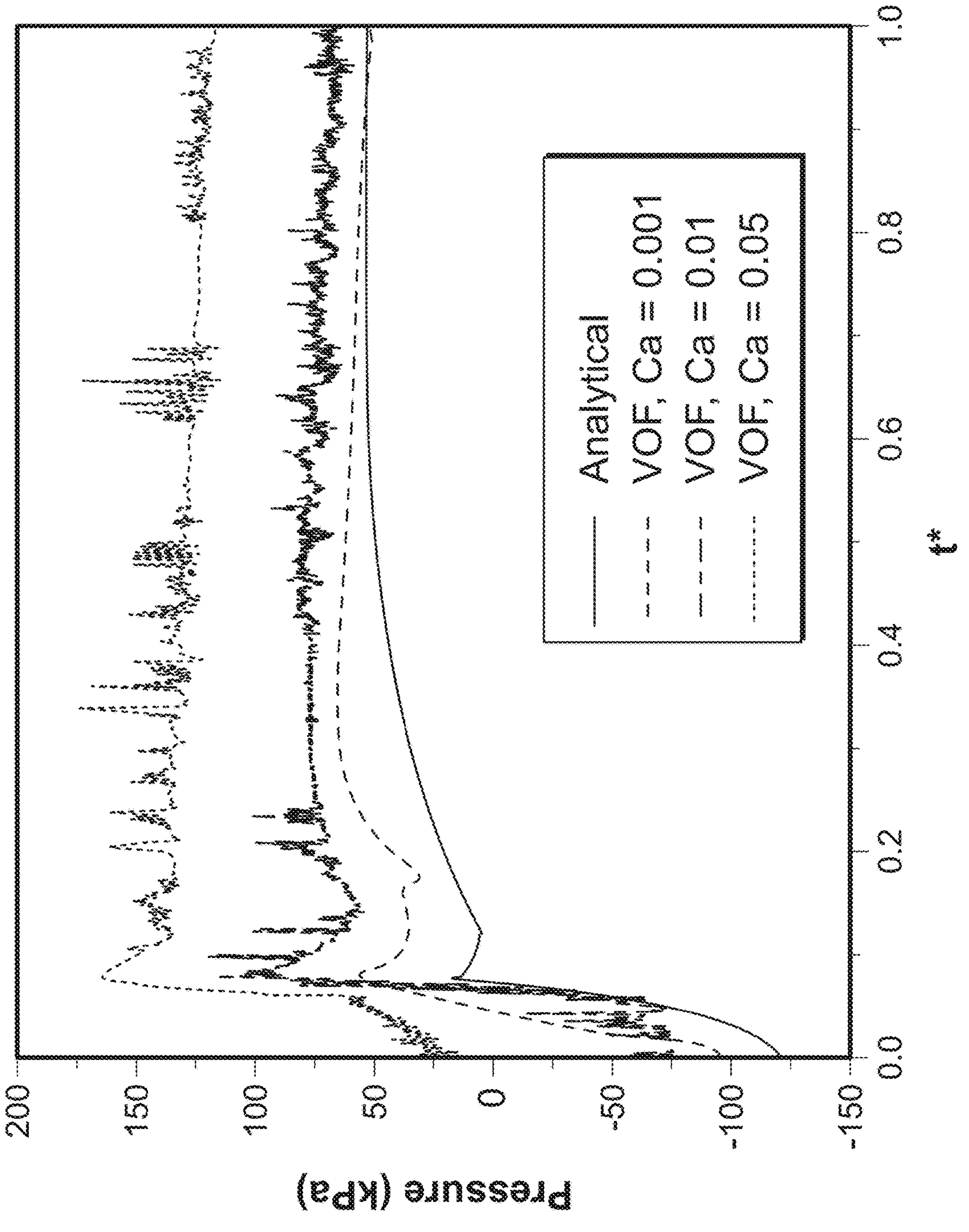
FIG. 31 is a graph illustrating VOF simulation results for water, showing the evolution of the meniscus and the corresponding capillary pressure at different micropillar locations under three flow rates.

FIG. 31 illustrates VOF simulation results for water, showing the evolution of the meniscus and the corresponding capillary pressure at different micropillar locations under three flow rates. The pressure response shown in FIG. 31 reveals similar trends in pressure variation, as predicted from quasi-static analytical calculations, in which the wicking, pivoting, advancing, and expansion stages are delineated clearly by changes in pressure. The fluctuations in the pressure signal are attributed to perturbation and instability during volume growth. Nevertheless, with increasing flow rate, there is a considerable increase in the liquid pressure due to the intensified viscous pressure. If the viscous pressure drop is subtracted based on Hagen-Poiseuille flow, the critical bursting pressure can be obtained, as shown in Table 2:

TABLE 2

Maximum bursting pressure for three different Ca numbers, using water.

| Capillary number | Viscous pressure (kPa) | Laplace burst pressure (kPa) | Total pressure (kPa) |
|---|---|---|---|
| 0.001 | 1.9 | 51 | 52.9 |
| 0.01 | 18.7 | 46.6 | 65.3 |
| 0.05 | 93.4 | 23.9 | 117.3 |

The results reveal that when the flow rate is increased by 10 and 50 times, the burst Laplace pressure is reduced by 8.6% and 53%, respectively. The time is normalized, with pivoting starting at t*=0 and the bursting occurring at t*=1. The results further suggest that the results obtained with the quasi-static assumption will no longer hold for high Ca flow and that the critical burst criterion is dependent on the liquid velocity.

Figure 32:
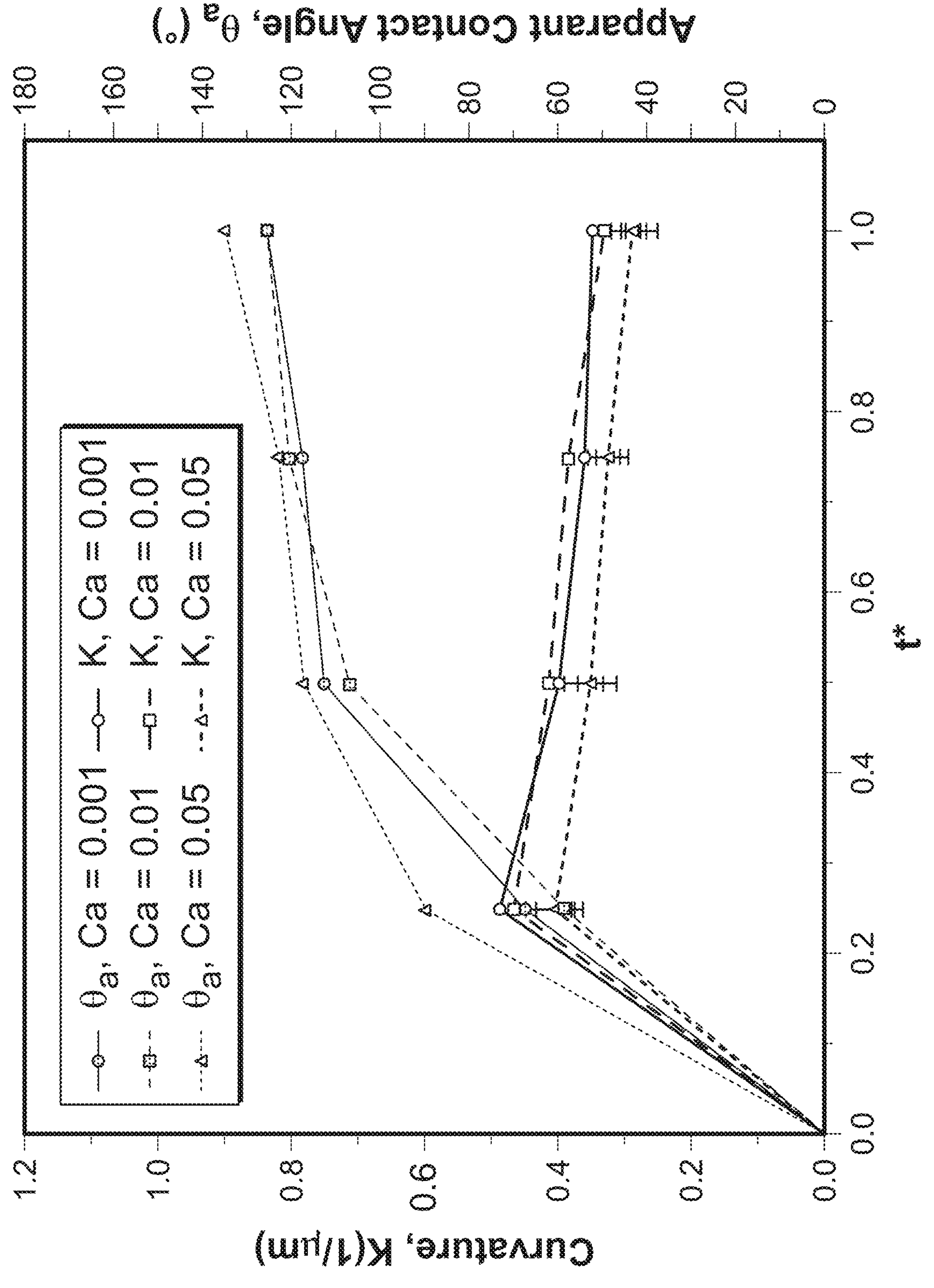
FIG. 32 is a graph comparing mean curvature and apparent contact angles for droplets, the graph illustrating the geometric evolution of the liquid droplet from a flat liquid meniscus to liquid burst.

FIG. 32 shows the geometric evolution (i.e., mean curvature and apparent contact angle) of the liquid droplet, starting with a flat liquid meniscus (in the middle of the pivoting stage) and ending with liquid burst. Time is normalized with an initially flat meniscus (curvature equals to zero) at t*=0 and liquid bursting at t*=1. It is evident from the difference in critical contact angle that the shapes of the liquid menisci at the burst points deviate from a capped sphere. A decrease in the mean curvature, x, is also observed for high Ca flow, which corresponds to a lower Laplace pressure. The decrease is particularly significant for Ca=0.05, where the mean burst curvature is reduced from 0.35 $\mu m^{-1}$ to 0.28 $\mu m^{-1}$. The liquid expands to a larger critical volume before bursting under the higher flow rate (i.e., high Ca number). The inconsistency in the liquid profile and pressure during the process under three flow rates suggests that burst behavior cannot be described solely by quasi-static analysis. This finding suggests that at sufficiently high flow rates, the surface tension force is no longer strong enough to instantly restore the shape of the liquid meniscus to its equilibrium condition. Therefore, the liquid will undergo an anisotropic expansion with a higher growth rate in the vertical direction, during which the surface energy is no longer at its minimized value. Such a dynamic effect can be quantitatively analyzed by calculating the change in liquid volume within the time constant, s, associated with the shape restoration by surface tension. Considering the perturbation of a liquid droplet held together by surface tension, the frequency of the $n^{th}$ oscillation mode in air is given by:

$$f = \sqrt{n(n-1)(n+2)\frac{\gamma}{\rho r_{droplet}^{3}}}, \quad \text{Eqn. (23)}$$

where $\gamma$ is the surface tension, $\rho$ is the density, and $r_{droplet}$ is the radius of the droplet. Using water as an example with $r_{droplet}$=2.5 μm, the dominant mode of oscillation frequency (n=2) is calculated to be $f_{n=2}=6.11\times10^{6}$ Hz.

Figure 33:
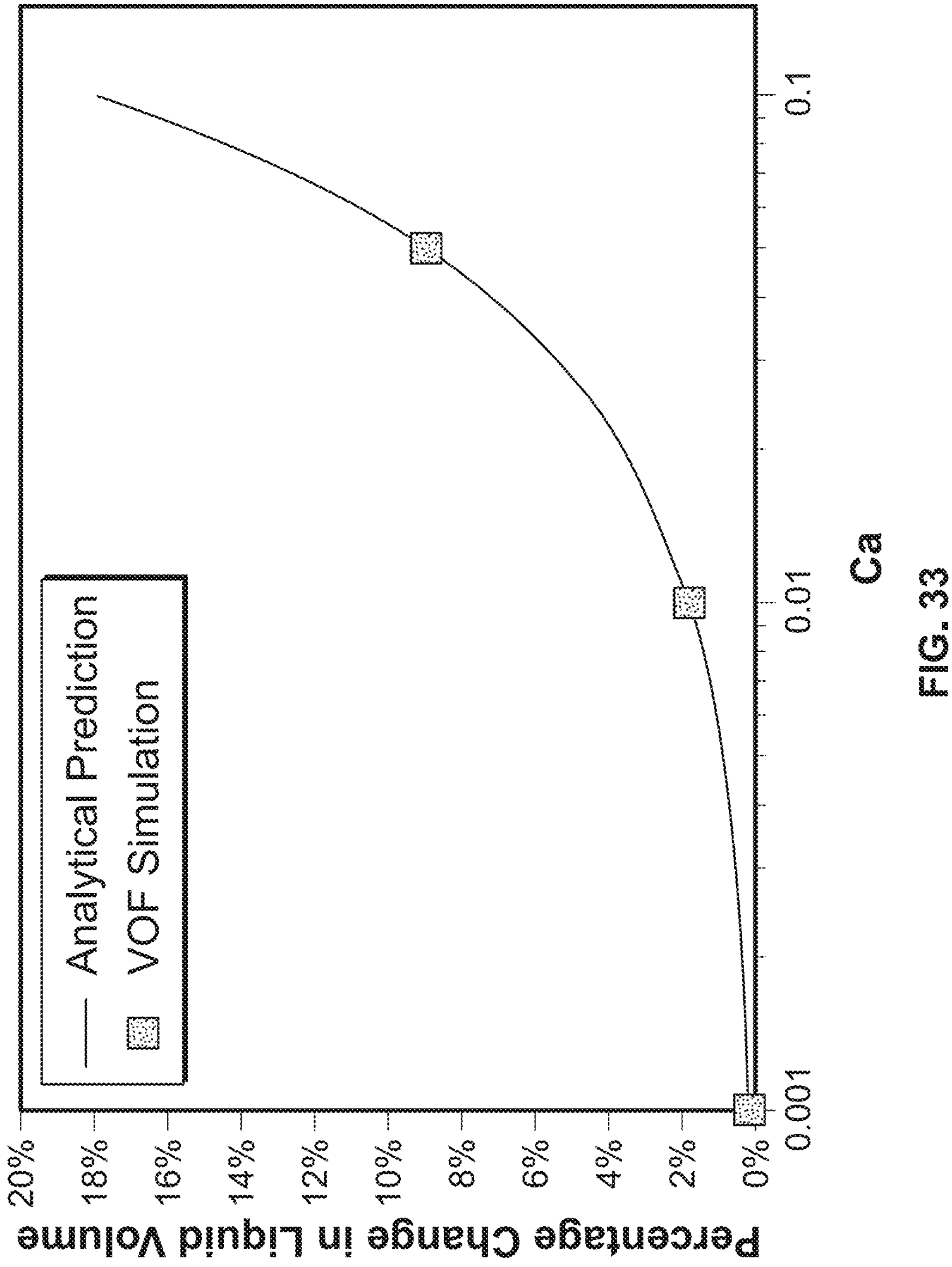
FIG. 33 is a graph of the percentage change in liquid volume within a specified time constant for a liquid droplet with hemispherical geometry under different apparent contact angle numbers.

Therefore, the time constant for the liquid to restore to its equilibrium shape from a small deformation is given by $\tau=1/f_{n=2}=0.16$ μs. FIG. 33 illustrates the percentage change in liquid volume within the specified time constant s for a liquid droplet with hemispherical geometry under different Ca numbers. The result shows that for Ca number of 0.001, 0.01 and 0.05 respectively, the liquid droplet undergoes 0.2%, 2% and 9% volume changes before its surface can be restored to an equilibrium spherical shape. Therefore, the liquid meniscus will not be able to maintain its minimum energy state during expansion under high Ca number conditions. The quasi-static assumption that the droplet will always be at its local equilibrium condition becomes invalid under high Ca numbers, where the change in liquid volume becomes significant. The competing effects of the surface tension and the dynamic forces cause the liquid meniscus to oscillate in shape while expanding in volume, therefore resulting in different characteristics for the pressure traces and burst criterion. Since the deformation in meniscus geometry is stronger for high Ca number flows, the liquid droplet will exhibit greater burst volume, larger burst curvature κ, and smaller burst pressure under high flow conditions.

To characterize the evaporation characteristics of microdroplets pinned to the surface of micropillars with circular, square, and triangular shapes, shown illustrated in FIGS. 13-15, respectively, the following experiments were conducted.

A Volume of Fluid (VOF) model, described above, was used to simulate the evaporation of pinned droplets from the surface of the micropillars described above. All VOF simulations were performed with isothermal conditions at room temperature.

The VOF model included mathematical representations of various aspects of microdroplet formation and evaporation, as described in detail below.

The pressure difference between the liquid and vapor at the interface was described by the Young-Laplace equation:

$$p_v = p_l + p_c + p_d \qquad \text{Eqn. (24)}$$

where $p_v$, $p_l$, $p_c$, and $p_d$ are defined as the vapor pressure, liquid pressure, capillary pressure, and disjoining pressure, respectively.

In the liquid domain, incompressible liquid flow was described by the continuity and momentum equations:

$$\nabla\cdot(\vec{V}) = 0 \qquad \text{Eqn. (25A)}$$

$$\rho\left(\frac{d\vec{V}}{dt} + (\vec{V}\cdot\nabla)\vec{V}\right) = -\nabla p + \nabla(\mu\nabla\vec{V}) \qquad \text{Eqn. (25b)}$$

In the gas domain, the species transport was described by Eqn. (25C):

$$-\vec{V}\cdot\nabla C_v + \nabla\cdot(D\nabla C_v) = 0 \qquad \text{Eqn. (25C)}$$

The Schrage model was used to model how the liquid evaporates at the liquid-vapor interface, as shown in Eqn. (26):

$$m' = \frac{2\sigma}{2-\sigma}\left(\frac{\overline{M}}{2\pi\overline{R}}\right)^{\frac{1}{2}}\left(\frac{p_{v_{eq}}(T_{ls})}{T_{lv}^{1/2}} - \frac{p_v}{T_v^{1/2}}\right) \qquad \text{Eqn. (26)}$$

where m" was mass flux at the interface, a was the accommodation coefficient, $\overline{M}$ was the molecular weight of the liquid, $\overline{R}$ was the universal gas constant, $p_{v_{eq}}$ was the equilibrium pressure, $T_{lv}$ was the temperature of the interface, and $T_v$ was the temperature of the vapor. The Schrage model was simplified by assuming the interface temperature to be equal to the vapor temperature ($T_{lv}=T_v$) near the interface, and by neglecting the disjoining pressure and capillary pressure where the size of the geometry was sufficiently large.

Equilibrium vapor pressure was calculated by the Clausius-Clapeyron equation, as shown in Eqn. (27):

$$p_{v_{equ}(T_{lv})} \approx p_{sat}(T_{lv}) = P_{sat_{ref}}\exp\left[\frac{\overline{M}_{h_{fg}}}{\overline{R}}\left(\frac{1}{T_{sat_{ref}}} - \frac{1}{T_{lv}}\right)\right] \qquad \text{Eqn. (27)}$$

After applying all the assumptions above, the Schrage model was simplified to Eqn. (28):

$$m^*_{evap} = \frac{2\sigma}{2-\sigma}\left(\frac{\overline{M}}{2\pi\overline{R}}\right)^{\frac{1}{2}}\frac{1}{T_{lv}^{\frac{1}{2}}}\left\{p_{sat_{ref}}\exp\left(\frac{Mh_{fg}}{\overline{R}}\left(\frac{1}{\tau_{sat_{ref}}} - \frac{1}{\tau_{lv}}\right)\right)\right\} \qquad \text{Eqn. (28)}$$

The mass flux at the interface for each component in the gas domain was obtained from the convection and diffusion term in Eqn. (25C) as shown in Eqn. (29) and Eqn. (30):

$$m''_v = \overline{M}\cdot\left(-D\frac{\partial C_v}{\partial n} + \vec{V}_n C_v\right) \qquad \text{Eqn. (29)}$$

$$m^*_{air} = \overline{M}\cdot\left(-D\frac{\partial C_{air}}{\partial n} + \vec{V}_n C_{air}\right) \qquad \text{Eqn. (30)}$$

Since there was no air diffusion at the liquid-vapor interface, $m''_{air}=0$ and $\vec{V}_n$ was derived as:

$$\vec{V}_n = \frac{1}{C_{air}}\cdot D\frac{\partial C_{air}}{\partial n} = -\frac{1}{C_g - C_v}\cdot D\frac{\partial C_v}{\partial n} \qquad \text{Eqn. (31)}$$

$\vec{V}_n$ was substituted into Eqn. (29) and the vapor mass flux was expressed as Eqn. (32):

$$m^*_v = \overline{M}\cdot D\frac{\partial C_v}{\partial n}\left(1 + \frac{C_v}{C_g - C_v}\right) \qquad \text{Eqn. (32)}$$

At the interface, the evaporation rate was equal to the vapor mass flux. Vapor pressure and vapor concentration rate can then be calculated using Eqn. (33) and Eqn. (34) (shown below).

$$p_v = p_{equ} - m^*_v/\left[\frac{2\sigma}{2-\sigma}\left(\frac{\overline{M}}{2\pi\overline{R}}\right)^{\frac{1}{2}}\frac{1}{T_{lv}^{\frac{1}{2}}}\right] \qquad \text{Eqn. (33)}$$

$$C_v = \frac{p_v C_g}{p_{atm}} \qquad \text{Eqn. (34)}$$

In the VOF method described above, the interface cells consisted of the liquid phase and air-mix phase, with a phase indicator. At the interface, the density and viscosity were defined by Eqn. (35) and Eqn. (36):

$$\rho = \varphi \rho_{liquid} + (1-\varphi)\rho_{vapor} \quad \text{Eqn. (35)}$$

$$\mu = \varphi \mu_{liquid} + (1-\varphi)\mu_{vapor} \quad \text{Eqn. (36)}$$

The mass conservation for each phase was ensured by the incorporation of Eqn. (37):

$$\frac{\partial \varphi}{\partial t} + \overline{V}\nabla\varphi = Src \quad \text{Eqn. (37)}$$

where Src represents a volumetric source term. The phase change induced heat transfer was computed using Eqn. (38):

$$Q = -h \cdot Src \quad \text{Eqn. (38)}$$

The energy equation was given by Eqn. (39):

$$\frac{\partial(pE)}{\partial t} + \nabla\overline{V}\cdot[(pE+p)] = \nabla\cdot(k\nabla T) + Q \quad \text{Eqn. (39)}$$

At the liquid-vapor interface, the evaporation mass flux calculated by the Schrage model was set equal to the vapor diffusion flux derived from the gas domain governing equation. This allowed the calculation of the local evaporation rate along the meniscus after several iterations. A user defined function (UDF) was written based on the mathematical model previously discussed and was implemented in ANSYS Fluent R17.1 to perform the simulations.

The VOF model was implemented subject to several boundary conditions described below. The outlet boundary was set as constant atmospheric pressure to simulate the microdroplet's evaporation in ambient environment. Adiabatic non-slip walls were assumed along the micropillar top surface. The surface was assigned an equilibrium contact angle, $\theta_e$, of 23° to enable the droplet to relax its geometry and attain different equilibrium states on different micropillars. In order to initiate the evaporation process in the transient VOF simulation, the simulation domain was initialized with a vapor mass-fraction of 5%.

Initially, the inlet boundary was set as a mass-flow inlet condition with a mass flow rate of $1\times10^{-9}$ kg/s. After the liquid formed a convex meniscus with its contact line pinned on the pillar edge, the inlet boundary condition was changed to a pressure inlet. The pressure value was adjusted carefully, allowing the meniscus to expand and equilibrate so that the total liquid vapor interfacial area was equivalent to a pre-set value. In the simulation, the total liquid-vapor interfacial area was kept constant ($2\times10^{-11}$ m$^2$) for evaporation from all three micropillars. The total interfacial surface areas for the hemispherical, triangular, and square microdroplets were calculated using Surface Evolver.

In this study, the VOF method was implemented using ANYSTS Fluent R17.1 to simulate two-phase evaporation with a free surface. Each phase was calculated and separated with a volume fraction in mesh cells. This procedure was more flexible and efficient than other methods for treating complicated free boundary configurations. To model the mass transport at the evaporating interface, a user defined function (UDF) was developed to implement the simplified Schrage model. The source terms in both the mass transfer equation and energy transport equation are created using a user-defined scalar (UDS).

ICEM 18.0 software was used to generate a structured mesh with a hexahedron shape for the simulation. Because the VOF method was characterized by the mesh of the geometry, the mesh resolution significantly influenced the simulation result. A mesh sensitivity study was conducted to compare three levels of mesh resolution. The base element lengths were 5 nm for fine mesh, 12.5 nm for medium mesh, and 20 nm for coarse mesh. The thickness of the interface (transition region from liquid to vapor) of the coarse mesh was 200% larger than that of the medium mesh, while the difference between the fine mesh and medium mesh was only 10%.

Ideally, the interface should be as thin as possible; however, this was not observed for the coarse mesh. Table 2 and Table 3 as shown below summarize the total evaporation rates of droplets modeled using the three mesh resolution levels described above, using the Schrage model as described above. The equilibrium evaporation rates of the results from coarse mesh were 7.1% larger than those of medium mesh, and the difference between the results from the fine mesh and coarse mesh was only 1%. Therefore, we chose the medium mesh with an element length of 12.5 nm for the simulation. The mesh-independence for both the square pillar case and the triangular pillar case were tested, and the results are shown in Table 3 and 4 respectively.

TABLE 3

Mesh-independence results for the square case

| | Fine mesh (5 mm) | Medium mesh (1.5 mm) | Coarse Mesh (20 mm) |
|---|---|---|---|
| Number of cells | 13,547,920 | 3,386,980 | 964,995 |
| Total evaporation rate (kg/s) | $1.36\times10^{-13}$ | $1.38\times10^{-13}$ | $1.49\times10^{-13}$ |

TABLE 4

Mesh-independence results for the triangular case

| | Fine mesh (5 mm) | Medium mesh (1.5 mm) | Coarse Mesh (20 mm) |
|---|---|---|---|
| Number of cells | 14,098,128 | 3,524,532 | 881,113 |
| Total evaporation rate (kg/s) | $1.54\times10^{-13}$ | $1.57\times10^{-13}$ | $1.69\times10^{-13}$ |

Details of input parameters, working fluid properties, and the numerical solution methods are summarized in Table 5:

TABLE 5

Input parameters and modeling setup

| Input Parameters | Value |
|---|---|
| Outer Diameter, D | 5 μm |
| Inner Diameter, d | 2.5 μm |
| Interfacial Area, A | $2\times10^{-11}$ m$^2$ |
| Perimeter, L | $1.57\times10^{-5}$ m |
| Liquid Temperature, $T_l$ | 300K |
| Vapor Temperature $T_v$ | 300K |
| Outlet Pressure, $P_{outlet}$ | 101325 Pa |
| **Properties** | **Water** |
| Accommodation coefficient, σ | 1.0 [43] |
| Surface Tension | $7.3\times10^{-2}$ N/m |
| Dynamic Viscosity, μ | $1.0\times10^{-3}$ kg/m-s |
| Equilibrium contact angle, $\theta_e$ | 23° |

TABLE 5-continued

| Solution methods | Setup | | |
|---|---|---|---|
| Number of Cells | Circular<br>235,623 | Triangular<br>3,524,532 | Square<br>3,386,980 |
| Pressure | Pressure Staggering Option (PRESTO!) | | |
| Momentum | Second Order Upwind | | |
| Volume Fraction | Geo-Reconstruct | | |
| Time Stepping Method | Variable: Global Courant = 2 | | |

An analytical model was established using Popov's model (expressed in Eqn. (40) and Eqn. (41)) using MATLAB:

$$m^*(r) = D\frac{x_s - n_w}{s_i}\left[\frac{1}{2}\sin\theta + \sqrt{2}\,(\cosh\kappa + \cos\theta)^{3/2}\right] \quad \text{Eqn. (40)}$$

$$\int_0^\infty \frac{\cosh\theta t}{\cosh\pi\tau}\tan h[(\pi-\theta)\tau]P_{\frac{1}{2}x}(\cosh\kappa)\tau d\tau$$

$$\frac{\partial M}{dt} = -\pi r_i D(n_i - n_w)f(\theta); \quad \text{Eqn. (41)}$$

$$f(\theta) = \frac{\sin\theta}{1+\cos\theta} + 4\int_0^\infty \frac{1+\cosh\alpha\theta\tau}{\sinh 2\pi\tau}\tanh[(\pi-\theta)\tau]d\tau \quad \text{Eqn. (41)}$$

where f(θ) was a function of the contact angle, m"(r) was evaporation flux, $n_s$ was density of the saturated vapor, $n_\infty$ was ambient vapor density, $\theta_e$ was equilibrium contact angle, κ was droplet interface in toroidal coordinates, $P_{-1/2+i\tau}$ was a Legendre function of the first kind, M was total evaporation rate, and τ was nondimensional time.

Since Popov's model is applied in axisymmetric systems, evaporative microdroplets on circular micropillars that yielded hemisphere-shaped menisci were modeled to validate the results from Fluent as described above. The total evaporation rates of microdroplets on circular pillar structures using Popov's model in MATLAB and using the Schrage model in Fluent were $0.936\times10^{-13}$ kg/s and $1.31\times10^{-13}$ kg/s, respectively. These differences between the two results was likely due to assumptions associated with Popov's model, which neglects the effects of microconvection within the droplet and non-uniform vapor concentration at the interface, both of which decrease the total evaporation rate.

Figure 34:
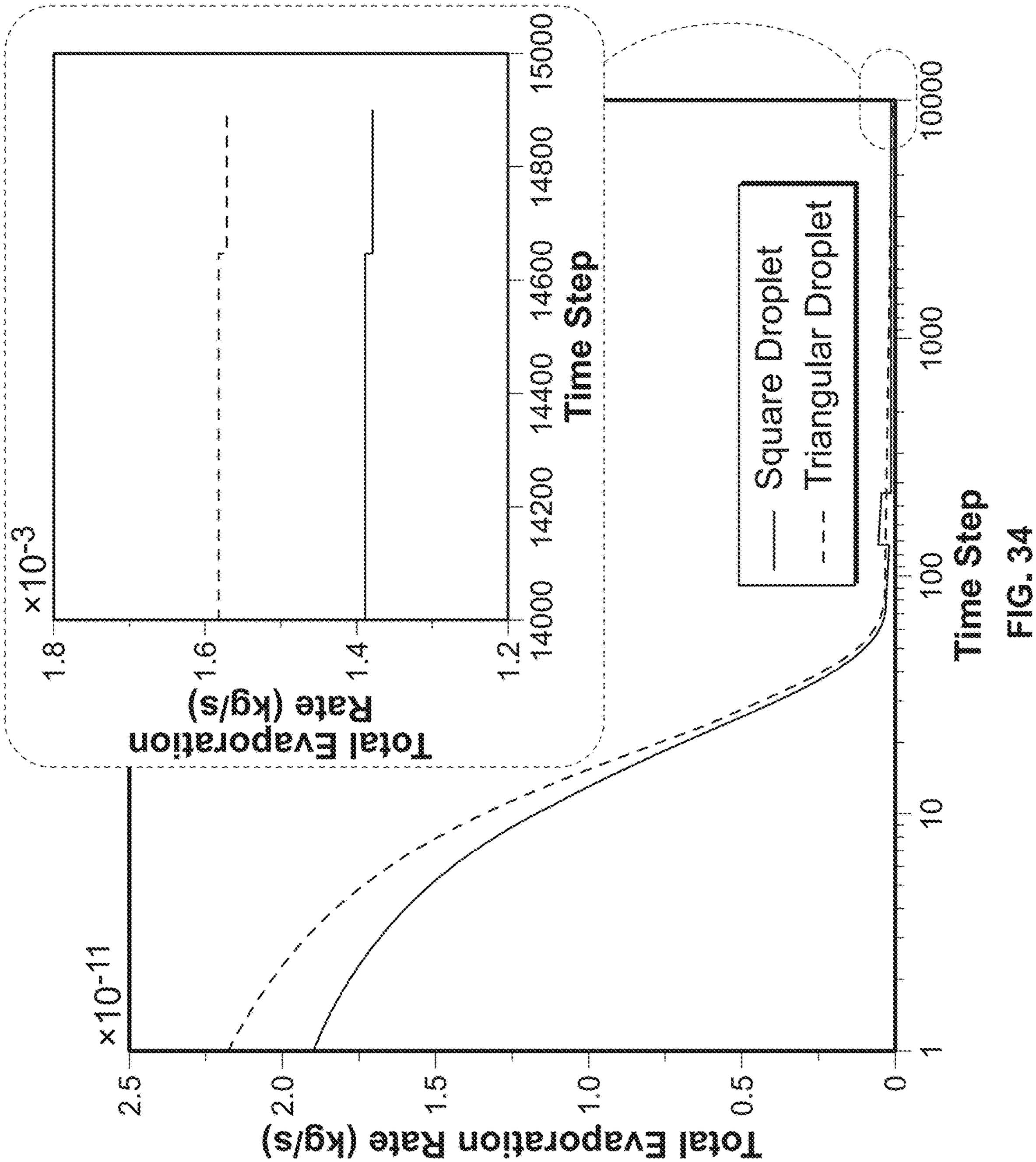
FIG. 34 is a graph of the change in total evaporation rate for the triangular and square droplets as a function of time during a transient simulation.
Figure 35A:
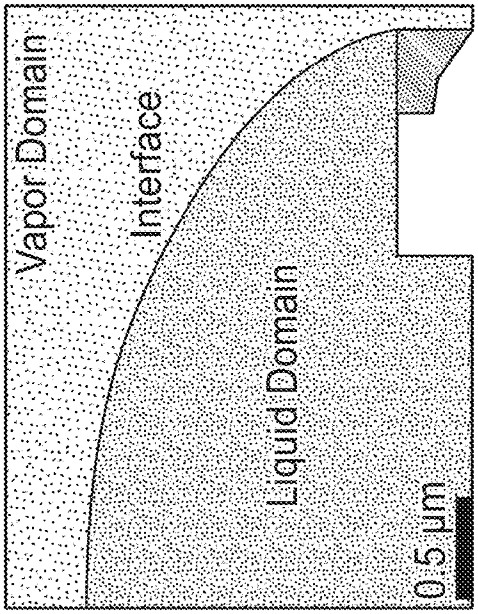
FIGS. 35A-35D are a series of cross-section profiles of droplets confined on triangular and square micropillars after an equilibrium geometry was obtained.
Figure 35B:
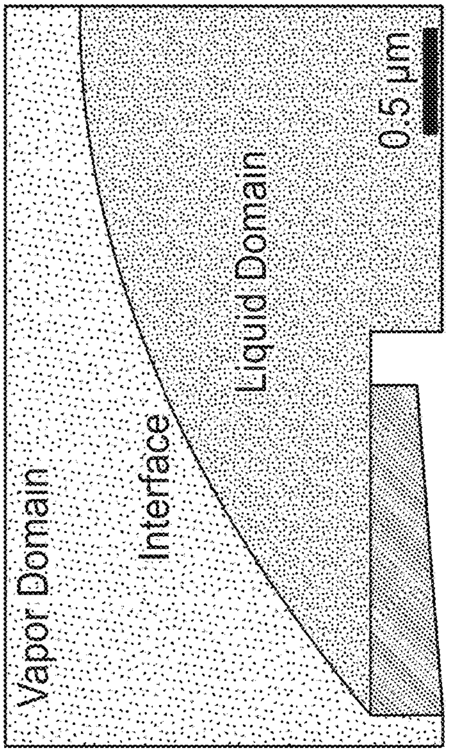
Figure 35C:
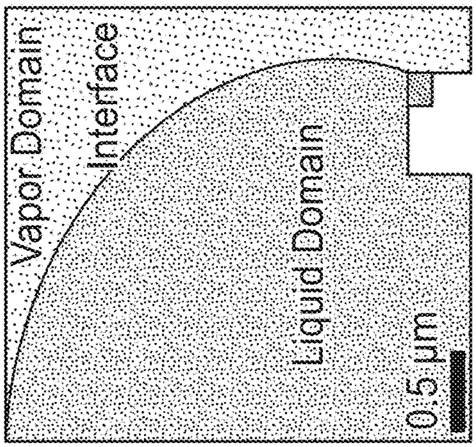
Figure 35D:
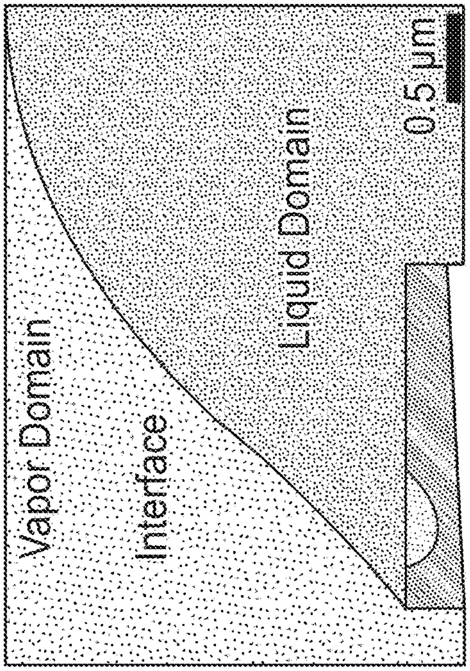

The change in total evaporation rate for the triangular and square droplets as a function of time during the transient simulation are shown in FIG. 34. At the beginning stages, the vapor fraction in the gas domain was very small and evaporation from the interface was not suppressed by the vapor diffusion. As a result, initial and total evaporation rates for both cases were around $2^{-11}$ kg/s. As the vapor fraction in the gas domain increased over time, evaporation was hindered by vapor diffusion, resulting in a gradual decrease in the total evaporation rate for both droplets. After the vapor concentration reached an equilibrium condition late in the simulation, the evaporation rates from the droplet surfaces were the same as the vapor diffusion rates, leading to stable total evaporation rate representing the evaporating behavior of the droplets at the equilibrium state.

Since the droplet geometry on triangular and square micropillars was not axisymmetric, the simulation results were assessed on cross-section planes with three different azimuthal angles. The azimuthal angles α were chosen to be 0°, 20°, and 40° for the square case and 0°, 30°, and 60° for the triangular case, respectively. FIGS. 35A-35D show the cross-section profiles of droplets confined on triangular (FIGS. 35A and 35B) and square (FIGS. 35C and 35D) micropillars after an equilibrium geometry was obtained. For axisymmetric droplets, the apparent contact angle $\theta_{ap}$ varied significantly along the triple phase contact line (TPL). Depending on the azimuthal angle, the cross-section meniscus exhibited either a hydrophilic (i.e., $\theta_a$<90°) or a hydrophobic (i.e., $\theta_a$>90°) characteristic along the microdroplet. Also, the cross-section contours revealed a complex change of curvature from the top of the droplet to the contact line region. While the 2D profiles did not provide a full description of the meniscus profile and local curvature on the 3D interface, it was observed that the contact angle measured at a small azimuthal angle position (α=0°) was significantly larger than the corresponding contact angle measured at a large azimuthal angle position (α=45°). The larger contact angle resulted in stronger suppression to vapor diffusion and therefore a smaller evaporation rate at the contact line region. Therefore, it was expected that the evaporation rate would continue to increase at higher azimuthal angles due to the decrease in contact angle.

While it appeared from the 2D profile shown in FIGS. 35A-35D that the menisci at smaller azimuthal angles were more curved compared to corresponding menisci at larger azimuthal angles, the menisci taken at large azimuthal angles were actually located at sharp corner locations of the non-axisymmetric geometries (i.e., the corner points of the triangle and square). Therefore, these menisci resembled the boundary edge lines between two adjacent surfaces of the non-axisymmetric droplet and possessed much higher curvatures compared to the menisci taken at small azimuthal angle (i.e., crossing the center of the sides of the triangle or square). A convex meniscus with higher curvature facilitated stronger evaporation and vapor diffusion due to the larger Laplace pressure and higher local concentration gradient. Therefore, higher local curvature also induced stronger evaporation rates at locations with higher azimuthal angles. The combined effects of smaller contact angle and higher local curvature at locations with high azimuthal angle contributed to significantly higher local evaporation rates at these locations. Consequently, the triangular and square micropillars exhibited highly non-uniform evaporation over the whole droplet characterized by enhanced local evaporation near edge locations and suppressed local evaporation near the center locations of the microdroplet.

Unlike a planar substrate, where the solid wall geometrically confines vapor diffusion into the ambient atmosphere, the micropillars described above exhibited a 90° sharp edge at the contact line region, and therefore did not induce significant vapor diffusion impedance. For all azimuthal angles, the highest local saturated vapor pressure was always observed at the contact line region. This high local vapor pressure induced a vapor concentration gradient near the contact line region and therefore promoted faster vapor diffusion from the contact line to the ambient atmosphere. Consequently, the local evaporation flux along the cross-section profile of a droplet on a micropillar was always the highest near the contact line region in this study regardless of the azimuthal angle. However, whether such characteristic is sustained for droplets with an apparent contact angle exceeding 90° over all azimuthal angles remains to be characterized. Since the contact line region was no longer subjected to wall confinement, it was anticipated that the evaporation rate may still be highest near the contact line even for larger droplets.

For microdroplets with the same liquid-vapor interfacial area, the total evaporation rate of a triangular droplet was 14.3% higher than that of a square droplet, and the total evaporation rate of a square droplet was 5.2% higher than that of a capped spherical droplet. This phenomenon was attributable to the effects of radial curvature and azimuthal curvature associated with micropillar geometry.

Figure 36:
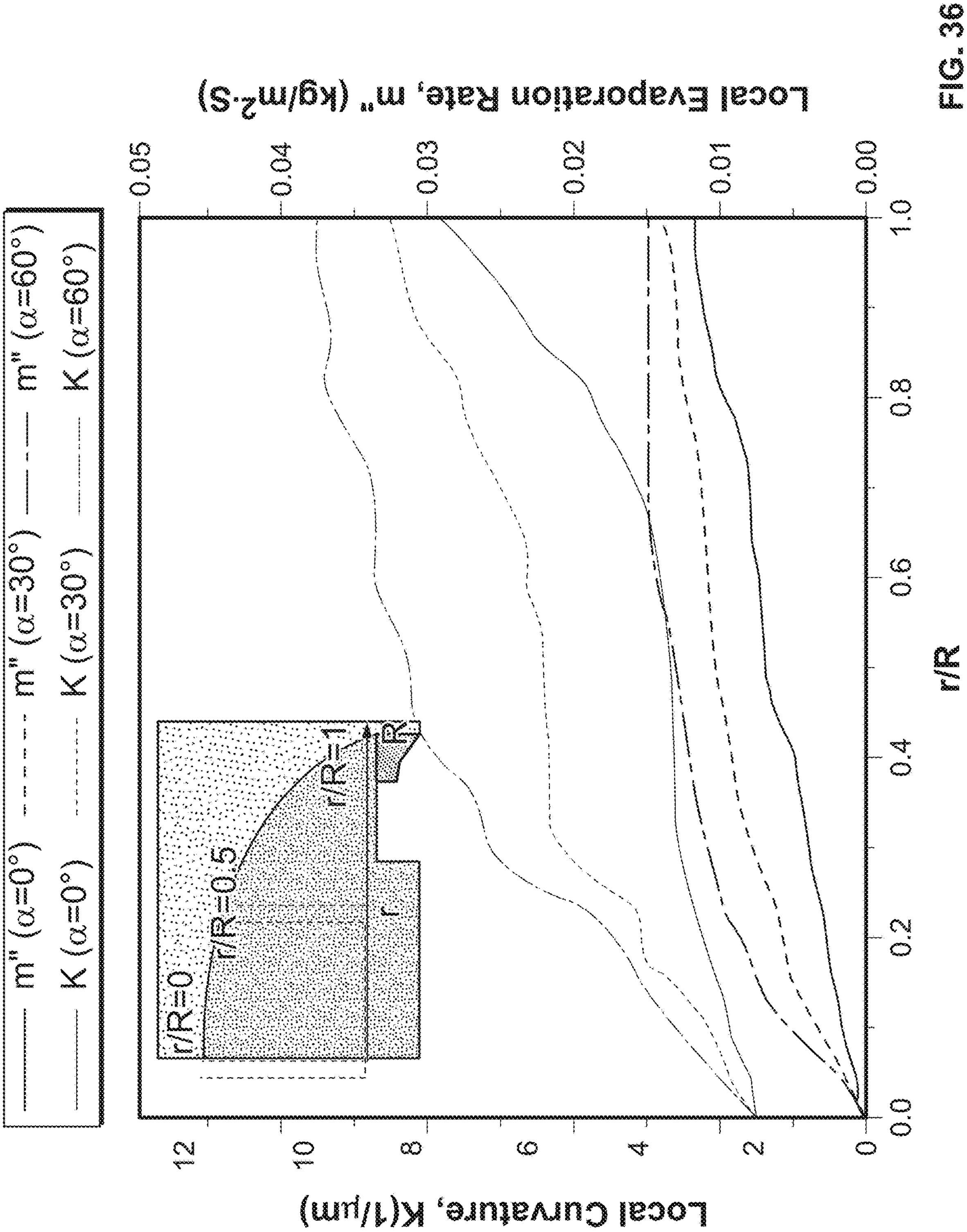
FIG. 36 is a graphical plot of the local evaporation flux along a droplet interface along the radial location on the droplet interface for three azimuthal angles for a droplet pinned on a triangular pillar.
Figure 37:
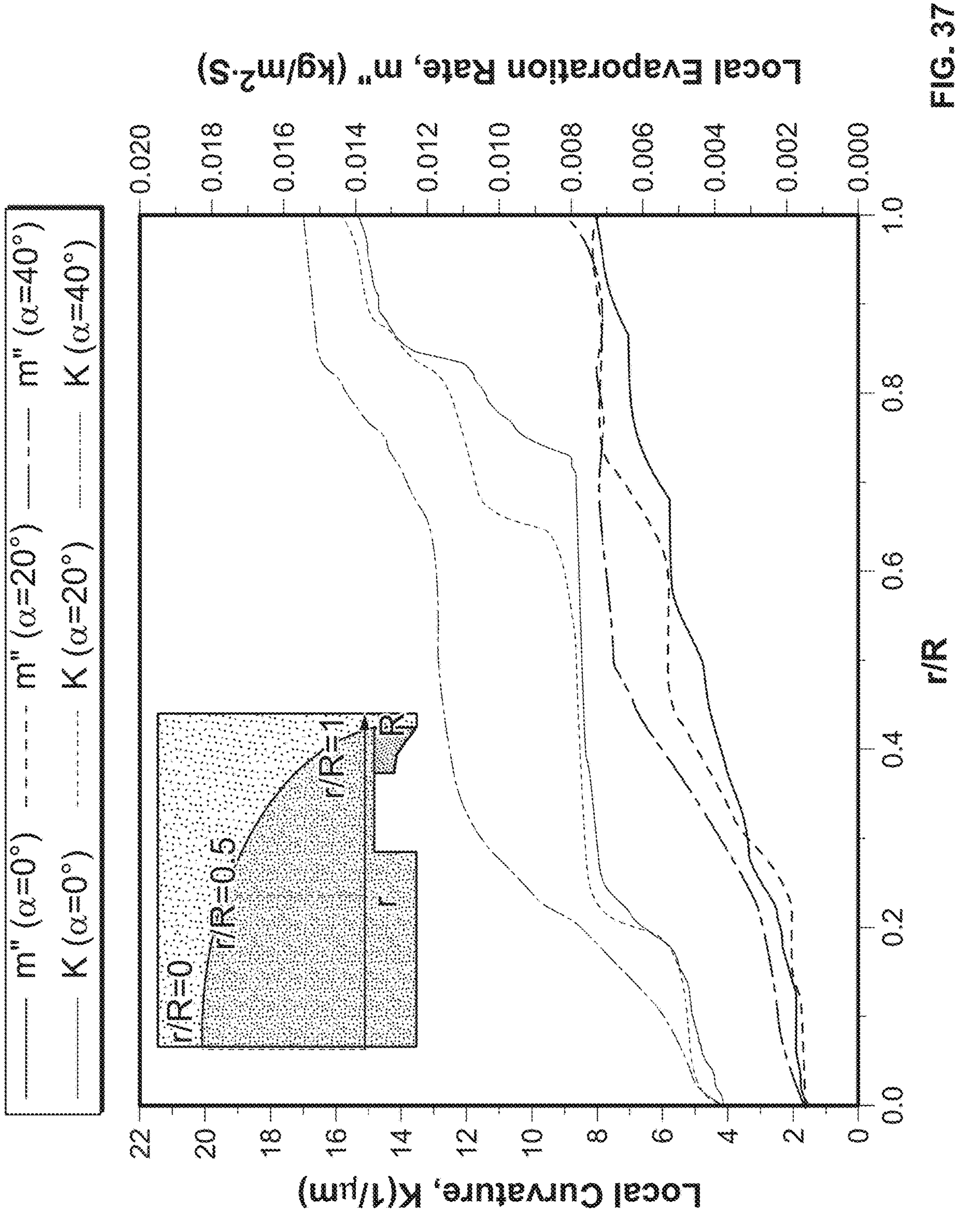
FIG. 37 is a graphical plot of the local evaporation flux along a droplet interface along the radial location on the droplet interface for three azimuthal angles for a droplet pinned on a square pillar.

The local evaporation flux along the droplet interface was plotted along the radial location on the droplet interface for three azimuthal angles, as shown in FIG. 36 (for a droplet pinned on a triangular pillar) and FIG. 37 (for a droplet pinned on a square pillar), where the radial location, r, was normalized by the droplet radius, R. The local curvature was calculated by the MATLAB curve fitting tool. The local evaporation mass flux was compared with the local curvature on a 3D curved interface.

For a triangular droplet (see FIG. 36), at the same azimuthal angle, the evaporation rate increased monotonically from the top of the droplet to the contact line region, which was accompanied by an increase in local curvature. For a square droplet (see FIG. 37), the rise of the local evaporation rate slowed when approaching the contact line, in accordance with the observed trend of curvature change. For the square confined microdroplet, at relatively small angles the curvature varied significantly along the interface. However, as azimuthal angle increased, the curvature near the contact line approached a constant value because the meniscus transformed from a distorted sphere-like shape into a cone-like shape. For these cases, the evaporation flux change near the contact line was affected only by the geometrical confinement.

For a fixed radial distance, the liquid tended to evaporate faster with increasing azimuthal angles, i.e., moving from the flat region to the corner region on the contact line. This trend was observed to closely match the change of local curvature in the azimuthal direction. Consequently, the azimuthally inhomogeneous curvature distribution contributed to the evaporation variation near the contact line region. The abrupt change of surface geometry enforced the increase in meniscus curvature along the contact line, leading to enhanced evaporation. This effect was especially prominent for the triangular microdroplet because the sharper corner triggered larger vapor concentration gradient.

The total evaporation rates from microdroplets with different geometries at an ambient temperature are summarized in Table 6.

TABLE 6

Total evaporation rate of droplets on different shapes of micropillars

| | Hemispherical Droplet | Triangular Droplet | Square Droplet |
|---|---|---|---|
| Total evaporation rate (kg/s), M | | $1.31 \times 10^{-13}$ | $1.57 \times 10^{-13}$ |

Figure 38:
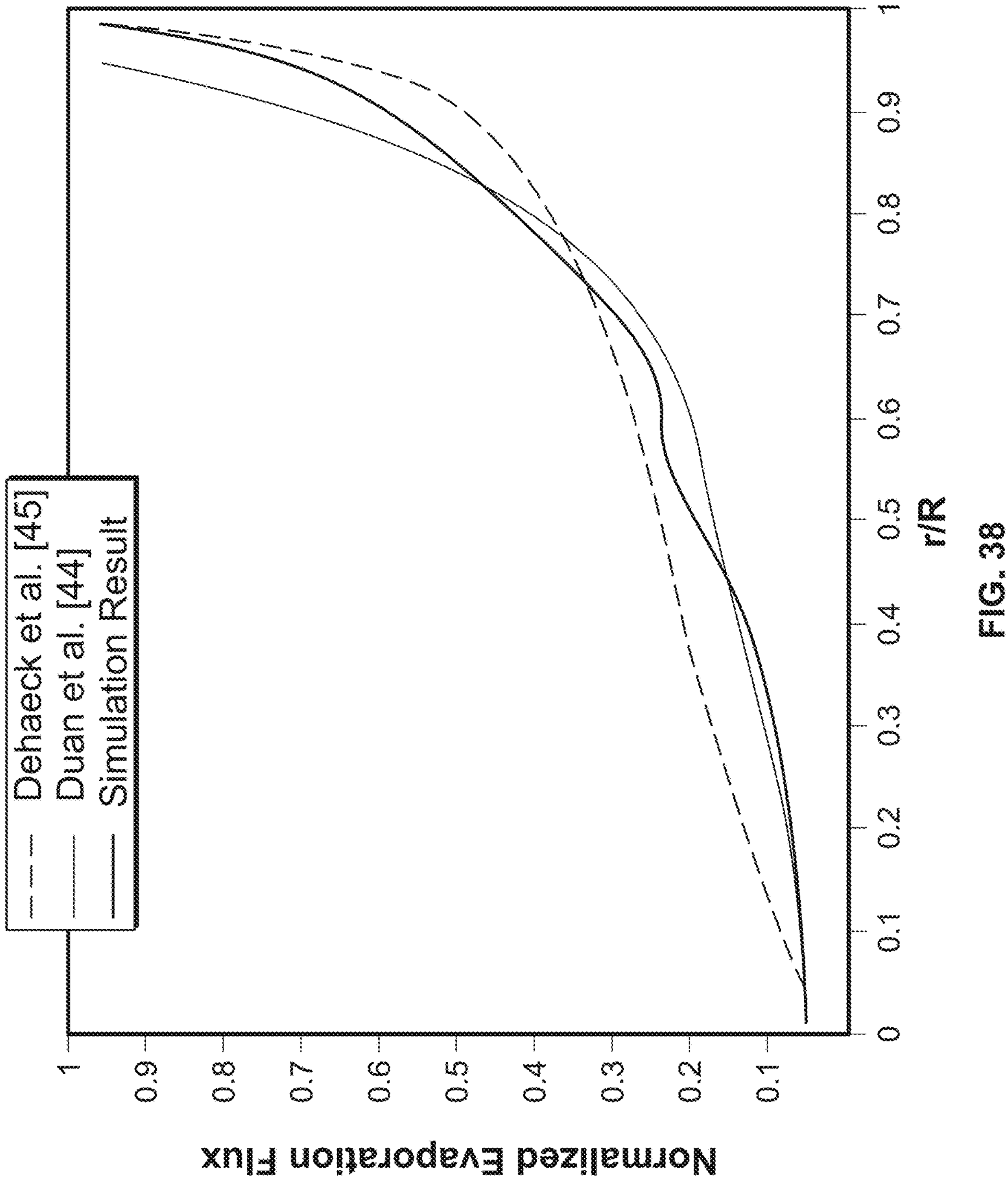
FIG. 38 is a graph comparing the local evaporation flux along the liquid-vapor interface of droplets on circular micropillars.

Referring to Table 6, the evaporation rate of droplets on square micropillars was 5.4% larger than that on circular micropillars. Further, the evaporation rate of droplets on triangular micropillars was 20% larger than that on circular micropillars. FIG. 38 compares the local evaporation flux along the liquid-vapor interface of droplets on circular micropillars simulated as described above to corresponding results from existing experimental studies. To compare the distribution of local evaporation rate under different simulation and experimental conditions, all the data were normalized with respect to the maximum local evaporation rate obtained at r/R=1. Referring to FIG. 38, the local evaporation flux distributions of all three cases followed the same trend where the local evaporation rate increased monotonically from the center of the droplet towards the edge of the droplet. This trend was in accordance with the general evaporation characteristics observed for hydrophilic droplets (i.e., $\theta_e < 90°$). However, the comparison illustrated in FIG. 38 revealed significant deviations between the local evaporation flux curves obtained from the different studies due to the variation in the evaporation conditions (e.g., working fluid, environmental condition, substrate profile). In particular, the simulation described above assumed evaporation of droplets deposited from vertical micropillars projecting from a substrate as described above, while the previous experimental results were obtained using droplets deposited on planar surfaces.

Without being limited to any particular theory, evaporation of droplets from planar substrates is thought to prohibit the diffusion of vapor in a downward direction, resulting in reduced total evaporation rate and reduced local evaporative flux near the triple phase contact line (TPL). By contrast, during evaporation of droplets on a vertical micropillar, the vapor is thought to diffuse partially in the downward direction at the TPL, yielding both an enhanced local evaporation rate at these regions and a higher total evaporation rate.

The results of these experiments indicated that the evaporation characteristics of non-axisymmetric droplets deviated from the corresponding evaporation characteristics of symmetric spherical droplets, and further found that local evaporation rate was strongly dependent on the local curvature of the droplet. Specifically, it was found that the surface tends to curve more sharply near both the contact line region (i.e., r/R~1) and near the sharp corner regions (i.e., α~40° for a square micropillar, and α~60° for a triangular micropillar), and local evaporation rates were found to be highest near these regions. The curvature effect was also observed in the global transport characteristics, where the total evaporation rates from droplets with triangular and square contact areas were 14% and 8% higher than that from a capped spherical droplet, respectively. While by nature a sphere exhibits the smallest mean curvature with a fixed surface area, it was intriguing the droplets with pinned non-spherical contact areas had higher mean surface curvatures relative to capped spherical droplets, which promoted higher evaporation transport. Additional simulations of evaporation behavior of microdroplets with varied volumes, heated substrates, and complex geometries may further advance the characterization of curvature and wall confinement effects on evaporative cooling performance.

Example 2: Microscale Pinning/De-Pinning of Droplet Contact Lines Advancing Along Sharp Edges with Varying Angle and Roundness To assess the characteristics of microdroplet pinning and unpinning along sharp substrate edges on a microscale, the following experiments were conducted.

Figure 39:
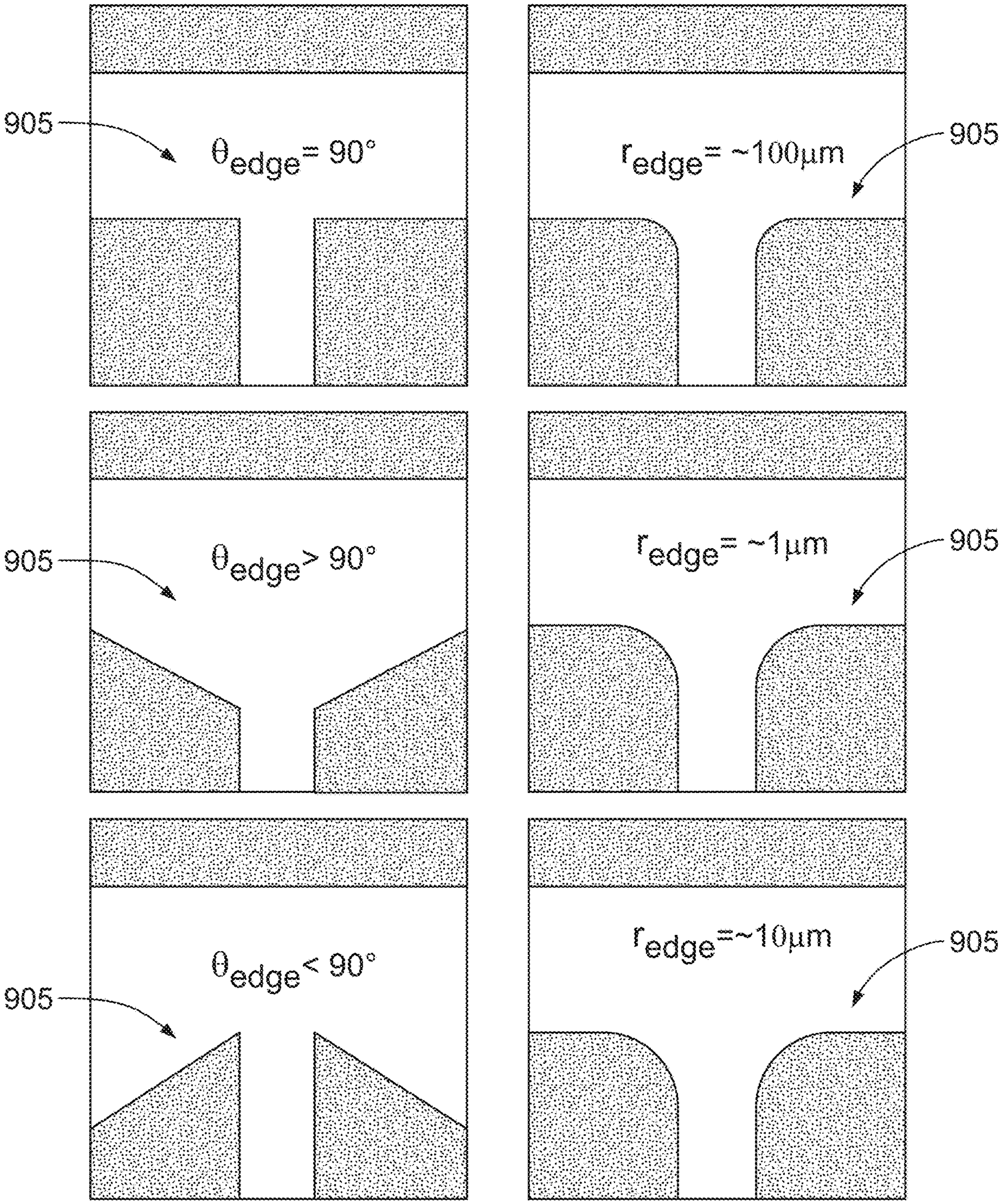
FIG. 39 is a series of schematic cross-sectional views of pillars with geometric edge features with different edge angles and roundness fabricated using lithography and etching techniques to produce different edge angle and roundness features.

Referring to FIG. 39, geometric edge features 905 with different edge angles and roundness were fabricated using lithography and etching techniques to produce different edge angle and roundness features. Specifically, T-shaped microchannels were fabricated on a plain silicon substrate with acute, right, or obtuse turning angles as shown in FIG. 39. The edge radius of curvature at these sharp edges was varied from ~100 nm, 1 μm to ~10 μm by changing the photolithography mask and controlling the developing/etching process. In order to achieve the high resolution (<1 μm) to distinguish the different degrees of roundness, laser scanning lithography was used to produce the target feature on the deposited photoresist material. By employing a laser scanning confocal microscope, the photoresist was be aligned and patterned with an accuracy of up to 250 nm. After the microchannel was formed, the substrate surface was functionalized with different chemicals to achieve different surface characteristics (e.g., superhydrophilic and superoleophobic). The functional coatings are provided at a uniform thickness by a continuous and smooth deposition of corresponding chemicals at the evaporation interface. The geometry of the microchannels and the quality of the nanocoatings were examined under scanning electron microscope (SEM), transmission electron microscope (TEM), atomic force microscope (AFM), and Raman spectroscopes.

High-speed visualizations of liquid propagating through the microchannel were obtained using both an optical microscope in the ambient environment and an environmental scanning electron microscope (ESEM). The advantage of an ESEM compared to standard SEMs was that the pressure of the sample vacuum chamber could be separated from the pressure of the beam leading vacuum chamber, therefore providing for sufficiently high working pressure such that water can remain in a liquid state. For both visualization tests, the microchannel was assembled on a liquid feed manifold connected to a micro-injector that provided a continuous inlet flow. Three different flow rates were examined, which corresponded to capillary numbers (Ca) of 0.001, 0.01 and 0.1. Under high Ca, the meniscus exhibited distorted geometry in overcoming the edge structure. For open-air experiments, a pressure transducer was connected to the liquid feed manifold to capture the change in liquid pressure as the meniscus advanced through the edge features. For in-situ tests using ESEM, a customized testing manifold for capturing the contact line dynamics at nanolength scale as the contact line advances continuously along a highly curved edge with finite length was built. A Peltier cooling stage was embedded in the manifold to control the sample temperature below the water dew point at the working pressure. Contact line movement over edge geometry was observable regardless of the magnitude of the radius of curvature. In either case, the local contact angle remained constant along the local geometry.

Example 3: Microdroplet Evaporation from a Hollow Micropillar

Figure 40:
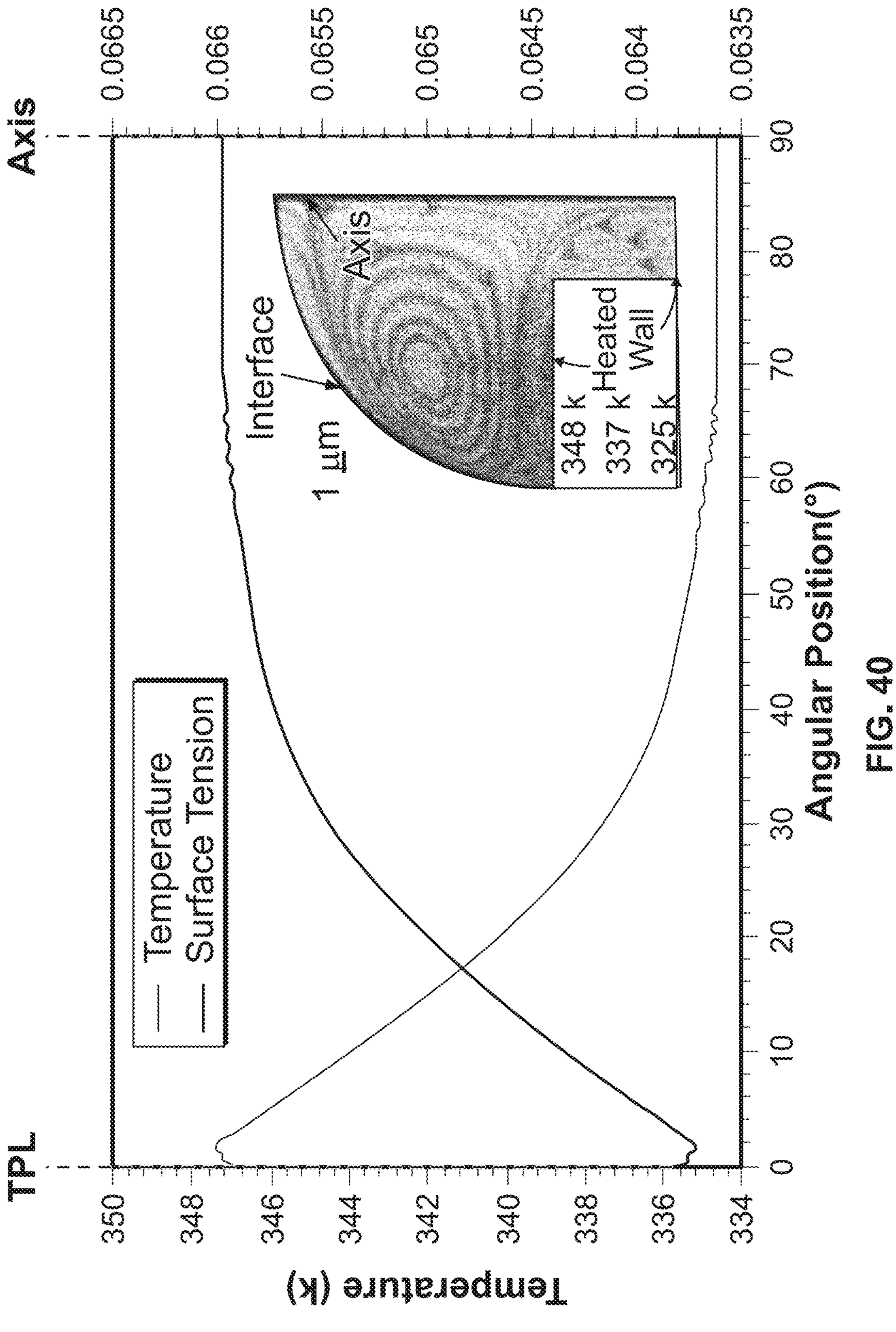
FIG. 40 is a graph comparing a triple-phase contact line (TPL) to the axis of a micropillar.
Figure 41:
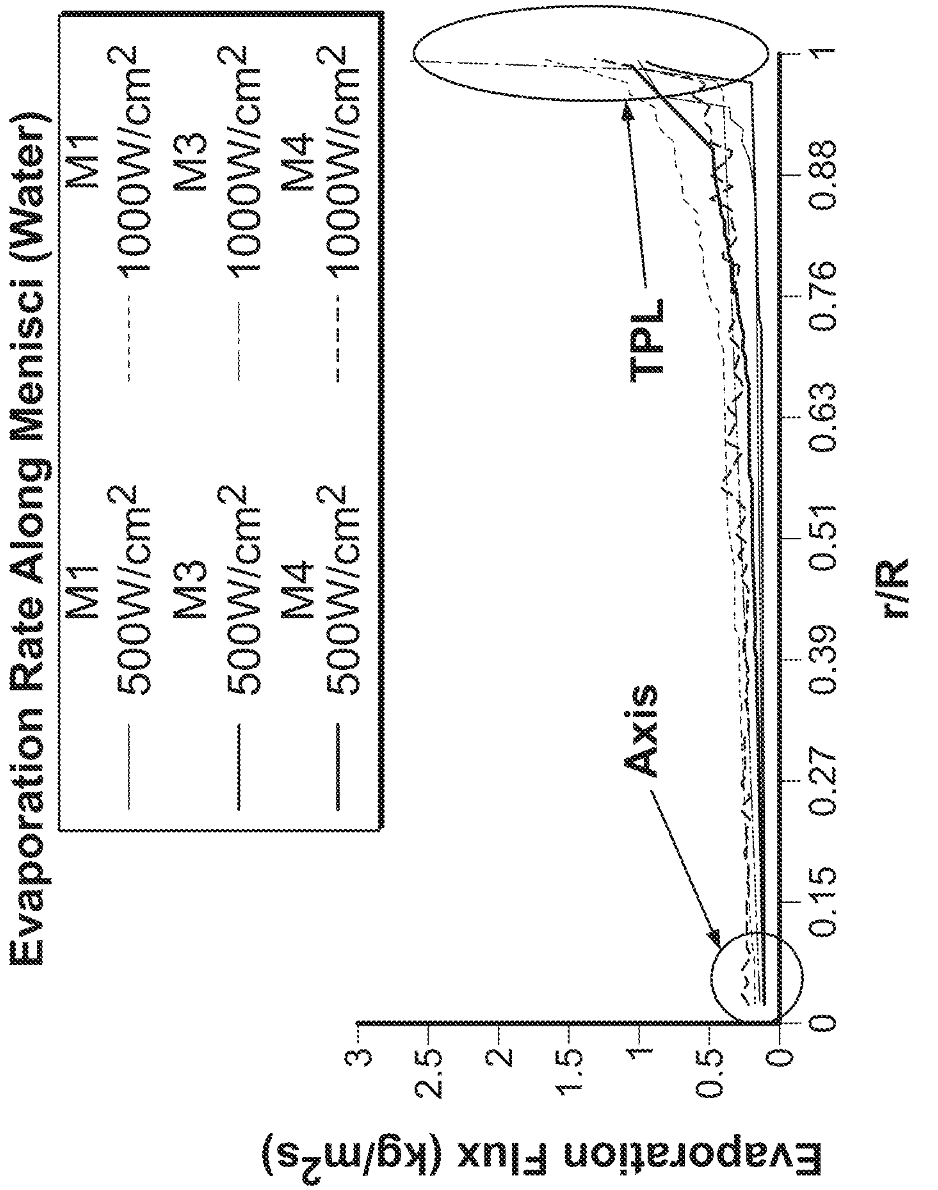
FIG. 41 is a graph of the evaporation rate along the menisci (water) and comparing the triple-phase contact (TPL) line to the axis of the micropillar.

A multiphase flow numerical simulation for observing microdroplet evaporation from a hollow micropillar was demonstrated. Factors in modeling droplets included vapor domain, liquid domain, pressure outlet, vapor diffusion, heat flux wall, axis, and the liquid-solid barrier. Measurements taken included temperature, surface tension, and angular position and observing the triple-phase contact line (TPL) in association to the axis of the micropillar (see FIG. 40). The evaporation rate along the menisci (water) was demonstrated observing the triple-phase contact (TPL) line in association to the axis of the micropillar as well (see FIG. 41). The average transfer coefficient versus the boundary heat flux were calculated (see FIG. 41). It was concluded that the evaporation from thin-film droplet allowed for average heat transfer coefficient exceeding $10^6$ W m$^{-2}$ K$^{-1}$ (table below). The highest rate of evaporation was located at the TPL. Models of different temperature contours for all the steps of evaporation including wicking, pivoting, retention, and expansion were created that demonstrate the interface as well as the TPL. Other types of simulations like molecular dynamics (MD) simulations were conducted to further demonstrate microdroplet evaporation.

TABLE 7

Average Heat Transfer Coefficient for Models

| Boundary | Average heat Transfer coefficient (W/m$^2$K) | | | |
|---|---|---|---|---|
| Heat Flux | Water M1 | Water M2 | Water M3 | Water M4 |
| 500 W/cm$^2$ | $1.64 \times 10^6$ | $4.40 \times 10^6$ | $1.29 \times 10^6$ | $3.99 \times 10^6$ |
| 1000 W/cm$^2$ | $7.68 \times 10^6$ | $9.77 \times 10^6$ | $4.65 \times 10^6$ | $5.13 \times 10^6$ |

Example 4: Macroscale Flow Behavior of Liquid Advancing Over Textured Surfaces and Through Porous Medium To explore the macroscale flow behavior of liquid advancing over textured surface and through porous medium, the following experiments are conducted. The wetting resistance of liquids spreading on textured surfaces is measured as described below.

The spread of liquids on surface provided with an ensemble of sharp edge features is quantitatively measured. Textured surfaces patterned with arrays of square micropillars are generated using existing positive photolithography techniques and deep reactive ion etching. FIG. 17 shows an example of a re-entrant nanopillar array fabricated on a silicon substrate with pillar diameter less than 500 nm following this technique. The surfaces are functionalized with polyhedral oligomeric silsesquioxanes (POSS) to yield a superomniphobic wetting characteristic, or further treated with $O_2$ plasma to yield a superomniphilic wetting characteristic. Advancing and receding contact angles of water and oil on the textured surface are measured with a goniometer by feeding and extracting the liquid with a syringe pump at different flow rates. The macroscale pinning/depinning forces are measured using a tensiometer. The procedure includes first holding a liquid droplet with a fixed volume at one end of a force balance and then slowly lowering the drop onto a test surface until a small compressive force (e.g., 1 nN) is measured to indicate the onset of surface contact. The pinning force is measured by slowly pushing the droplet in a horizontal direction until an abrupt change in force is observed, indicating a detachment from the previous surface. A statistical mechanics model is developed based on the wetting resistance observed over the single edge, to represent both the geometric and force measurements of liquid propagating on the micropillar array patterned surface.

A structured microchannel with well-defined sharp edge features to mimic a porous medium is fabricated. The fabrication follows the procedure described above to etch microchannel patterns into a silicon substrate. Subsequently, a poly-di-methyl-siloxane (PDMS) substrate seals the front side of the etched silicon to form closed flow channels. The pore and microchannels are initially filled with oil, and then water is injected from one end of the test assembly, forcing the pre-wetted oil to exit through the outlet located at the opposite end of the test assembly. A dynamic imaging and pressure response of the displacement process is captured using a high-speed camera and a pressure transducer, respectively. The transient behavior for fluid flow at pore-level, i.e., passing through a pore neck into a wider pore, follows the same principles as described above for the contact line dynamics of liquid wetting through one single edge feature. The macroscopic transport behavior is modeled following a statistical analysis, where the mean flow resistance is calculated by integrating the wetting resistance at each pore junction over the water-oil interface.

Example 5: Microscale Pinning/De-Pinning Behavior of Liquid Contact Lines of Microdroplets To investigate the microscale pinning/de-pinning behavior of liquid contact lines advancing along a sharp solid edge with varying wettability, angle and roundness, and to explore the macroscale flow behavior of liquid advancing over a textured surface modified with nanomaterials selected to modify the wetting profile, the following experiments are conducted.

Artificial solid edge features with a range of wetting characteristics through surface engineering are fabricated. The flow of aqueous and organic solvents over the edge feature with well-controlled velocity is manipulated using a digital microfluidic (DMF) device, and the transient behavior of the liquid contact line wetting over a solid edge which occurs within a few microseconds at sub-micrometer length scale is visualized. The experiments described below advance the science of the complex TPL region of an advancing liquid droplet on a solid surface, provide specific details for the characterization of such materials, and potentially reveal additional methods for controlling wettability in technological applications.

The capability for in-situ liquid cell TEM enabling direct observation of the nano-scale pinning/depinning behavior of advancing liquid contact lines is developed. Advanced contact angle experiments using digital microfluidics and the deposition of complex hybrid material interface structures are conducted. Coating technologies compatible with microfabricated devices that can deposit a wide range of nanomaterials (e.g., graphene, self-assembled monolayers, and metal-organic chalcogenolate assemblies) are developed for subsequent analysis. The deposition is performed by chemical vapor deposition (CVD) or vapor solid growth (VSG), depending on the compound in will be tuned from ~37° to ~68° with graphene coatings of different thicknesses. The resulting materials are characterized using standard static contact angle techniques.

T-shaped silicon microchannels with different geometries are fabricated and Exfoliated graphene is deposited onto channel surfaces to produce a representative sample. Self-assembled monolayers are deposited within the channels, but the texture of the supporting metals may be incommensurate with measurements of advancing liquid contact lines. Deposition of MOCHA, a hydrophobic, layered semiconducting interface is conducted. These MOCHA materials are deposited directly by depositing silver metal, oxidizing the silver metal to the silver oxide, and converting the silver oxide to a functional hybrid material subsequently using benzeneselenol vapor.

An optoelectrowetting digital microfluidic (DMF) device for manipulating the advancement of the liquid contact line along the solid edge is fabricated. The evolution of the meniscus is observed by the optical microscope. In this scheme, droplet actuation force is determined from capacitive feedback from the DMF device from which the wetting characteristics of the interface is extracted.

Example 6: Analytical Predictions

Figure 42:
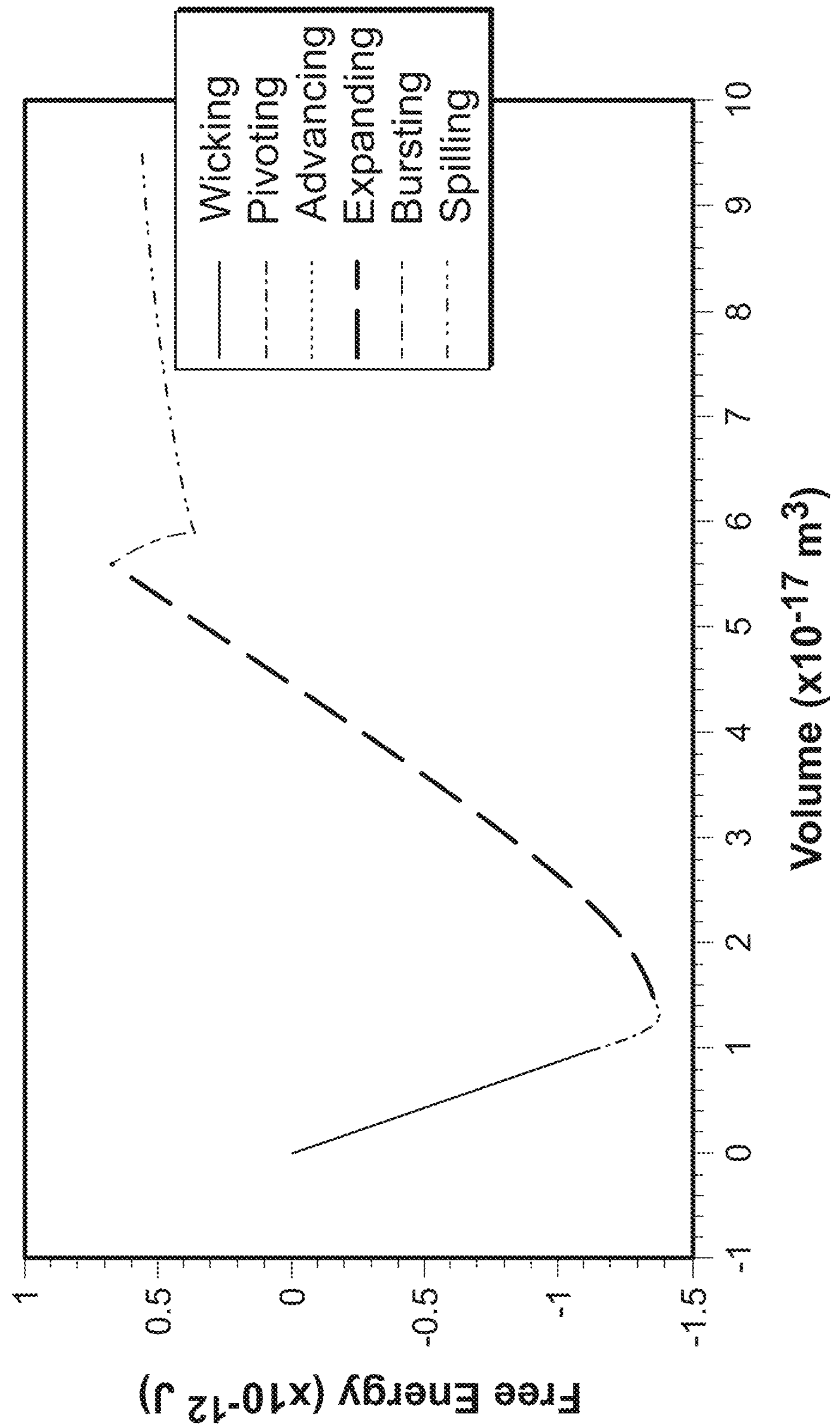
FIG. 42 is a graph of analytically predicted liquid free energy as liquid flows through a single hollow micropillar.
Figure 43:
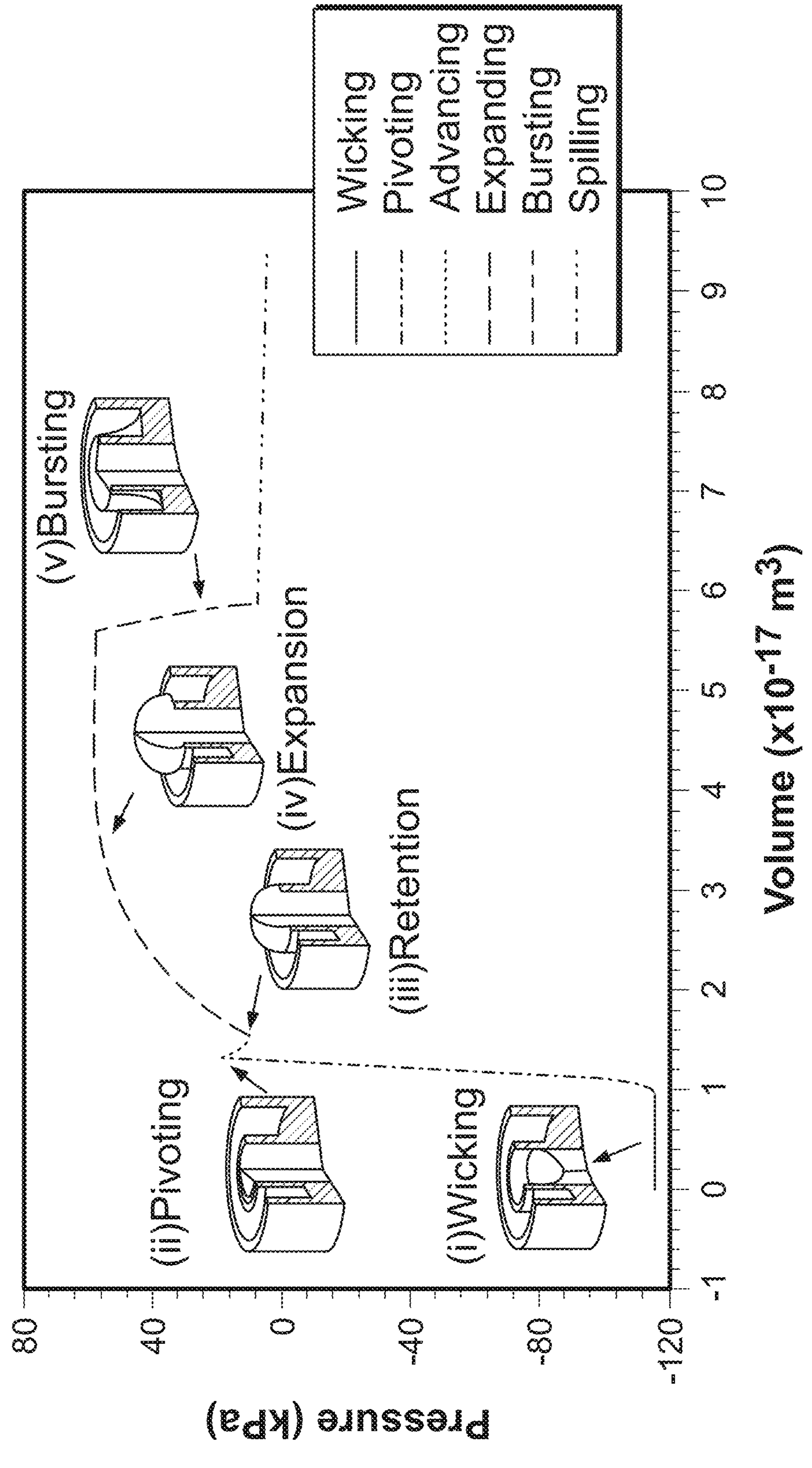
FIG. 43 is a graph of analytically predicted liquid pressure variation as liquid flows through a single hollow micropillar.

FIGS. 42 and 43 show the analytically predicted liquid free energy and pressure variation as liquid flows through a single hollow micropillar. The predictions were made based on a quasi-static assumption which neglects any viscous, gravitational, or other dynamic effects. The dotted red line represents the instantaneous bursting moment, accompanied by a sudden jump in liquid free energy and pressure. Indicated sections of FIG. 43 show wicking through the inner micropillar, pivoting from a concave to convex shape along the inner pillar edges, advancing along the top micropillar surface and pinning along the outer pillar edge, expansion of the meniscus beyond a hemisphere along the outer pillar edge, and bursting (i.e., droplet collapse). The meniscus initially wicks through the micropillar, which leads to a constant increase in the solid-liquid interfacial area and a decrease in the liquid-air interfacial area. Since the interfacial energy between the solid and liquid is far smaller than that between the liquid and air, there is a constant decrease in total free energy, which corresponds to a constant negative Laplace pressure (see FIG. 43, part i). As the meniscus flows to the top micropillar surface, it pins along the inner pillar edge with an inner diameter. At this point, the meniscus pivots from a concave to convex shape, which results in a transition from negative to positive Laplace pressure (see FIG. 43, part ii). After formation of the intrinsic contact angle, $\theta_y$, with respect to the top micropillar surface, a discernable pressure drop occurs. This pressure drop is attributed to the advance of the contact line from the inner edge toward the outer edge, during which an increase in the radius of curvature leads to reduced Laplace pressure across the liquid-vapor interface (see FIG. 43, part iii). Once liquid wets the edge, an increase in liquid pressure is observed due to the increase in the contact angle. The maximum pressure is obtained when the liquid forms a hemisphere (see FIG. 43, part iv). As liquid expands further beyond a hemisphere while being pinned on the edge, a slight decrease in pressure is observed due to increase in radius of curvature. Once the burst criterion is reached (see FIG. 43, part v), the liquid collapses spontaneously and a sharp decrease in pressure is observed. A small pressure is required to drive the liquid to spread freely on the substrate.

Example 7—Molecular Dynamics Model

In various aspects, molecular dynamics (MD) simulations explain the molecular origins of wetting barriers at sharp edges. In particular, MD simulations show a wetting barrier induced by the molecular interactions between the solid wall and a small amount of liquid in the vicinity of the contact line region. In the MD simulation, an initial molecular configuration is established by placing a small cubic water molecule on a solid substrate with a sharp edge. When the system is relaxed in an isobaric-isothermal ensemble, the liquid equilibrates itself by spreading on the substrate and forming a capped sphere pinned at the sharp edge. A small extra amount of liquid molecules may be added to the existing liquid domain, leading to an increase in the contact angle at the contact line region once the system reaches a new equilibrium state. With continuous addition of liquid molecules, the bulk liquid eventually breaks the edge boundary and flows toward the adjacent surface. During the MD simulation, the positions and velocities of each individual atom and molecule are numerically calculated by solving Newton's equation of motion. The forces between particles and the potential energy of the overall system are determined by using interatomic potentials or molecular force fields. The overall potential energy in the system includes bonded terms for interatomic interactions linked by covalent bonds, and non-bonded terms for inter-molecular forces:

$$E_{total}=E_{bonded}+E_{nonbonded} \quad \text{Eqn. (42)}$$

The bonded interactions of Eqn. (8) typically include stretching, bending, and torsional terms, which are expressed as follows:

$$E_{bonded}=k_s(r-r_0)^2+k_b(\theta-\theta_0)^2+k_t\{1+d\cos(n\varphi)\} \quad \text{Eqn. (43)}$$

The standard Lennard-Jones potential, along with Coulomb force interactions, is used for modeling the non-bonded interactions as expressed below:

$$E_{nonbonded}=C\frac{q_iq_j}{r^2}+4\epsilon\left[\left(\frac{\sigma}{r}\right)^{12}-\left(\frac{\sigma}{r}\right)^{6}\right] \quad \text{Eqn. (44)}$$

In one aspect, an open-source molecular dynamics simulation software package "Large-scale Atomic/Molecular Massively Parallel Simulator (LAMMPS)" (Sandia National Laboratories) is used to perform the simulation and explore the pinning forces along sharp features with different edge angles.

In various other aspects, a hybrid simulation scheme is used to investigate the bulk flow behavior over geometric edges. The hybrid simulation scheme solves the mass and momentum conservation equations in the larger liquid domain while solving the atomic trajectory in a smaller domain (near the contact line region), based on the atomic finite element method. A schematic illustration of the entire simulation domain, which is divided into three different regions: a continuum region (C), an atomic region (P), and an overlapped region (O) between the C and P regions. In the C region, the fluid flow is solved numerically based on the standard mass and momentum conservation equations given by:

$$\nabla\cdot u=0 \quad \text{Eqn. (45)}$$

$$\frac{\partial u}{\partial t}+\nabla\cdot(uu)=-\frac{1}{\rho}\nabla P+\frac{\mu}{\rho}\nabla^2 u \quad \text{Eqn. (46)}$$

In the P region, the atomic trajectory is solved using the equations characterizing the MD simulation described above. In the O region, a coupling scheme is adopted to maintain conservation of momentum across the P and C regions. Specifically, the mean momentum in the P region is set equivalent to the instantaneous macroscopic momentum in the C region by applying an external force proportional to the momentum difference on each individual atom within the overlapping region, which is expressed as:

$$\frac{F_{i,ext}}{m_i}=\frac{1}{\left(\frac{n}{2}+1\right)}(u_{CFD}-u_{MD})+\left[\frac{f_i}{m_i}-\frac{1}{N}\sum_{j=1,j\neq i}^{N}\frac{f_j}{m_i}\right] \quad \text{Eqn. (47)}$$

where n is the coupling interval, $u_{CFD}$ is the velocity obtained from computational fluid dynamics (CFD) simulation, $u_{MD}$ is the velocity obtained from the MD simulation, $f_i$ is the total intermolecular force experienced by the particle itself, and $f_j$ are the total forces experienced by all other molecules in the overlapping region. Such a simulation predicts the profile of the meniscus and the associated change in liquid pressure while the liquid advances along the solid surfaces with edge features.

Figure 44:
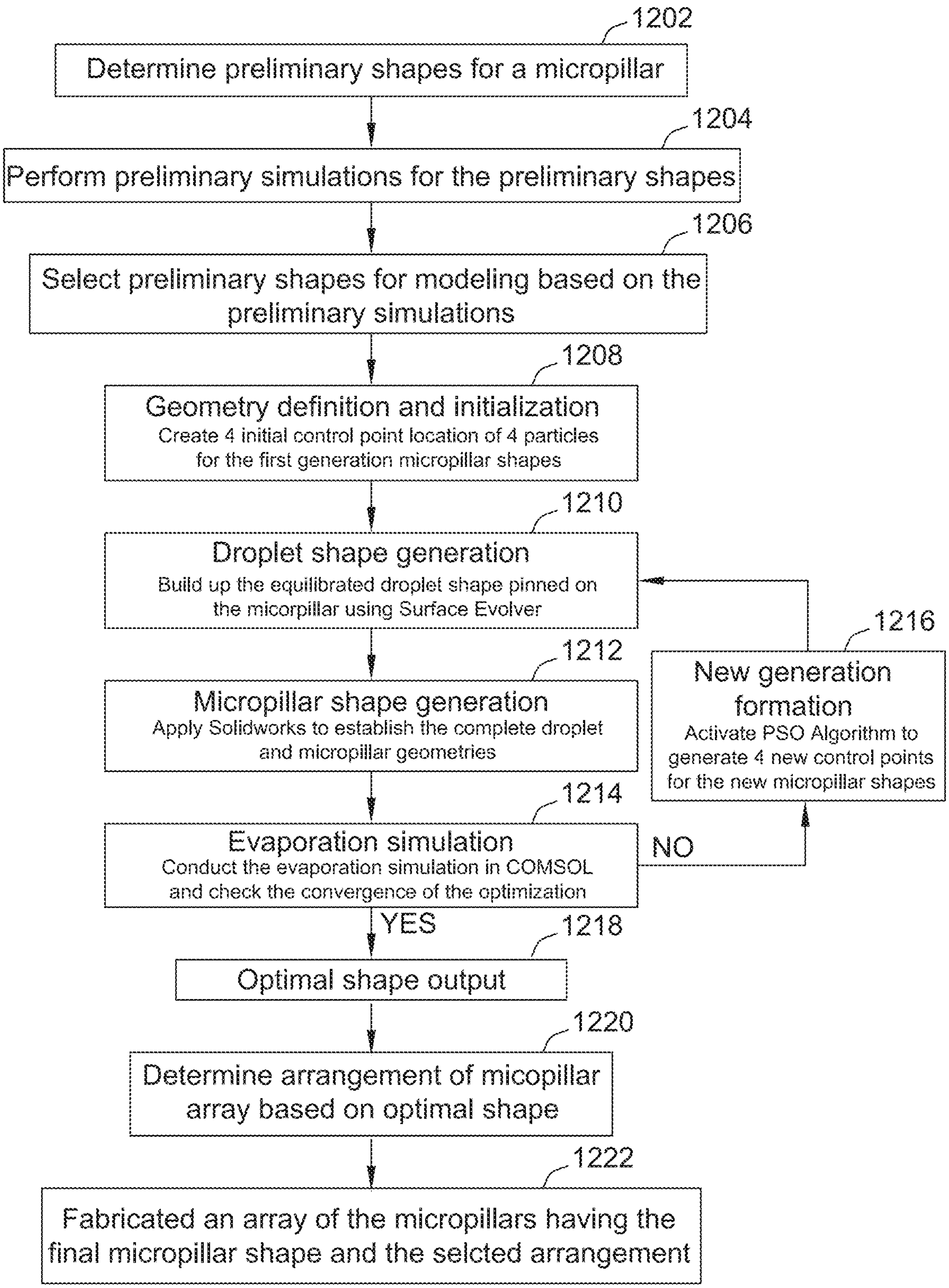
FIG. 44 is a flow diagram of an example method of forming a micropillar array.

FIG. 44 is a flow diagram of a method 1200 for forming a micropillar array. For example, the method 1200 is used to form a micropillar array for an evaporative heat exchanger such as the heat exchanger 104 shown in FIG. 1. The method

1200 includes determining 1202 preliminary shapes for a micropillar. The preliminary shapes may be any shape and may be selected based on factors such as solid-liquid interfacial area, liquid-vapor interfacial area, manufacturing considerations, and any other suitable factors. The preliminary shape may be a geometric shape such as a triangle, a square, a circle, and a polygon. In some embodiments, the preliminary shape may be a custom shape with irregular sides or surfaces (e.g., a freeform shape). In some embodiments, a preliminary simulation is performed on one or more shapes to select the preliminary shape.

Figure 45:
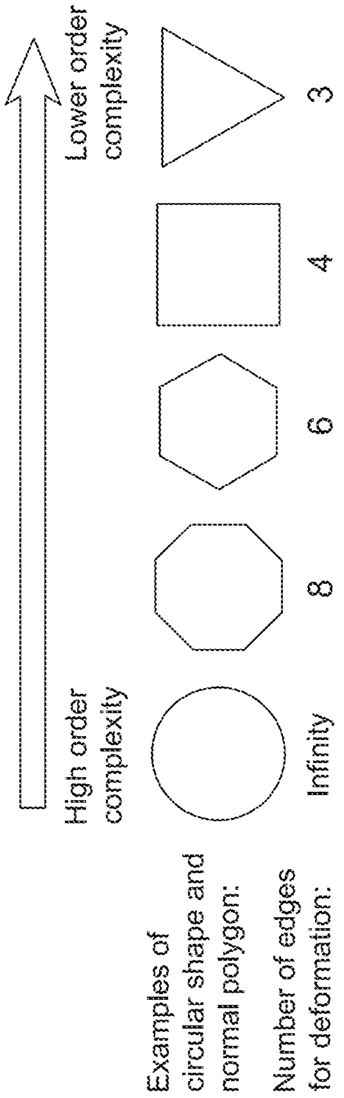
FIG. 45 is a schematic illustration of geometric shapes in order of complexity.

In the example, the preliminary shape is selected based on a desired level of complexity. Initially, a baseline shape having a low order of complexity such as a triangle, as shown in FIG. 45, is selected. The selected shape is used for geometry optimization to simplify the calculations and reduce processing time because geometry optimization using a selected shape does not require generation and evaluation of a random shape. A triangular shape is selected because of increased performance compared to square or circular shapes, as described in more detail herein. In addition, the selected geometry provides a bounded optimization space.

Figure 46:
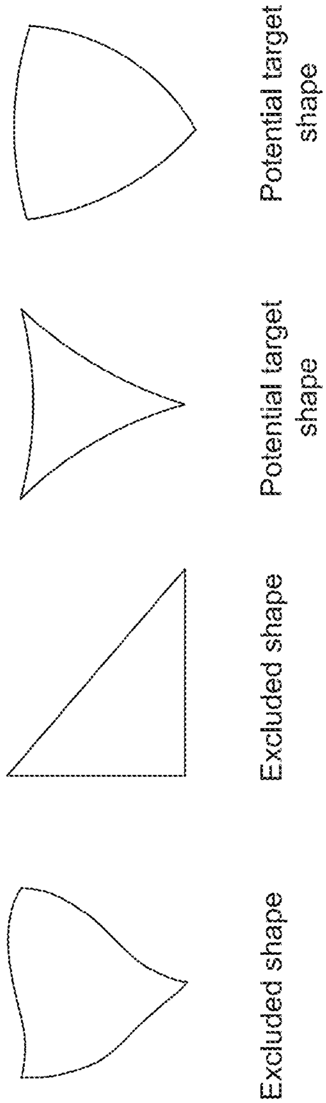
FIG. 46 is an illustration of potential preliminary shapes for a simulation.

The baseline shapes are modified to provide target shapes that limit the possible results of the simulation. The ultimate target shape is a deformation of the baseline shape. As shown in FIG. 46, in some embodiments, possible shapes are identified and/or excluded for the simulations to reduce the potential divergences and calculating time required for the optimization. In the illustrated embodiment, deformed equilateral triangles or pseudotriangles with convex or concave edges are identified as target shapes. The curves (e.g., convex or concave edges) are constrained to reduce the degree of freedom and simplify calculations. The excluded shapes are an irregular deformed triangle and a right triangle. Shapes may be excluded because the shapes require too much calculation time and/or are unlikely to provide the desired values.

Figure 47:
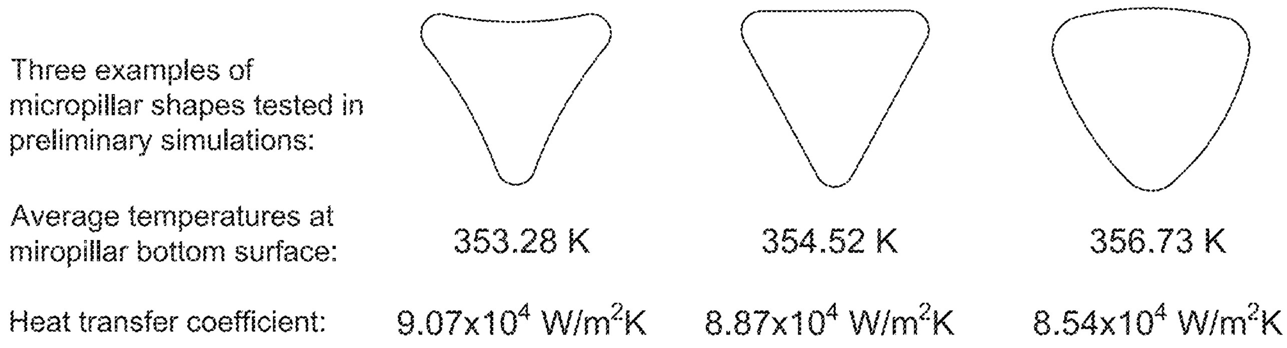
FIG. 47 is an illustration of characteristics of preliminary shapes.

Method 1200 includes performing 1204 preliminary simulations for each of the preliminary shapes and selecting 1206 at least one of the preliminary shapes for modeling based on the preliminary simulations. For example, FIG. 47 illustrates different thermal performances of three different triangle or pseudotriangle patterns (e.g., concave and convex deformed triangular shapes). According to the preliminary tests, the micropillar with the concave pattern has a higher heat transfer coefficient than the equilateral pattern and convex pattern. Thus, the concave pseudotriangle was selected as the preliminary or target shape to use for modeling.

Method 1200 includes generating 1208 a geometric definition for the selected preliminary shapes. The shape optimization problem is simplified by determining an optimum curve between two fixed points instead of determining an infinite number of possible curves or points for the shape. In the example, a curve is generated that defines a boundary of the selected preliminary shape and control points are selected based on the curve. The control points include at least four initial control point locations of four particles for the selected preliminary micropillar shapes. The optimizing process is achieved by using a particle swarm optimization (PSO) algorithm to iteratively search for the best location of the control points. For example, to parameterize a concave triangular pillar shape, a Bezier curve defined by control points is used to generate one edge of the triangle, and then to progressively form the micropillar shape. A Bezier curve is a parametric curve that uses control points and interpolated lines to approximate or define a curve. The Bezier curve provides a simple geometric control polygon based on a mathematical foundation and is simpler for calculations than other methods. In the example, four particles are assigned as four candidate solutions, which represent four Bezier curves (i.e., micropillar shapes) varying with each generation.

Figure 48:
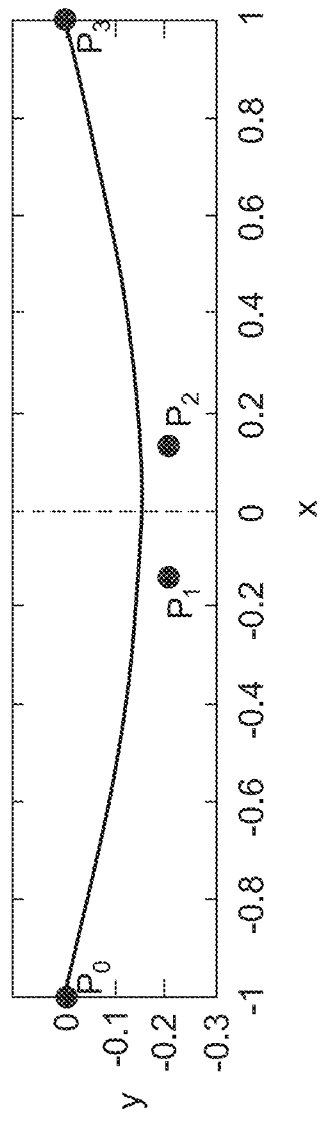
FIG. 48 is a graphical plot of a Bezier curve.

As shown in FIG. 48, a Bezier curve is defined by P1 and P2 which are two mirrored moving control points about the y axis and provide the generated curve symmetry. The positions of the moving control points are updated in every generation or iteration of a simulation, and the micropillar shape is changed accordingly. The initial and terminal positions of the curve are anchored by two fixed points P0 and P3. A Bezier curve is then defined by the four control points P0-P3. A Bezier curve satisfies the following equation, which can be defined for any degree of n:

$$B(t)=\sum_{i=0}^{n}\binom{n}{i}(1-t)^{n-i}t^{i}p_i,\ 0\le t\le 1 \qquad \text{Eqn. (47)}$$

where $$\binom{n}{i}$$

are the binomial coefficients, and $p_i$ are the points on the curve. In the example, the curve is defined by four control points, and the curve equation can be expressed as:

$$B(t)=(1-t)^3P_0+3t(1-t)^2P_1+3t^2(1-t)P_2+t^3P_3,0\le t\le 1 \qquad \text{Eqn. (48)}$$

Figure 49:
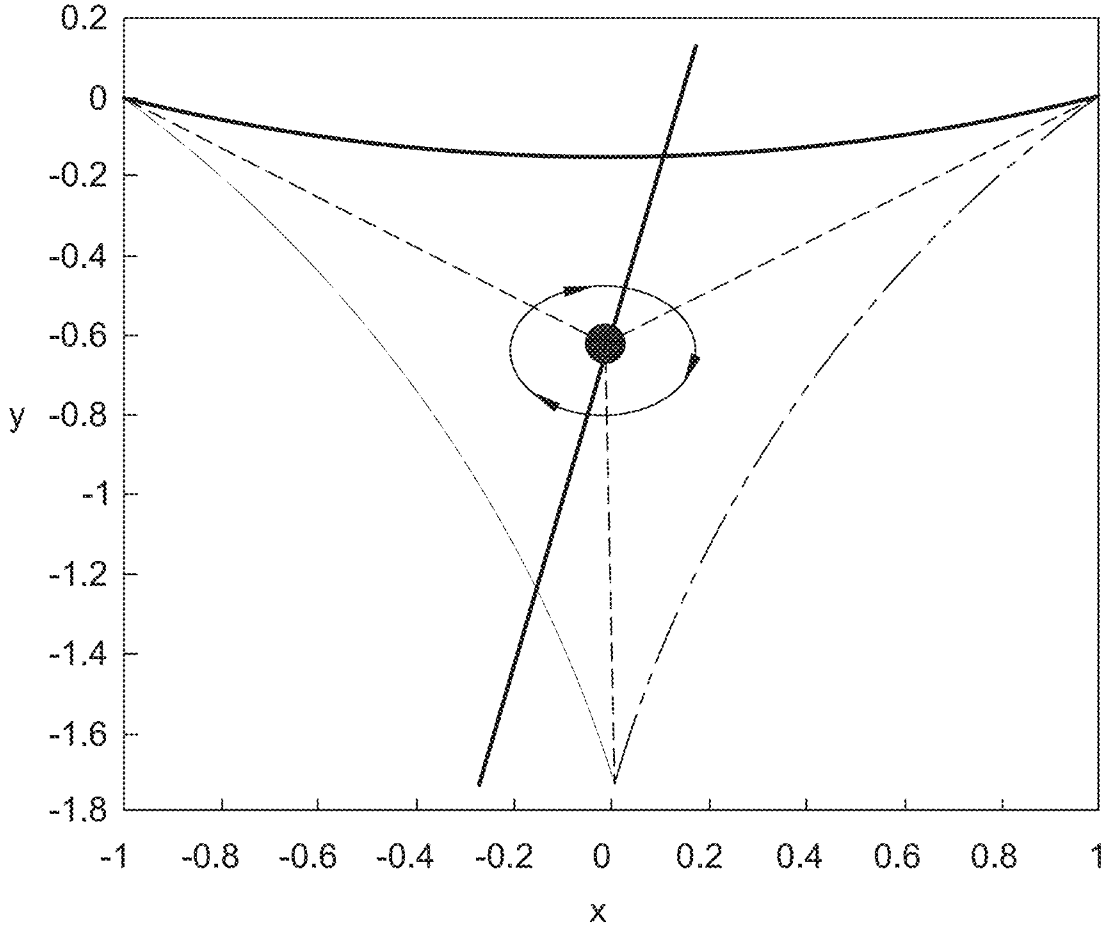
FIG. 49 is a graphical plot of curves defining a micropillar shape.

As shown in FIG. 49, an integrated triangular shape is represented by rotating the defined curve by three times. Accordingly, the final shape is symmetric and the calculation is simplified because a single Bezier curve is calculated and oriented to represent each of the sides. In other embodiments, the selected shape can be defined by any number of curves.

Referring to FIG. 44, the method 1200 includes determining 1210 a droplet shape that is generated by the preliminary micropillar shape and completing 1212 the micropillar and droplet shape generation. The curve and/or control points of the preliminary shape are used to construct a shape of a droplet formed on the preliminary micropillar shape. The droplet shape includes a curve, control points, and/or any other identifying parameters. In the example, the micropillar shape is generated in Matlab and then imported into Surface Evolver and Solidworks to create complete droplet and micropillar geometries.

For example, the target droplet shape exhibiting geometric features on a deformed triangular micropillar structure is defined using the open-source software Surface Evolver, developed by Brake, to find the equilibrium droplet morphology with different liquid volumes in the absence of any external force and dynamic effects. The surface of the droplet is shaped by the rule of minimizing the free energy, and then the surface is modified depending on the given geometric constraints from the PSO-generated micropillar shape. The energy applied to the surface focuses on surface tension and gravitational energy for the micropillar shape selected in the example. Each side of the micropillar shape is defined by a function that correlates from one hundred scattered point locations generated from the Bezier curve by conducting a quartic polynomial regression. Three functions serve as the boundary constraints for growing the droplet in Surface Evolver. Some elements such as declarations, the specific parameters designed according to the model, the necessary defined functions for various forms of energy, and the boundary constraints on the motion of vertices are contained in the definition section.

In the example, the droplet volume is input manually into Surface Evolver to obtain the same solid-liquid interfacial area (i.e., substrate area) $A_{sl}=7.85\times10^{-8}$ m$^2$, and the same liquid-vapor interfacial area, $A_{lv}=1.39\times10^{-8}$ m$^2$. The equilibrated droplet shape pinned on the micropillar is then generated by Surface Evolver, and output in .stl format for further operation. To avoid a high aspect ratio mesh which could cause errors in further computation steps, the droplet shape is rebuilt in COMSOL to obtain a more uniform mesh density.

Also, the method 1200 includes performing 1214 an evaporative simulation based on the completed micropillar and droplet shape. For example, the droplet shape and/or the preliminary micropillar shape are inputted into a program including conditions, rules, and parameters that simulate one or more evaporative processes. The evaporative simulation outputs data relating to the evaporative process based on the preliminary micropillar shape. For example, the evaporative simulation outputs an evaporative heat transfer coefficient for the droplet shape and the associated preliminary micropillar shape.

In the example, a multiphysics simulation model was developed using a program such as COMSOL available from COMSOL, Inc., to predict the evaporation rate of non-axisymmetric microdroplets confined by different micropillar shapes. The evaporation process was analyzed in a steady-state condition, where the droplet was a fixed shape and evaporated at a constant rate. In the liquid domain, the heat transport is attributed to both conduction and convection. The convection current originates from three sources: (1) the continuous inlet flow from the center pore of the micropillar, (2) the buoyancy flow induced by the temperature difference between the bottom and top part of the microdroplet, and (3) the Marangoni flow induced by the temperature difference along the liquid-vapor interface. The Peclet number (Pe), the Rayleigh number (Ra), and the Marangoni number (Ma) can be applied to estimate the strength of the convection effect from each of the three sources, respectively. In the example, the Peclet number and the Rayleigh number were found to be sufficiently small to neglect. The theoretically calculated Marangoni number was found to overpredict the Marangoni strength in experiments by 100 times for water droplets. Moreover, the effect of Marangoni flow on evaporation is considered negligible for droplets with volume larger than 1 nL. As a result, the convective heat transfer in the liquid domain can be neglected. Therefore, in the liquid and solid domains, the heat transfer process is governed by the heat conduction equation, given by $$\nabla^2T=0, \qquad \text{Eqn. (49)}$$

where T is the continuous temperature function in both the liquid and solid domains. The constant heat flux boundary condition was assigned to the base surface of the micropillar and represented by the following equation:

$$q=5\times10^6\ \text{W/m}^2 \qquad \text{Eqn. (50)}$$

The vapor concentration in the gas domain is solved by the steady-state species transport equation:

$$-\vec{V}*\nabla C+\nabla*(D_{diff}\nabla C_v)=0 \qquad \text{Eqn. (51)}$$

where $\vec{V}$ is the velocity in the gas domain, driven by Stefan flow and thermal buoyancy flow. A constant concentration boundary condition was assigned at the far-field. This concentration is equal to the concentration of vapor in air where the relative humidity and temperature are 25% and 300K, respectively. A no-penetration (i.e., zero diffusive flux) condition was assigned to the solid-vapor interfaces. The evaporative flux along the liquid-vapor interface was calculated using equation (52), and the total evaporation rate was calculated using equation (53):

$$J = \overline{M} * \left(-D_{diff}\frac{\partial C_v}{\partial n} + \vec{v_n}C_v\right) \quad \text{Eqn. (52)}$$

$$\dot{m} = \int\int_z J ds, \quad \text{Eqn. (53)}$$

where J is the evaporative flux, ṁ is the molecular weight, D is the diffusion coefficient, and n is the interface normal.

At the liquid-vapor interface, a heat flux thermal boundary condition was imposed to satisfy energy conservation between conduction and evaporative transport:

$$k_l\left(\frac{\partial T}{\partial \vec{n}}\right)_{lv} = Dh_{fg}\left(\frac{\partial c_v}{\partial \vec{n}}\right)_{lv}, \quad \text{Eqn. (54)}$$

where $k_l$ is the thermal conductivity of water, $h_{fg}$ is the latent heat of vaporization, D is the air-vapor molecular diffusion coefficient, and $c_v$ is the vapor concentration at the liquid-vapor interface.

In the example, because of the size of the droplet, the liquid-vapor interfacial pressure was not affected by the curvature of the droplet. Therefore, the concentration at the liquid-vapor interface was assumed to be equivalent to the saturation concentration:

$$c_{v,lv}=c_{sat}(T_{lv}) \quad \text{Eqn. (55)}$$

where $c_{sat}$ is the saturated vapor concentration, which can be found from a thermodynamic table. The temperature and velocity in the gas domain are solved by incorporating the following continuity, momentum, and energy equations in the simulation model:

$$\nabla \cdot (pv) = 0 \quad \text{Eqn. (56)}$$

$$\rho(v \cdot \nabla)v = \nabla \cdot \left[\rho I + \mu[\nabla v + (\nabla v)^T] - \frac{2}{3}\mu(\nabla \cdot v)I\right] + \rho g. \quad \text{Eqn. (57)}$$

$$\rho c_p v \cdot \nabla T - \nabla \cdot (k\nabla T) = \rho c_P \frac{\partial T}{\partial t} \quad \text{Eqn. (58)}$$

The liquid-vapor interfacial temperature solved inside the droplet is used as the boundary condition for solving the temperature in the gas domain. The velocity boundary condition at the liquid-vapor interface in the gas domain is given by $$\vec{v}_n = \frac{1}{C_{air}} \cdot D\frac{\partial C_{air}}{\partial n} = -\frac{1}{C_g - C_v} \cdot D\frac{\partial C_v}{\partial n}. \quad \text{Eqn. (59)}$$

In the simulation, the thermal buoyancy flow is taken into consideration by setting the air density as a function of the local temperature found by solving the heat transfer model.

Figure 50:
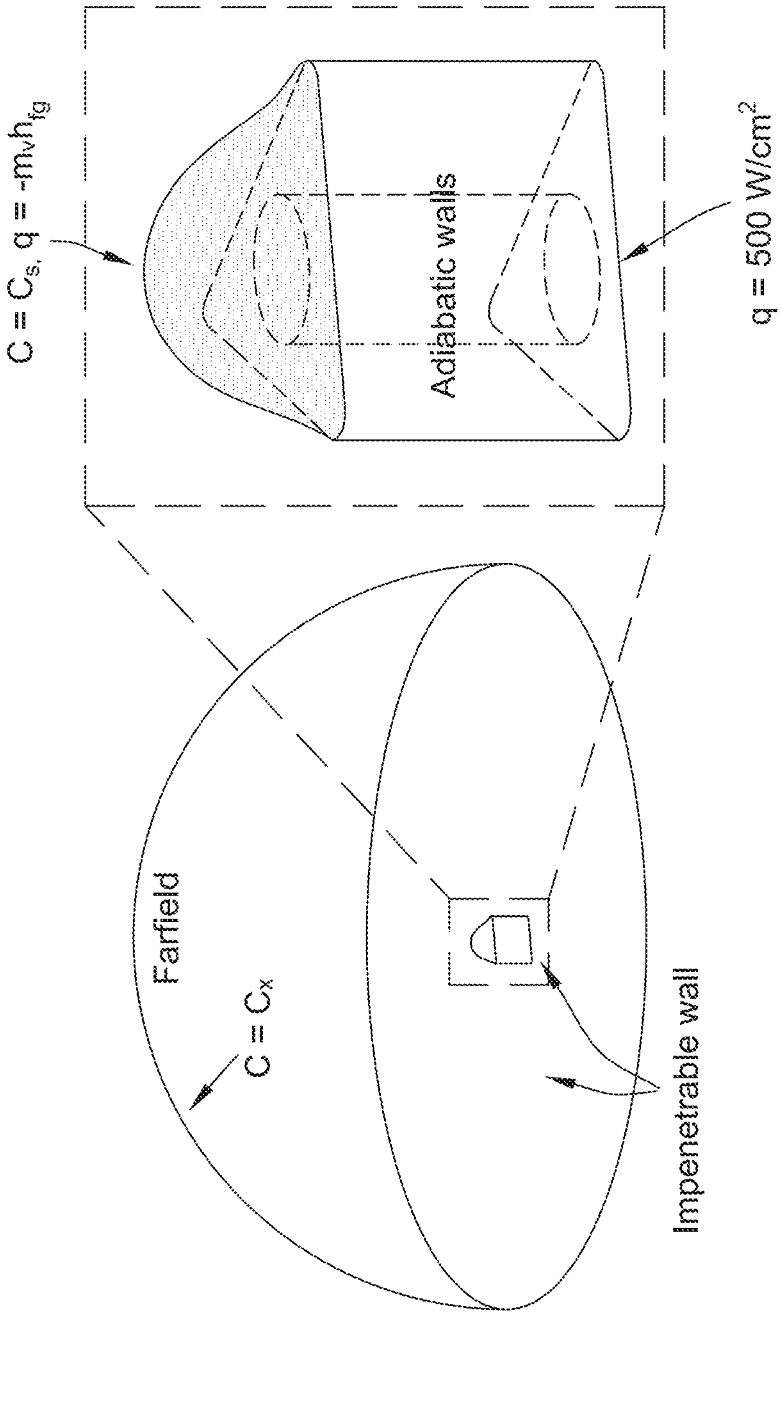
FIG. 50 is a schematic illustration of a droplet formed on a micropillar.

Table 8 shows the input parameters and values for the simulation setup in the example. FIG. 50 shows the schematic representation of the boundary conditions used in the simulations.

TABLE 8

| Simulation Parameters | |
|---|---|
| Imput parameters | Value |
| Outer diameter, D | 100 μm |
| Inner diameter, d | 50 μm |
| Interfacial area, $A_{lv}$ | $139 \times 10^{-8}$ m$^2$ |
| Substrate area, $A_{sl}$ | $7.85 \times 10^{-8}$ m$^2$ |
| Operating pressure, $P_{amb}$ | 101325 Pa |
| Solution methods | Setup |
| Mesh type | Tetrahedral |
| Study type | Stationary |
| Solver | Segregated |
| Geometric Multigrid Solver | GMRES |
| Preconditioning | Left |

At the far field, the vapor concentration and temperature are assigned as the ambient condition (the relative humidity and temperature are 25% and 300 K). A vapor concentration boundary condition is assigned at the liquid-vapor interface. The liquid-vapor interface equals the local saturation concentration which is the function of the local temperature. A constant heat flux boundary condition is applied at the pillar bottom surface, which is 500 W/cm$^2$ in the example.

The boundary condition of variable heat flux is set at the liquid-vapor interface, which is given by:

$$q=-m_p \cdot h_{fg} \quad \text{Eqn. (60)}$$

where $m_v$ is the evaporation rate, and $h_{fg}$ is the latent heat of vaporization of water; and all other walls are assigned as no-penetration boundary conditions. The far-field shape of the vapor domain is a hemisphere, set as 50 times larger than the characteristic length of the microdroplet (~100 μm). The microdroplets' shapes were imported from Surface Evolver. Solidworks is applied to create micropillar geometries based on the geometric operation process. After the micropillar geometries have been built up, the evaporation simulation is conducted in COMSOL and yields the objective value (i.e., heat transfer coefficient) of the particle. The micropillar shapes are generated in Matlab for the next generation if the objective values of all the particles are imported into the PSO algorithm.

In one example, to validate the reliability of the simulation method, a set of additional computational simulations with the same simulation method and corresponding evaporative experiments were performed. Both aspects of the investigation were based on the baseline triangular micropillar structure, and conducted to respectively obtain the heat transfer coefficient and evaporative flux under substrate temperatures of 60° C., 70° C., 80° C., 90° C., and 98° C. To investigate the evaporative heat transfer performance experimentally, a single triangular micropillar with two resistance temperature detector (RTD) elements was prepared by microfabrication processes, and a customized thermal testing platform which aims at performing the evaporation experiments was designed to form an equilateral triangular droplet on the top of the micropillar. The final validation was achieved by comparing the heat transfer coefficient and evaporative flux from simulation results with that from the experimental measurement. The simulation model was found to correlate closely with the additional computation simulations.

For the startup of the PSO, the search space is assigned as a relatively small box, according to the results from preliminary simulations, which simplifies the problem. For example, the shape optimization problem is converted to determine the optimal coordinates of the control point. The control point applied for each generation is constrained in a pre-defined region. In the constrained box, the movement of the control point is limited to increase the convergence rate during the optimization process. Two overlapped curves are formed if the control point drops below the box. If the control point moves above the box, the pillar shape becomes almost a regular equilateral triangular shape or a convex shape. In the example, a ten-generation PSO optimization is conducted with four particles applied in total. The initial velocities of these particles are randomly assigned. To increase the convergence rate, the initial locations of the four particles are evenly distributed in the search space. In the example, the initial locations of the four particles on duty are given by (−0.15, −0.2); (−0.3, −0.2); (−0.15, −0.5); (−0.3, −0.5).

The PSO is limited by selected parameters. For example, $c_1$ and $c_2$ are acceleration coefficients that separately limit the size of the steps that particles take toward the particle best ($p^i$) and the group best ($p^g$), where $c_1=2$, and $c_2=0.5$. The inertial weight w is used to control the size of the local searching area of the particle, which is adjusted dynamically during optimization.

After each circulation, w is reduced for the next turn, following the equation:

$$w = w - \left(w \times \frac{N}{10}\right). \quad \text{Eqn. (61)}$$

where the beginning value of w is set to be 0.5 so that particles can adapt the global search. The particles are then gradually converted from a global search to a local search, with the initial weight w being reduced in the conversion.

The PSO algorithm tracks the desired position of an object with a specified velocity by sharing the best solution (fitness) information. Benefitting from the communication between each candidate solution (particle) in PSO, the convergence rate of the algorithm is significantly improved over that of a traditional evolutional algorithm such as a genetic algorithm. Incorporation of social behavior in the numerical process can be achieved by representing the population as a swarm and the individual candidate as a particle. The position of a specific particle is updated incrementally according to the current position and velocity of the particle. The velocity is dependent on the position of the group-best particle and the desired position of the specific particle.

The PSO algorithm involves arranging the swarm to distribute the specified number of particles into random positions, and initializing the particles with random velocities and directions in a constrained region. The fitness of each particle is evaluated related to the studied problem. For example, the PSO algorithm compares the fitness of each particle with the fitness of the "particle-best" ($p_{best}$), which is the best value of the particle for the evaluated parameter. If a new value is better than the $p_{best}$, the $p_{best}$ is replaced with the new value. The fitness of each particle is also compared with the "group-best" ($g_{best}$), which is the best value of the overall group of particles. If a new value is better than the $g_{best}$, the PSO algorithm changes the $g_{best}$ to equal the new value and modifies the location of the $g_{best}$ to be the new location with the best fitness evaluation.

The new velocity vector of each particle for the next generation can be obtained by incorporating the position of the $p_{best}$ and $g_{best}$ into the memory of the whole swarm. The following numerical equation illustrates how to get the new velocity for each particle:

$$v_{k+1}^i = wv_k^i + c_1 r_1 (p^i - x_k^i) + c_2 r_2 (p^g - x_k^i). \quad \text{Eqn. (62)}$$

where $v_{k+1}^i$ is the velocity of the particle i at the k+1 time iteration, and $x_k^i$ is the current position of particle i, k is the iteration, w, $c_1$, $c_2$ are three parameters that can be varied to improve the accuracy of the exploration and enhance the convergence rate, and r1 and r2 are the random numbers between 0 and 1. The PSO algorithm adjusts the path of the particles toward the desired region based on $p^i$, the position of the $p_{best}$, and the $p^g$, and the position of the $g_{best}$.

The PSO algorithm updates the positions for all particles based on the following equation:

$$x_{k+1}^i = x_k^i + v_{k+1}^i \quad \text{Eqn. (63)}$$

The new position for particle i at the k+1 iteration is generated by incorporating the position at kth iteration and the velocity vector according to equation (62). The PSO algorithm performs iterations until the desired fitness value is found and convergence is complete. After several iterations of generations, the shape optimization loop achieves final convergence and outputs the optimal shape. The objective value of the PSO algorithm is met as the PSO algorithm optimizes the micropillar shape. In the example, the PSO algorithm is configured to optimize the micro-pillar shape for heat transfer coefficient. Accordingly, the heat transfer coefficient approaches a desired or optimal value of the group best particle as the PSO algorithm performs generations. In the example, convergence is characterized by the variance decreasing to be equal to or less than a threshold value such as 0.1.

As shown in FIG. 44, the results of the evaporation simulation are checked to see if there is convergence of the optimization. The convergence in the PSO is examined by comparing the objective function value for each particle at the specified number of iterations. If the difference in the function value between two consecutive iterations is less than 1%, the convergence is accomplished. If convergence is accomplished, an optimal shape is output 1218. If convergence is not accomplished, a new generation 1216 of the micropillar shape is formed by the PSO algorithm and outputted to droplet shape generation 1210.

The method 1200 includes outputting 1218 a final shape for the micropillar based on the evaporative simulation. The final shapes are selected to achieve the maximum evaporative heat transfer coefficient. For example, the evaporative heat transfer coefficients for the droplet shapes associated with each selected preliminary micropillar shape are compared to identify which droplet shape provides the maximum evaporative heat transfer coefficient and identify the preliminary shape associated with the droplet shape. The final shape is selected based on the comparisons of the evaporative heat transfer coefficients. Other conditions may be compared in addition to or in place of the evaporative heat transfer coefficients. In some embodiments, the final shape may be selected based on a comparison of the evaporative heat transfer coefficients and/or any other conditions determined by the evaporative simulation.

The method 1200 includes determining 1220 an optimized arrangement of the micropillar array based on the final shape of the micropillars. Determining 1220 the optimized arrangement includes inputting the final micropillar shapes into an optimization algorithm that outputs an arrangement of the final micropillar shapes. In some embodiments, a micropillar array including one or more of the selected final micropillar shapes is input into a simulation model with two or more different spacings and arrangements of the micropillar array. For example, each simulation may run through iterations in which a single condition is adjusted and the other conditions are held constant. Conditions that may be varied in simulations include, for example and without limitation, micropillar height, micropillar shape, spacing between micropillars, layout of micropillars, and orientation of micropillars.

The evaporative heat transfer coefficients for the different arrangements of the micropillar arrays are determined based on the simulation. The arrangement of the final micropillar shapes that provides the maximum evaporative heat transfer coefficient is selected as the final micropillar array.

In some embodiments, the method 1200 includes repeating any of steps 1202-1220 until the evaporative heat transfer coefficient meets a desired threshold and/or any required parameter is satisfied.

The method 1200 includes fabricating 1222 an array of the micropillars having the final micropillar shape and the selected arrangement. The fabricated micropillar array will provide the maximum evaporative heat transfer coefficient and meet any other parameters selected for the micropillar array.

For example, porous micropillar structures with the selected shape were microfabricated on a 4 inch (in.) double polished silicon wafer (<1 0 0>, 300 micrometers (pin) thick) with the process of chemical vapor deposition (CVD), photolithography and reactive-ion etching (RIE). The oxide layer (about 450 nm thick) was first grown on both sides of the silicon wafer, which was placed in a tube furnace (Lindberg/Blue M) at 1100° C. for 14 hours. In the example, a 125 nm thick platinum resistance temperature detector (RTD) and heater were then deposited on the backside of the wafer by a sputtering (Kurt J. Lesker, PVD 75) and lift-off process. In other embodiments, the RTD and/or heater are omitted. By removing silicon oxide layer with RIE and removing silicon with deep reactive-ion etching (DRIE) on the back side of the wafer, a deep hole was fabricated at the center of the silicon wafer. Fabricating the shapes of the micropillar structures on the front side followed the same process as fabricating the hole on the backside.

Figure 51:
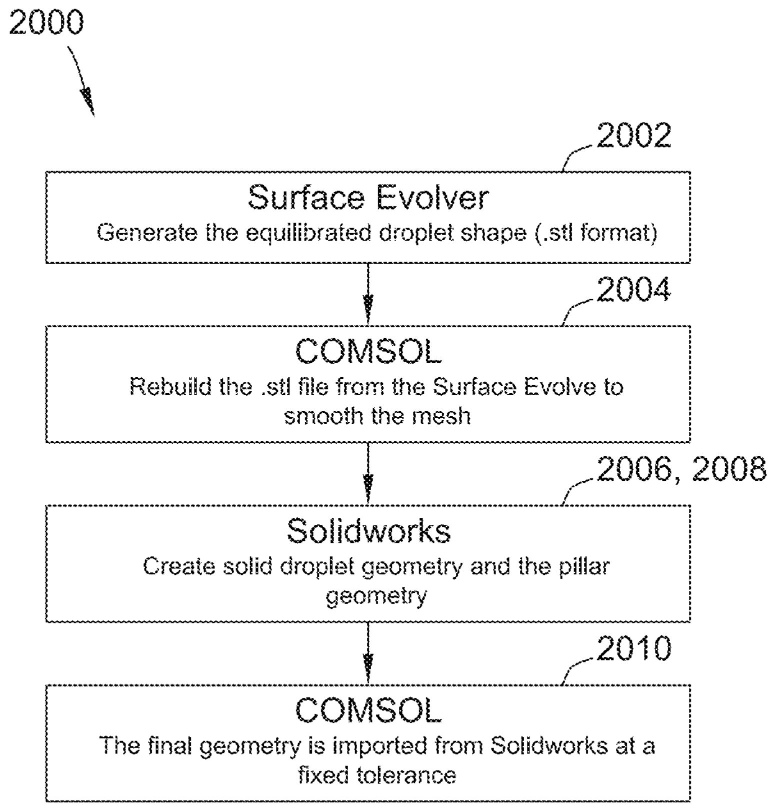
FIG. 51 is a flow diagram of an example method of determining a micropillar shape and a droplet shape.
Figure 52:
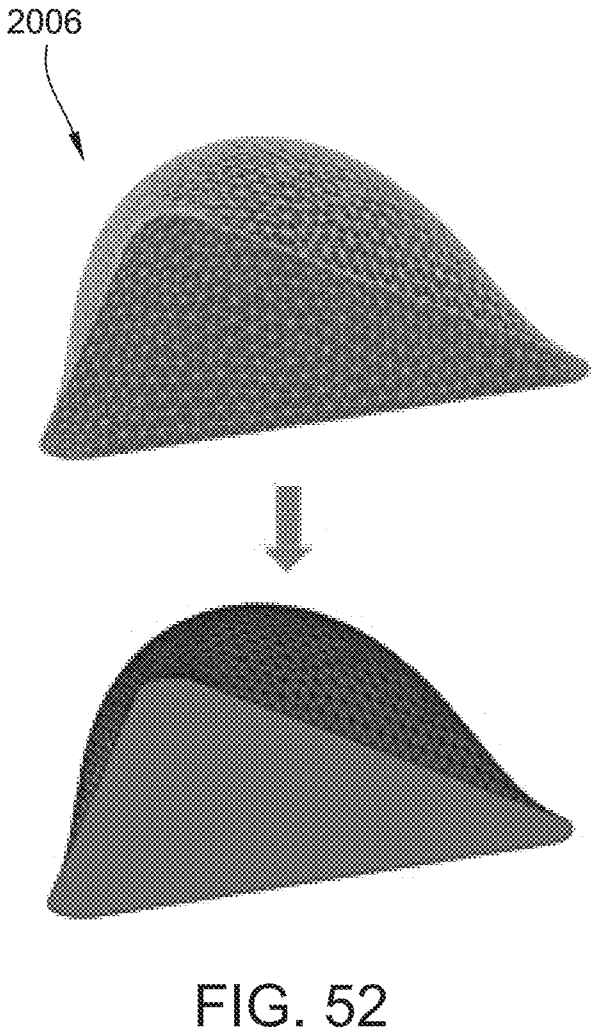
FIG. 52 is a schematic illustration of a rendering of a droplet shape.
Figure 53:
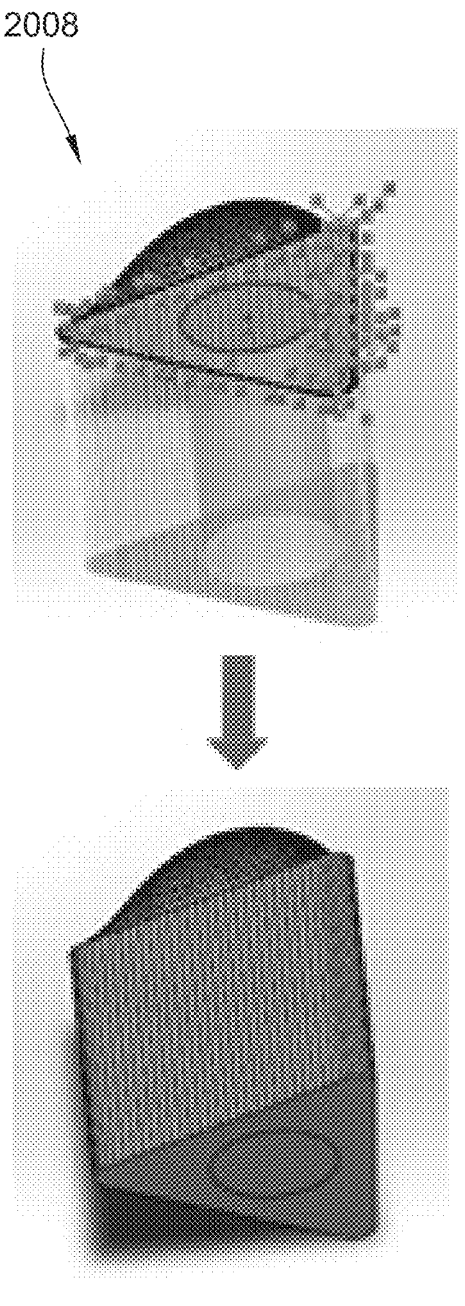
FIG. 53 is a schematic illustration of a rendering of a complete micropillar and droplet shape.

FIG. 51 is a flow diagram of an example method 2000 for defining the droplet and pillar geometries. FIGS. 52 and 53 show portions of the method 2000. The droplet shapes are defined 2002 using Surface Evolver. The droplet shapes are then rebuilt 2004 using COMSOL. A modeling program such as SOLIDWORKS is used to create 2006 solid droplet geometry and create 2008 the pillar geometry. Solidworks is applied to build the droplet and micropillar geometries based on the droplet shape obtained from Surface Evolver. The refined droplet shape created by COMSOL is opened by Solidworks and creates the bottom surface of the droplet. The droplet surface and the bottom surface are knitted together to form a solid geometric structure for the droplet. A sketch of the contour of the bottom surface is later generated by manually connecting all the vertices, which is followed by an extrude operation for creating a micropillar geometry of 10 μm height. The water inlet is located at the center of the pillar, which is created with a constant pore diameter of 5 μm. The final geometry of the droplet and the pillar from the modeling program are imported 2010 into COMSOL at a fixed tolerance. For example, the absolute import tolerance is $1.0\times10^{-5}$.

EXAMPLE

In an example, the method 1200 was used to determine a final micropillar shape and an arrangement of an array that maximizes the heat transfer coefficient. The example was limited to selected micropillar shapes to simplify the testing and results. All the studied micropillar shapes had the same solid-liquid interfacial area (i.e., substrate area), Asl=78.5 μm2, and the same liquid-vapor interfacial area, Alv=139 μm2. Based on a preliminary simulation, a pseudotrianagle was chosen as the micropillar shape for optimization. In the preliminary simulation, the pseudotrianagle provided a higher heat transfer coefficient than a triangle and a reuleaux, as shown in Table 9.

TABLE 9

Preliminary Simulation Results for Different Micropillar Shapes

| Micropillar Shape | Substrate Temperature (K) | Heat transfer coefficient, $h \times 10^4$ ($W/m^2$ K) |
|---|---|---|
| Reuleaux | 356.73 | 8.54 |
| Triangle | 354.52 | 8.87 |
| Pseudotriangular | 353.28 | 9.07 |

MATLAB was used to define the edge using a Bezier curve with four control points. Then, the micropillar and droplet geometry were constructed using SolidWorks and Surface Evolver, and meshed and exported into COMSOL Multiphysics to perform the evaporation simulation. The evaporation process was analyzed in a steady-state condition, with a droplet of fixed shape evaporating at a constant rate. Since the Péclet number is less than 1, the Rayleigh number is less than 0.03, and the Marangoni number is less than 20, convection was neglected, and the energy equation was solved considering only conductive heat transfer across the droplet. A constant heat flux boundary condition, with heat flux, q=500 W/cm$^2$, was assigned to the base surface of the micropillar. Additionally, evaporative mass transport was incorporated in the model by solving the steady state species transport equation in the gas domain, where a constant concentration boundary condition was assigned at the far-field, and the vapor concentration in air is calculated at 300 K and 25% relative humidity. At the liquid-air interface, a saturated vapor concentration boundary condition was implemented, and a heat flux thermal boundary condition was imposed to satisfy energy conservation between conductive and evaporative heat transfer. Heat transfer coefficient from the COMSOL simulation was utilized in the optimization algorithm as the objective value. The PSO was conducted by arranging four particles as a swarm to track the desired position. The position of a specific particle was updated incrementally in each generation based on the velocity and position of the particle, using Equation 62.

The path of the particle was adjusted toward the desired region by inputting $p^i$, the position $p_{best}$, $p^g$, and the position of $g_{best}$. Further, w, c1, and c2 were varied to improve the accuracy of the exploration and enhance the convergence rate. After obtaining the velocity of the particles, the positions for all particles were updated using Equation 63.

The numerical model was validated by experimental measurements. A customized thermal test platform was designed and developed to perform microdroplet evaporation experiments. A constant pressure microfluidic system was incorporated in the test platform to maintain a constant droplet size and shape during the evaporation process. Two resistance temperature detectors (RTDs) were fabricated on the back side of the samples to maintain a constant substrate temperature. The evaporative heat transfer coefficient was calculated by the following equation:

$$h = \frac{m_v h_{fg}}{A_{si}(T - T_\infty)}, \quad \text{Eqn. (64)}$$

where $m_v$ is the total evaporation rate, $A_{si}$ is the solid-liquid interfacial area, T is the liquid-vapor interfacial temperature, and $T_\infty$ is the ambient temperature.

Figure 54:
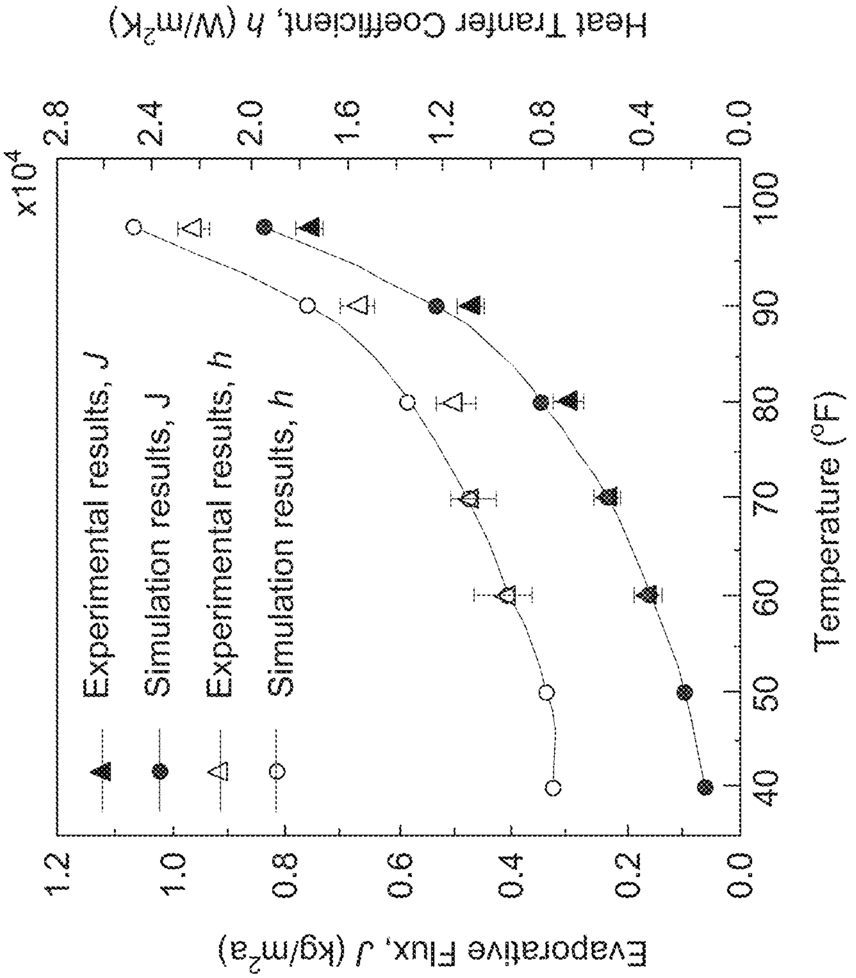
FIG. 54 is a graphical plot of results from a simulation and experimental data.

FIG. 54 shows the experimental and simulation results. The evaporative flux and the heat transfer coefficient values from the experiment and the simulation align with each other. For example, the relative errors in the data range from 1% to 10%. The differences can be attributed to assumptions made in the simulation. For example, in the simulation, the conduction resistance through the substrate was neglected. Moreover, the temperature measured by the sensor during the experiment was slightly different from the actual substrate temperature. In the simulation, the temperature at the substrate and the liquid-vapor interface was overpredicted by 6% which caused about 20% more diffusion.

A control point was generated by the PSO algorithm to create the Bezier curve and define the shape of the optimized micropillar. The PSO algorithm was calculated for the micropillar shapes until convergence was reached. Convergence was characterized by a gradually decreasing variance of the heat transfer coefficient because heat transfer coefficient was the optimized parameter.

Figure 55:
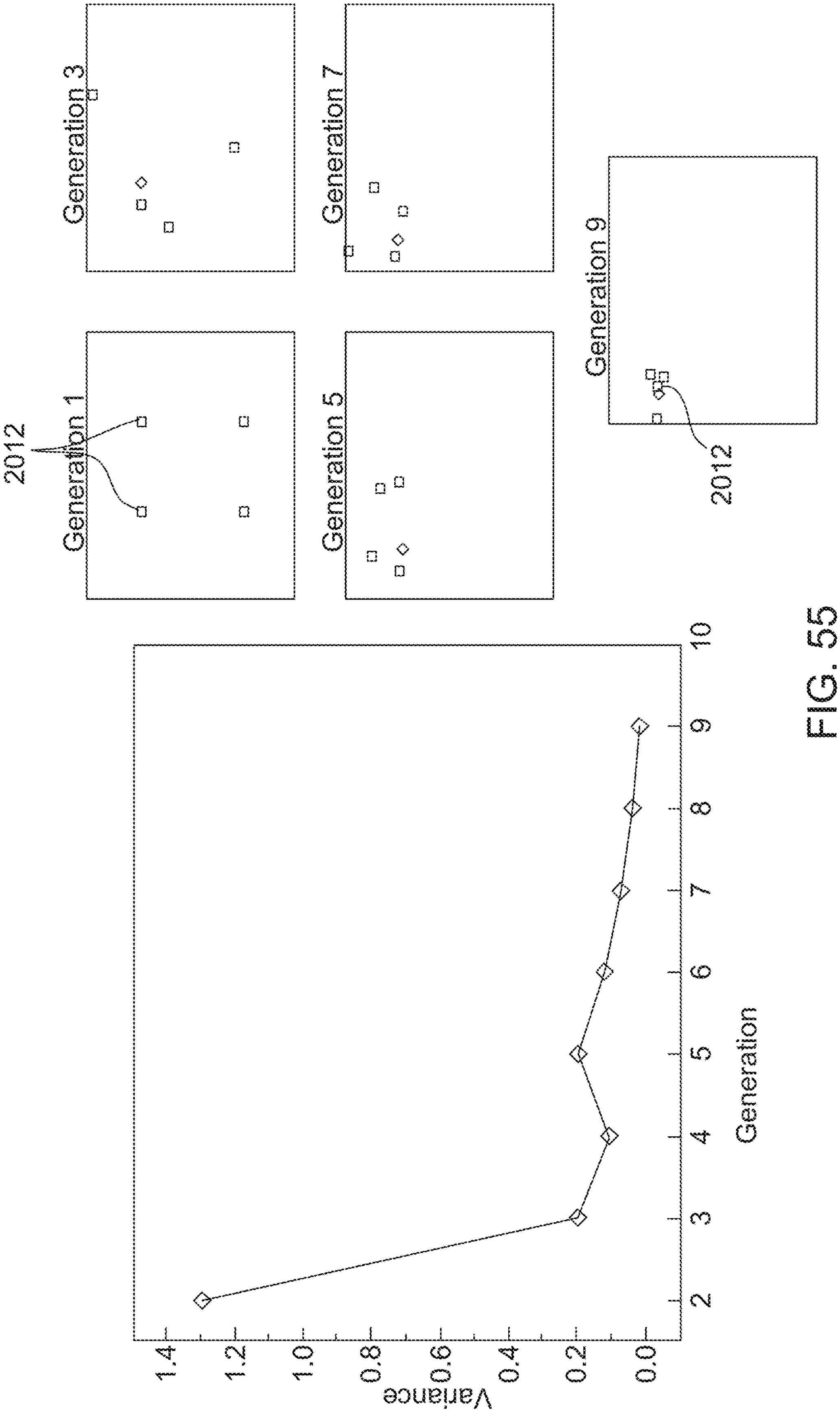
FIG. 55 is a graphical plot of heat transfer coefficient and illustrating convergence during multiple generations of a simulation.

For example, FIG. 55 shows convergence within nine generations of the PSO algorithm. The variance is 1.3 for the $2^{nd}$ generation and the variance decreases for each subsequent generation. The variance decreases to 0.01645 for the 9th generation, which demonstrates the achievement of convergence because the variance is less than the threshold value of 0.1.

As shown in FIG. 55, the particles 2012 are more closely spaced in the $9^{th}$ generation than the $1^{st}$ generation, which coincides with the decreased variance. In the example, variance correlates with the spacing or distance between the particles 2012. Starting from the evenly distributed particle locations at generation one, the four particles 2012 gradually move to the upper left region. In generation 9, all the particles converge around the group best particle, showing the convergence of the optimization process.

Figure 56:
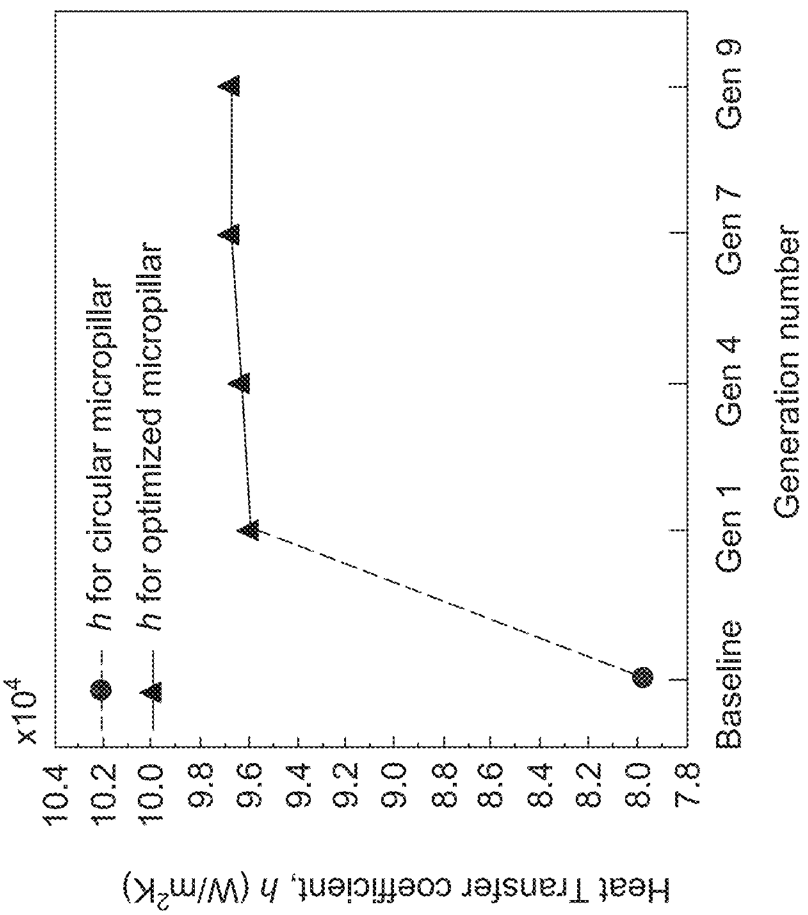
FIG. 56 is a graphical plot of heat transfer coefficients for different generations of a simulation.

FIG. 56 shows the maximum heat transfer coefficient for different generations in the optimization process for a triangular micropillar. In the example, the heat transfer coefficient of the group best particle becomes constant after generation 5 and corresponds to the optimized micro-pillar shape. The heat transfer coefficient is improved from a baseline value of 8.87×104 W/m$^2$-K to 9.67×104 W/m$^2$-K, which is a 9% enhancement.

Table 10 includes the results of the optimization process using the PSO algorithm. Compared to the circular micropillar, the optimized micropillar shape yields a 21.3% increase in heat transfer coefficient.

TABLE 10

Results of Optimization Process for Micropillar Shape

| Pillar Shape | Generation No. | HTC, h ($10^4$ W/m$^2$ K) | % Increase in heat transfer coefficient | % Increase in perimeter-to-wetted area ratio |
|---|---|---|---|---|
| Circular (baseline) | — | 7.97 | — | — |
| Pseudotriangular | 1 | 9.59 | 20.30 | 24.90 |
| Pseudotriangular | 4 | 9.63 | 20.82 | 26.18 |
| Pseudotriangular | 7 | 9.67 | 21.30 | 25.51 |
| Pseudotriangular | 9 | 9.67 | 21.30 | 25.51 |

The differences in the heat transfer coefficients are caused by the varied droplet shapes. For an evaporating droplet, the maximum evaporation rate is observed at the contact line region since the thickness of the liquid layer in the vicinity of the contact line is very small compared to the bulk of the liquid, and there is very smaller conduction resistance across the liquid film. Practically, increasing the contact line length can enhance the total evaporation rate, as was demonstrated by changing the droplet shape from spherical to non-spherical by using a triangular micropillar, where the perimeter-to-wetted area ratio is increased. The increase in perimeter-to-wetted area ratio leads a higher percentage of evaporating area near the contact line region. Additionally, the change in the droplet shape resulted in a larger meniscus curvature which contributed to a higher vapor diffusion rate. As a result, both the mass and energy transfer rates were increased. Compared to the droplet confined on the circular micropillar, the droplets confined on the micropillar with triangular concave edges have increased perimeter-to-wetted area ratios with each generation. Finally, the optimized shape (at generation 7 to 9), has as high as 25.51% increase in perimeter-to-wetted area ratio. The increases in perimeter-to-wetted area ratio contribute to a 21.3% increase in the heat transfer coefficient for the optimized droplet. Additionally, the optimized microdroplet has a 2% larger degree of curvature compared to a circular droplet. For example, the circular droplet has an average curvature of $2\times10^5$ m$^{-1}$ and the optimized droplet has an average curvature of $2.04\times10^5$ m$^{-1}$.

Accordingly, the described methods were used to optimize the shape of a non-axisymmetric droplet and achieve the maximum evaporative heat transfer coefficient. The methods provided an approximately 21.3% improvement in the heat transfer coefficient for the optimized case, compared to the reference spherical droplet. The methods can be used to design the optimum geometric features and orientation of pillars in a micropillar array and develop an evaporative cooling module for high-power electronics, including 2.5D and 3D stacked chips.

A mesh-independent study was conducted to investigate the influence of mesh size on the evaporation rate. As shown in Table 11, for triangular microdroplets, four levels of mesh with different element sizes (1.0 μm, 0.5 μm, 0.3 μm, and 0.2 μm) were generated for the mesh-independence study. The total evaporation rates for the coarse, medium, fine, and finest meshes were $1.15\times10^{-10}$ kg/s, $1.17\times10^{-10}$ kg/s, $1.18\times10^{-10}$ kg/s, and $1.1985\times10^{-10}$ kg/s, respectively. The difference in the rates for fine mesh and the finest mesh was only 1.5%. Therefore, the fine mesh with an element size of 0.3 μm was determined as suitable for at least some simulations of triangular microdroplets.

TABLE 11

| Mesh Size Influence on Evaporation Rate | | | | |
|---|---|---|---|---|
| Mesh size | Coarse 1.06 million | Medium 1.38 million | Fine 2.58 million | Finest 4.05 million |
| Max element size on droplet ace (μm) | 1.0 | 0.5 | 0.3 | 0.2 |
| Evaporation rate (kg/s) | $1.15 \times 10^{-10}$ | $1.17 \times 10^{-10}$ | $1.18 \times 10^{-10}$ | $1.19 \times 10^{-10}$ |
| Variation with respect to 'Finest' mesh | 3.7% | 2.8% | 1.5% | 0% |

The described methods resulted in optimized shapes for micropillars that have an increased perimeter-to-wetted area ratio. For example, the comparative improvement in the contact line length and the meniscus curvature is shown in table 3. Compared to the droplet confined on the equilateral triangle shape micropillar, the subsequent droplets confined on the micropillar with concave edges have increased perimeter-to-wetted area ratio with each generation. Finally, the optimized shape (at generation 5 and 6) has as high as 5.121% increment. Additionally, increasing curvature of the droplet meniscus is noted with each generation and the droplet with the optimum shape has a 2.57% higher curvature than the reference droplet. Combined, the increase in curvature and perimeter-to-area ratio causes 9% increase in the heat transfer coefficient for the optimized droplet.

TABLE 12

| Comparison of Meniscus Curvature and Perimeter-to-wetted Area Ratio of Group Best Particle at Each Generation | | |
|---|---|---|
| Generation number | % increase in contact line length (mm)/Wetted area (mm2) | % increase in curvature (1/m) |
| 1-2 | 4.614563884 | 1.09 |
| 3-4 | 5.681515071 | 1.1 |
| 5-6 | 5.121365698 | 2.57 |

Figure 57:
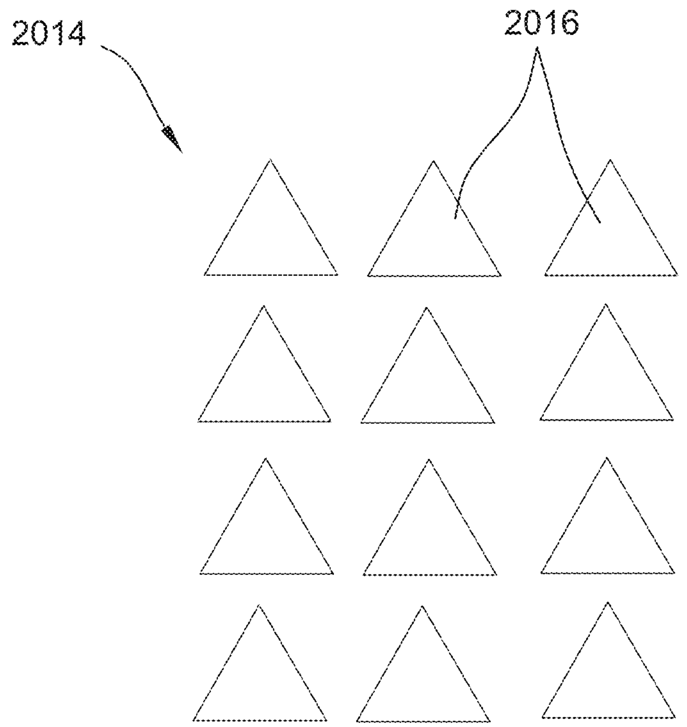
FIG. 57 is a top view of a micropillar array with orthogonal spacing between triangular micropillars.
Figure 59:
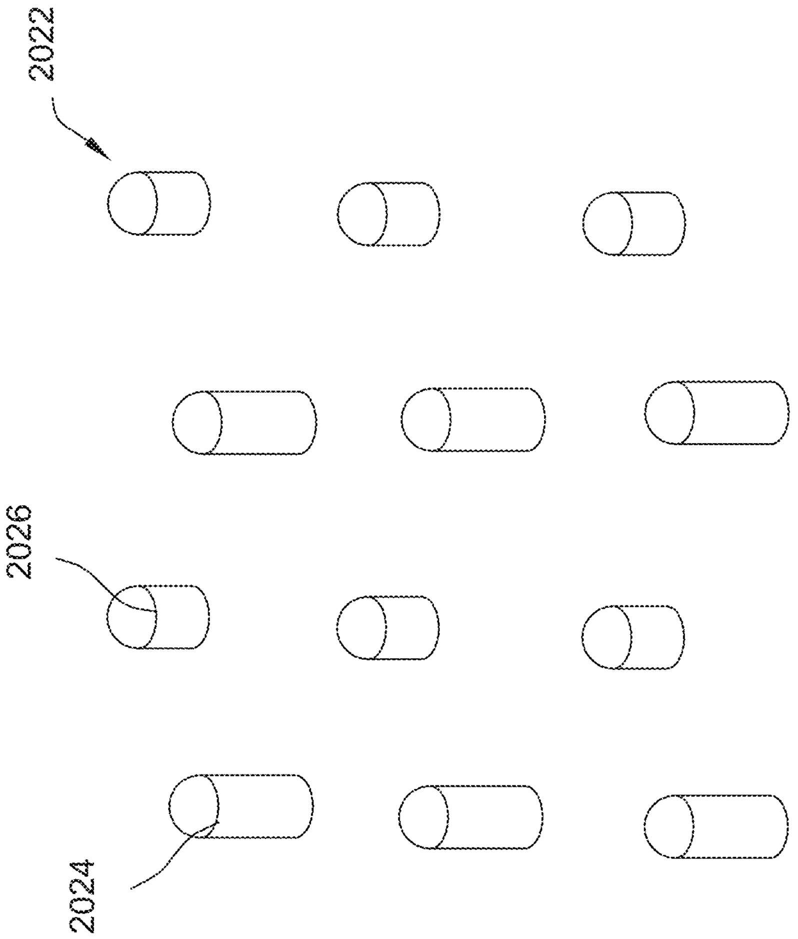
FIG. 59 is a top view of a micropillar array including micropillars of different heights.

FIGS. 57-59 show different micropillar arrays that can be fabricated using the described methods. FIG. 57 shows a micropillar array 2014 with orthogonal spacing between triangular micropillars 2016. FIG. 58 shows a micropillar array 2018 with uniform spacing between triangular micropillars 2020. FIG. 59 shows a micropillar array 2022 including micropillars 2024, 2026 of different heights. The micropillars 2024, 2026 are arranged in alternating rows. The methods described herein can be used to form micropillar arrays having any arrangements or combinations of conditions. For example, the micropillar arrays may have different combinations of spacing between micropillars, micropillar shapes, orientations of the micropillars, and micropillar height. The micropillar shapes and/or the arrangements of the micropillar arrays are determined based on at least one simulation and methods that enhance at least one desired characteristic of the micropillar arrays.

Figure 60:
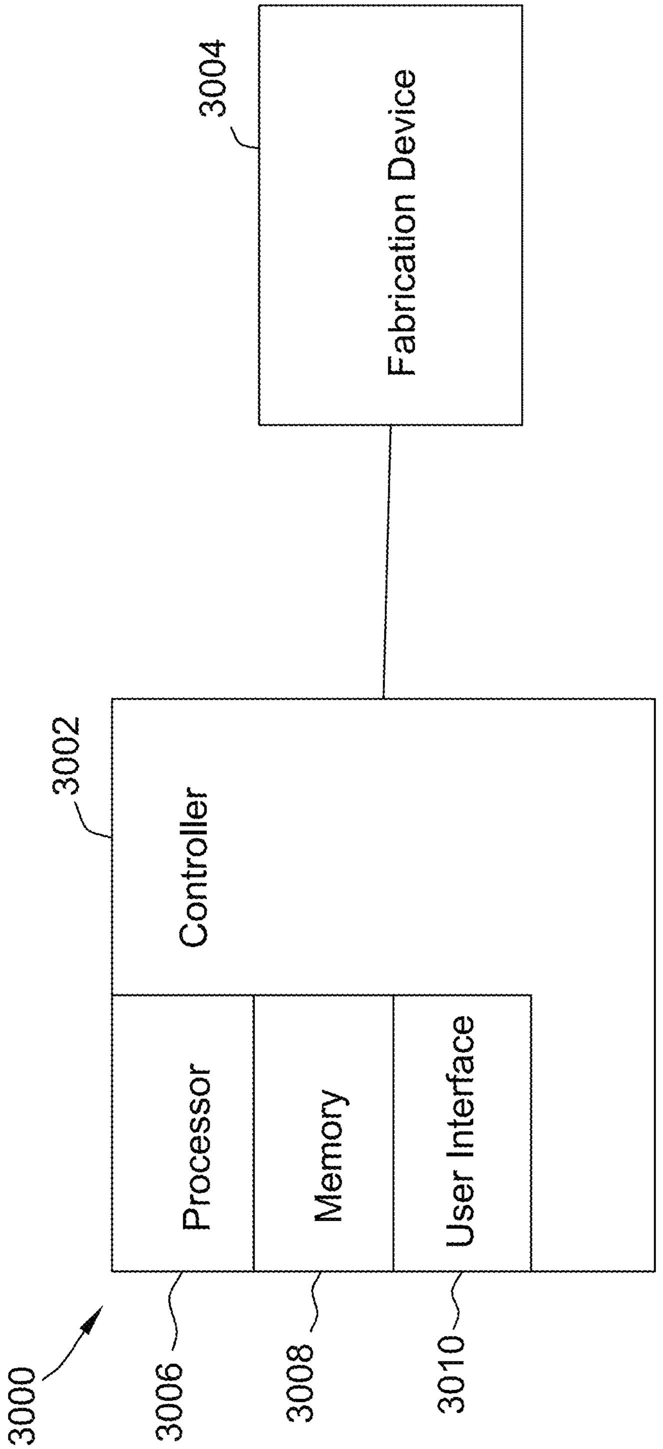
FIG. 60 is a block diagram of a system for fabricating a micropillar array.

FIG. 60 is a block diagram of an example system 3000 for fabricating a micropillar array in accordance with the methods described herein. The system 3000 includes a computer control system, or controller 3002 and a fabrication device 3004. For example, the controller 3002 may include a processor 3006, a memory 3008, and a user interface 3010 including an input device and a display. The controller 3002 may control operation of components of the system 3000, such as the fabrication device 3004, to fabricate the micropillar array. The controller 3002 may operate in accordance with instructions stored on the memory or an external memory to perform any steps of the methods described herein.

The fabrication device 3004 includes any suitable apparatus and components. In the example, the fabrication device includes apparatus configured to perform chemical vapor deposition (CVD), photolithography, and/or reactive-ion etching (RIE) and fabricate the micropillar array. For example, in some embodiments, the fabrication device 3004 includes a CVD apparatus including a gas delivery system, a reactor chamber, an energy source, a vacuum system, and an exhaust system, a photolithography apparatus including a laser, a shutter, and mirrors, and/or an RIE apparatus including a vacuum chamber, a gas delivery system, and a wafer platter. The apparatus of the fabrication device 3004 may be at least partially integrated or connected together or may be separate.

In the exemplary embodiment, the system 3000 is operated to fabricate the micropillar array from a build file generated using the methods described herein. The information required to fabricate the micropillar array is stored in the build file. For example, the build file includes micropillar height, micropillar shape, spacing between micropillars, layout of micropillars, orientation of micropillars, and any other parameters of the micropillar array. After the build file is loaded into the controller 3002, the system 3000 is operated to generate the micropillar array.

In embodiments described herein, a shape optimization loop using a particle swarm optimization module traces a desired droplet shape with highest evaporation rate and desired micropillar shape with maximum heat transfer coefficient. The shape optimization method integrates shape generation, equilibrated droplet shape generation, and evaporation simulation into an iteration loop. A thermal-diffusion model is developed to predict thermal transport in droplet evaporation. The shape generation is controlled by the PSO algorithm to update the geometries into new iterations based on the objective value. In an example, the optimum shape is output with a 9% improvement in heat transfer coefficient when convergence criterion is reached after 9 iterations. By comparison between experimental and numerical values of total evaporative flux and heat transfer coefficient for an evaporating droplet confined on an equilateral triangular micropillar, the simulation results match the experimental measurement with the relative error ranging from 1% to 10%.

In some embodiments, the pinning and bursting behaviors of two different working fluids (e.g., water and FC-40) may be accounted for using a dynamic simulation method. Comparing the results from the different computational tools allows for determination of the flow regions under which the dynamic effect would impact the liquid retention performance of the hollow micropillar.

In some embodiments, a microstructure heat exchanger for thermal management of at least one power electric device includes an evaporation layer and a liquid delivery layer. The evaporation layer comprises microstructures such as a plurality of hollow micropillars. Each micropillar is configured to receive a continuous flow of a cooling fluid and to evaporate the continuous flow of the cooling fluid from a surface of a droplet maintained on each micropillar. The evaporation layer is configured to thermally couple to at least one electronic device.

Suitably, each micropillar has a non-axisymmetric cross-sectional shape. For example, in some embodiments, at least one of the micropillars is a triangle, a pseudotriangle, a reuleaux, a square, and/or any other suitable shape. In some embodiments, some of the micropillars may be circular in cross-section.

The micropillars may receive heat from a heat source such as the electronic device. As described further herein, the non-axisymmetric micropillars may have increased evaporation rates at increased temperatures. For example, in some embodiments, at least one micropillar is heated to a temperature of at least 90° Celsius.

The liquid delivery layer is coupled to the evaporation layer opposite the at least one electronic device. The liquid delivery layer may include, for example, a porous metal material which may include a thermally conductive metal defining a plurality of interconnected pores. The liquid delivery layer is configured to receive the cooling fluid from a source and to deliver the continuous flow of the cooling fluid to each micropillar of the plurality of micropillars.

In some embodiments, a method of evaporating a liquid includes providing a flow of cooling fluid to an evaporation layer comprising a plurality of porous, non-axisymmetric micropillars, and evaporating the continuous flow of the cooling fluid from a surface of a droplet maintained on each micropillar.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

Any non-limiting examples are provided to further illustrate the present disclosure. It should be appreciated by those of skill in the art that the techniques disclosed in the examples represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

What is claimed is:

1. A method for forming a micropillar array for an evaporative heat exchanger, the method comprises:

- selecting a preliminary shape for a micropillar;
- determining a droplet shape that is generated by the preliminary shape;
- generating at least one curve that defines the droplet shape;
- performing an evaporative simulation based on the curve;

selecting a final shape for the micropillar based on the evaporative simulation;

generating a build file including the final shape for the micropillar selected based on the evaporative simulation; and operating a fabrication device in accordance with the selected final shape for the micropillar and the build file to fabricate an array of micropillars, wherein the array of micropillars includes at least one micropillar having the final shape for the micropillar, wherein the final shape for the micropillar is a cross-sectional shape of the micropillar.

2. The method of claim 1 further comprising inputting results from the evaporative simulation into a particle swarm optimization module and outputting, by the particle swarm optimization module, an optimized shape output.

3. The method of claim 2 further comprising:

determining a convergence value for control points of the particle swarm optimization module;

comparing the convergence value to a threshold;

determining a droplet shape that is generated by the optimized shape output by the particle swarm optimization module if the convergence value is greater than the threshold; and performing a second evaporative simulation based on the droplet shape.

4. The method of claim 3, wherein selecting the final micropillar shape comprises selecting the optimized shape output by the particle swarm optimization module as the final micropillar shape if the convergence value is equal to or less than the threshold.

5. The method of claim 1 further comprising determining an evaporative heat transfer coefficient for the evaporative simulation, and wherein the final micropillar shape is selected to provide a maximum heat transfer coefficient.

6. The method of claim 1 further comprising:

inputting, into a simulation model, the final micropillar shape;

inputting, into the simulation model, conditions for the micropillar array;

selecting a condition of the micropillar array to vary for the simulation, wherein the micropillar array includes a plurality of the micropillars, wherein the condition includes one of a spacing between micropillars, a shape of at least one micropillar, an orientation of the micropillars, and a micropillar height;

performing a simulation using the simulation model for the micropillar array; and selecting an arrangement of the micropillar array based on the simulation.

7. The method of claim 6, wherein determining the arrangement comprises selecting an arrangement that provides a maximum heat transfer coefficient from simulated arrangements.

8. The method of claim 6 further comprising selecting a second condition of the micropillar array to vary for the simulation and performing a second iteration of the simulation based on variances in the second condition.

9. The method of claim 1 further comprising generating a complete micropillar and droplet geometry and inputting the complete micropillar and droplet geometry into the evaporative simulation.

10. The method of claim 1, wherein selecting a preliminary shape for a micropillar comprises:

generating baseline micropillar shapes; and modifying features on the baseline micropillar shapes to provide target shapes, wherein the preliminary shapes include the target shapes.

11. A system for fabricating a micropillar array, the system comprises:

a controller configured to:

select a preliminary shape for a micropillar;

determine a droplet shape that is generated by the preliminary shape;

generate at least one curve that defines the droplet shape;

perform an evaporative simulation based on the droplet shape;

input results from the evaporative simulation into a particle swarm optimization module;

output, by the particle swarm optimization module, an optimized shape output;

determine a convergence value for control points of the particle swarm optimization module;

output an optimized shape output from the particle swarm optimization module; and compare the convergence value to a threshold, wherein the optimized shape output is used for a subsequent evaporative simulation if the convergence value is greater than a threshold, and wherein the optimized shape output is selected as a final shape for the micropillar if the convergence value is equal to or less than the threshold; and a fabrication device in communication with the controller, wherein the fabrication device is operated in accordance with the selected final shape for the micropillar to fabricate a micropillar array including at least one micropillar having the final micropillar shape for the micropillar, wherein the final shape for the micropillar is a cross-sectional shape of the micropillar.

12. The system of claim 11, wherein the controller is configured to determine an evaporative heat transfer coefficient for the evaporative simulation, and select the final micropillar shape to provide a maximum heat transfer coefficient.

13. The system of claim 11, wherein the controller is configured determine to an arrangement of a micropillar array based on the final shape of the micropillar by:

inputting, into a simulation model, the final micropillar shape;

inputting, into the simulation model, conditions for the micropillar array, wherein the micropillar array includes a plurality of the micropillars;

selecting a condition of the micropillar array to vary for the simulation, wherein the condition includes one of a spacing between micropillars, a shape of at least one micropillar, an orientation of the micropillars, and a micropillar height;

performing a simulation using the simulation model of the micropillar array; and determining an arrangement of the micropillar array based on the simulation.

14. The system of claim 11, wherein the controller is configured to generate a complete micropillar and droplet geometry and input the complete micropillar and droplet geometry into the evaporative simulation.

15. The system of claim 11, wherein the controller is configured to select a preliminary shape for the micropillar by:

generating baseline micropillar shapes; and modifying features on the baseline micropillar shapes to provide target shapes, wherein the preliminary shapes include the target shapes.

16. A method for forming a micropillar array, the method comprises:

performing an evaporative simulation based on a droplet shape;

selecting a final shape for the micropillar based on the evaporative simulation;

inputting, into a simulation model, the final shape for the micropillar;

inputting, into the simulation model, conditions for the micropillar array, wherein the micropillar array includes a plurality of the micropillars;

selecting a condition of the micropillar array to vary for the simulation, wherein the condition includes one of a spacing between micropillars, a shape of at least one micropillar, an orientation of the micropillars, and a micropillar height;

performing a simulation using the simulation model for the micropillar array;

selecting an arrangement of micropillars for the micropillar array based on the simulation; and fabricating a micropillar array having the selected arrangement of micropillars, the micropillar array including at least one micropillar having the selected final shape for the micropillar, wherein the final shape for the micropillar is a cross-sectional shape of the micropillar.

17. The method of claim 16 further comprising inputting results from the evaporative simulation into a particle swarm optimization module and outputting, by the particle swarm optimization module, an optimized shape output.

18. The method of claim 17 further comprising:

determining a convergence value for control points of the particle swarm optimization module;

comparing the convergence value to a threshold;

determining a droplet shape that is generated by the optimized shape output by the particle swarm optimization module if the convergence value is greater than the threshold; and performing a second evaporative simulation based on the droplet shape.

19. The method of claim 18, wherein selecting the final shape comprises selecting the optimized shape output by the particle swarm optimization module as the final micropillar shape if the convergence value is equal to or less than the threshold.

20. The method of claim 16, wherein determining the arrangement of micropillars comprises selecting an arrangement that provides a maximum heat transfer coefficient from simulated arrangements.

* * * * *